US012633629B2

(12) United States Patent     (10) Patent No.:   US 12,633,629 B2

Fan et al.     (45) Date of Patent:   *May 19, 2026

(54) RECHARGEABLE BATTERY WITH INTERNAL CURRENT LIMITER AND INTERRUPTER

(71) Applicant: American Lithium Energy Corporation, Carlsbad, CA (US)

(72) Inventors: Jiang Fan, San Diego, CA (US); Dengguo Wu, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,180

(22) Filed: Jan. 23, 2024

(65) Prior Publication Data

US 2024/0274997 A1    Aug. 15, 2024

Related U.S. Application Data

(63) Continuation of application No. 17/370,973, filed on Jul. 8, 2021, now Pat. No. 11,916,257, which is a (Continued)

(51) Int. Cl.
    *H01M 50/578*     (2021.01)
    *H01M 10/42*     (2006.01)

(Continued)

(52) U.S. Cl.
    CPC ..... *H01M 50/578* (2021.01); *H01M 10/4235* (2013.01); *H01M 10/425* (2013.01);

(Continued)

(58) Field of Classification Search
    CPC ........... H01M 10/4235; H01M 10/425; H01M 10/052; H01M 2010/4271; H01M 2200/10; H01M 2200/20

(Continued)

(56) References Cited

U.S. PATENT DOCUMENTS 2,664,481 A    12/1953   Pearl et al.
4,075,400 A    2/1978   Fritts (Continued)

FOREIGN PATENT DOCUMENTS

CN     1121264 A    4/1996
CN     103194161 A    7/2013

(Continued)

OTHER PUBLICATIONS

Eichstadt, Amy E., et al. "Structure-Property Relationships for a Series of Amorphous Partially Aliphatic Polyimides." Journal of Polymer Science Pati B: Polymer Physics 40.14 (2002): 1503-1512.

(Continued)

*Primary Examiner* — Nathaniel R Pelton
(74) *Attorney, Agent, or Firm* — Jones Day

(57)          ABSTRACT

A high energy density rechargeable (HEDR) battery employs a combined current limiter/current interrupter to prevent thermal runaway in the event of internal discharge or other disruption of the separator. The combined current limiter/current interrupter is interior to the battery.

16 Claims, 29 Drawing Sheets

---

| Cathode Current Collector | 101 |
| Cathode Energy Layer | 102 |
| Separator | 103 |
| Anode Energy Layer | 104 |
| Resistive Limiter and Thermal Interrupt Layer | 105 |
| Anode Current Collector | 106 |

Related U.S. Application Data continuation of application No. 15/529,651, filed as application No. PCT/US2015/062767 on Nov. 25, 2015, now Pat. No. 11,121,438, which is a continuation of application No. 14/714,160, filed on May 15, 2015, now Pat. No. 10,396,341.

(60) Provisional application No. 62/114,508, filed on Feb. 10, 2015, provisional application No. 62/114,006, filed on Feb. 9, 2015, provisional application No. 62/114,001, filed on Feb. 9, 2015, provisional application No. 62/114,007, filed on Feb. 9, 2015, provisional application No. 62/084,454, filed on Nov. 25, 2014.

(51) Int. Cl.
| | |
|---|---|
| *H01M 50/574* | (2021.01) |
| *H01M 50/581* | (2021.01) |
| H01M 10/052 | (2010.01) |

(52) U.S. Cl.
CPC ....... *H01M 50/574* (2021.01); *H01M 50/581* (2021.01); *H01M 10/052* (2013.01); *H01M 2010/4271* (2013.01); *H01M 2200/10* (2013.01); *H01M 2200/20* (2013.01)

(58) Field of Classification Search
USPC ........................................... 429/50; 320/134
See application file for complete search history.

(56) References Cited

U.S. PATENT DOCUMENTS

| | | | |
|---|---|---|---|
| 4,361,799 | A | 11/1982 | Lutz |
| 4,456,631 | A | 6/1984 | Crosbie et al. |
| 4,541,735 | A | 9/1985 | Isa |
| 4,975,341 | A | 12/1990 | Tucholski et al. |
| 5,188,909 | A | 2/1993 | Pedicini |
| 5,504,128 | A | 4/1996 | Mizutani et al. |
| 5,507,842 | A | 4/1996 | Fiorino |
| 5,754,090 | A | 5/1998 | Arensmeier |
| 5,776,627 | A | 7/1998 | Mao et al. |
| 6,005,469 | A | 12/1999 | Kalapodis et al. |
| 6,078,244 | A | 6/2000 | Quinn et al. |
| 6,084,501 | A | 7/2000 | Plasko |
| 6,181,545 | B1 | 1/2001 | Amatucci et al. |
| 6,191,679 | B1 | 2/2001 | Kalapodis et al. |
| 6,342,826 | B1 | 1/2002 | Quinn et al. |
| 6,387,570 | B1 | 5/2002 | Nakamura et al. |
| 6,570,749 | B1 | 5/2003 | Ling et al. |
| 6,576,373 | B1 | 6/2003 | Iwamoto et al. |
| 6,780,544 | B2 | 8/2004 | Noh |
| 7,203,049 | B2 | 4/2007 | Chu et al. |
| 7,390,589 | B2 | 6/2008 | Shin et al. |
| 8,021,788 | B2 | 9/2011 | Kim et al. |
| 8,754,740 | B2 | 6/2014 | Pinto et al. |
| 8,841,011 | B2 | 9/2014 | Jang |
| 9,627,722 | B1 | 4/2017 | Fan et al. |
| 9,806,382 | B1 | 10/2017 | Fan et al. |
| 2002/0197533 | A1 | 12/2002 | Gao et al. |
| 2005/0079422 | A1 | 4/2005 | Ko et al. |
| 2006/0099506 | A1 | 5/2006 | Krause et al. |
| 2007/0166609 | A1 | 7/2007 | Lee et al. |
| 2007/0210893 | A1 | 9/2007 | Hasunuma et al. |
| 2007/0269718 | A1 | 11/2007 | Krause et al. |
| 2008/0116423 | A1 | 5/2008 | Fan et al. |
| 2008/0241684 | A1* | 10/2008 | Muraoka .......... H01M 10/0587 |
| | | | 427/58 |
| 2008/0254343 | A1 | 10/2008 | Kaplin et al. |
| 2008/0292939 | A1 | 11/2008 | Xie |
| 2009/0027158 | A1 | 1/2009 | Kaiino et al. |
| 2009/0092892 | A1 | 4/2009 | Yamaouchi et al. |
| 2009/0191463 | A1 | 7/2009 | Ide et al. |
| 2010/0047674 | A1 | 2/2010 | Ryu et al. |

| | | | |
|---|---|---|---|
| 2010/0099022 | A1 | 4/2010 | Nishida et al. |
| 2010/0143753 | A1 | 6/2010 | Heongsin |
| 2010/0167107 | A1 | 7/2010 | Byun et al. |
| 2010/0233543 | A1 | 9/2010 | Numata et al. |
| 2010/0247987 | A1 | 9/2010 | Holung et al. |
| 2011/0045321 | A1 | 2/2011 | Park et al. |
| 2011/0052950 | A1 | 3/2011 | Yoo |
| 2011/0117403 | A1 | 5/2011 | Hermann et al. |
| 2011/0151293 | A1 | 6/2011 | Kim et al. |
| 2011/0157755 | A1 | 6/2011 | Honkura |
| 2011/0217589 | A1* | 9/2011 | Kobayashi .............. H01M 4/62 |
| | | | 429/174 |
| 2011/0256443 | A1 | 10/2011 | Park et al. |
| 2011/0273807 | A1 | 11/2011 | Kim et al. |
| 2011/0273809 | A1 | 11/2011 | Falsett et al. |
| 2012/0034502 | A1* | 2/2012 | Nieh ......................... H02J 7/00 |
| | | | 429/62 |
| 2012/0056709 | A1 | 3/2012 | Kajino et al. |
| 2012/0058375 | A1 | 3/2012 | Tanaka et al. |
| 2012/0068127 | A1 | 3/2012 | Kawase et al. |
| 2012/0121974 | A1 | 5/2012 | Tikhonov et al. |
| 2012/0189881 | A1 | 7/2012 | Geoffroy et al. |
| 2013/0004811 | A1 | 1/2013 | Banerjee et al. |
| 2013/0101869 | A1 | 4/2013 | Farmer |
| 2013/0130075 | A1 | 5/2013 | Kim et al. |
| 2013/0171502 | A1 | 7/2013 | Chen et al. |
| 2013/0216867 | A1 | 8/2013 | Schaefer et al. |
| 2014/0051826 | A1 | 2/2014 | Chng |
| 2014/0072851 | A1 | 3/2014 | Oh et al. |
| 2014/0168845 | A1 | 6/2014 | Charles |
| 2014/0178753 | A1 | 6/2014 | Chu et al. |
| 2014/0295248 | A1 | 10/2014 | Hotta et al. |
| 2014/0377629 | A1 | 12/2014 | Miyazaki et al. |
| 2015/0004448 | A1 | 1/2015 | Morita et al. |
| 2015/0050544 | A1 | 2/2015 | Nam et al. |
| 2015/0104681 | A1 | 4/2015 | Wang et al. |
| 2015/0280241 | A1 | 10/2015 | Hara et al. |
| 2015/0303484 | A1 | 10/2015 | Iida et al. |
| 2015/0311001 | A1 | 10/2015 | Kato et al. |
| 2016/0059732 | A1 | 3/2016 | Loftus |
| 2016/0149196 | A1 | 5/2016 | Fan et al. |
| 2016/0149199 | A1 | 5/2016 | Fan |
| 2016/0149268 | A1 | 5/2016 | Fan et al. |
| 2016/0149269 | A1 | 5/2016 | Fan et al. |
| 2016/0164065 | A1 | 6/2016 | Liu et al. |
| 2016/0172657 | A1 | 6/2016 | Matsui et al. |
| 2016/0181590 | A1 | 6/2016 | Fan et al. |
| 2016/0240836 | A1 | 8/2016 | Aotani et al. |
| 2016/0254545 | A1 | 9/2016 | Sugita et al. |
| 2016/0254572 | A1 | 9/2016 | Yu et al. |
| 2016/0268646 | A1 | 9/2016 | Wang et al. |
| 2016/0322641 | A1 | 11/2016 | Saito et al. |
| 2016/0372749 | A1 | 12/2016 | Iida et al. |
| 2016/0380307 | A1 | 12/2016 | Akita et al. |
| 2017/0207440 | A1 | 7/2017 | Hama et al. |
| 2017/0365840 | A1 | 12/2017 | Fan et al. |
| 2018/0019505 | A1 | 1/2018 | Fan et al. |
| 2018/0026301 | A1 | 1/2018 | Ebisuzaki |
| 2018/0053928 | A1 | 2/2018 | Xie et al. |
| 2018/0190967 | A1 | 7/2018 | Fan et al. |
| 2018/0294472 | A1 | 10/2018 | Fan |
| 2019/0013553 | A1 | 1/2019 | Fan et al. |
| 2021/0313627 | A1 | 10/2021 | Fan et al. |

FOREIGN PATENT DOCUMENTS

| | | |
|---|---|---|
| CN | 104078276 A | 10/2014 |
| CN | 104937320 A | 9/2015 |
| CN | 105680086 A | 6/2016 |
| CN | 106030751 A | 10/2016 |
| EP | 0450549 A1 | 10/1991 |
| EP | 0776058 A2 | 5/1997 |
| EP | 1246280 A2 | 10/2002 |
| JP | 7220755 A2 | 8/1995 |
| JP | H07-220755 A | 8/1995 |
| JP | H09-220755 A | 8/1995 |
| JP | H09-320568 A | 12/1997 |
| JP | 2000-077061 A | 3/2000 |
| JP | 2005-011540 A | 1/2005 |

(56)　　　　　References Cited

FOREIGN PATENT DOCUMENTS

| | | | |
|---|---|---|---|
| JP | 2007-280803 A | | 10/2007 |
| JP | 2010-146726 A | | 7/2010 |
| JP | 2012-074359 A | | 4/2012 |
| KR | 10-2008-0015160 A | | 2/2008 |
| KR | 20130123492 A | | 11/2013 |
| TW | 200601656 A | | 1/2006 |
| WO | WO 2004/049494 | * | 6/2004 |
| WO | WO 2004/049494 A1 | | 6/2004 |
| WO | WO 2015/046469 A1 | | 4/2015 |
| WO | WO 2015/060175 A1 | | 4/2015 |
| WO | WO 2016/086184 A1 | | 6/2016 |

OTHER PUBLICATIONS

Fang, Xingzhong, et al. "Synthesis and properties of polyimides derived from cis- and trans-1, 2, 3, 4-cyclohexanetetracarboxylic dianhydrides." Polymer 45.8 (2004): 2539-2549.

Jeon, Jong-Young, and Tae-Moon Tak. "Synthesis of Aliphatic-Aromatic Polyimides by Two-Step Polymerization of Aliphatic Dianhydride and Aromatic Diamine." Journal of Applied Polymer Science 60.11 (1996): 1921-1926.

Loncrini, D. F., and J.M. Witzel. "Polyaryleneimides of meso-and dl-1, 2, 3, 4-Butanetetracarboxylic Acid Dianhydrides." Journal of Polymer Science Pati A—1: Polymer Chemistry7.8 (1969): 2185-2193.

Matsumoto, Toshihiko. "Aliphatic polyimides derived from polyalicyclic monomers." High Performance Polymers 13.2 (2001): S85-S92.

Schab-Balcerzak, E., et al. "Synthesis and characterization of organosoluble aliphatic-aromatic copolyimides based on cycloaliphatic dianhydride." European Polymer Journal 38.3 (2002): 423-430.

Seino, Hiroshi, Amane Mochizuki, and Mitsuru Ueda. "Synthesis of Aliphatic Polyimides Containing Adamantyl Units." Journal of Polymer Science Pati A Polymer Chemistry 37.18 (1999): 3584-3590.

Seino, Hiroshi, et al. "Synthesis of fully aliphatic polyimides." High Performance Polymers 11.3 (1999): 255-262.

Spotnitz, R., and J. Franklin. "Abuse behavior of high-power, lithium-ion cells." Journal of Power Sources 113.1 (2003): 81-100.

International Search Report and Written Opinion issued in International Application No. PCT/US2015/062767, mailed Feb. 12, 2016.

* cited by examiner

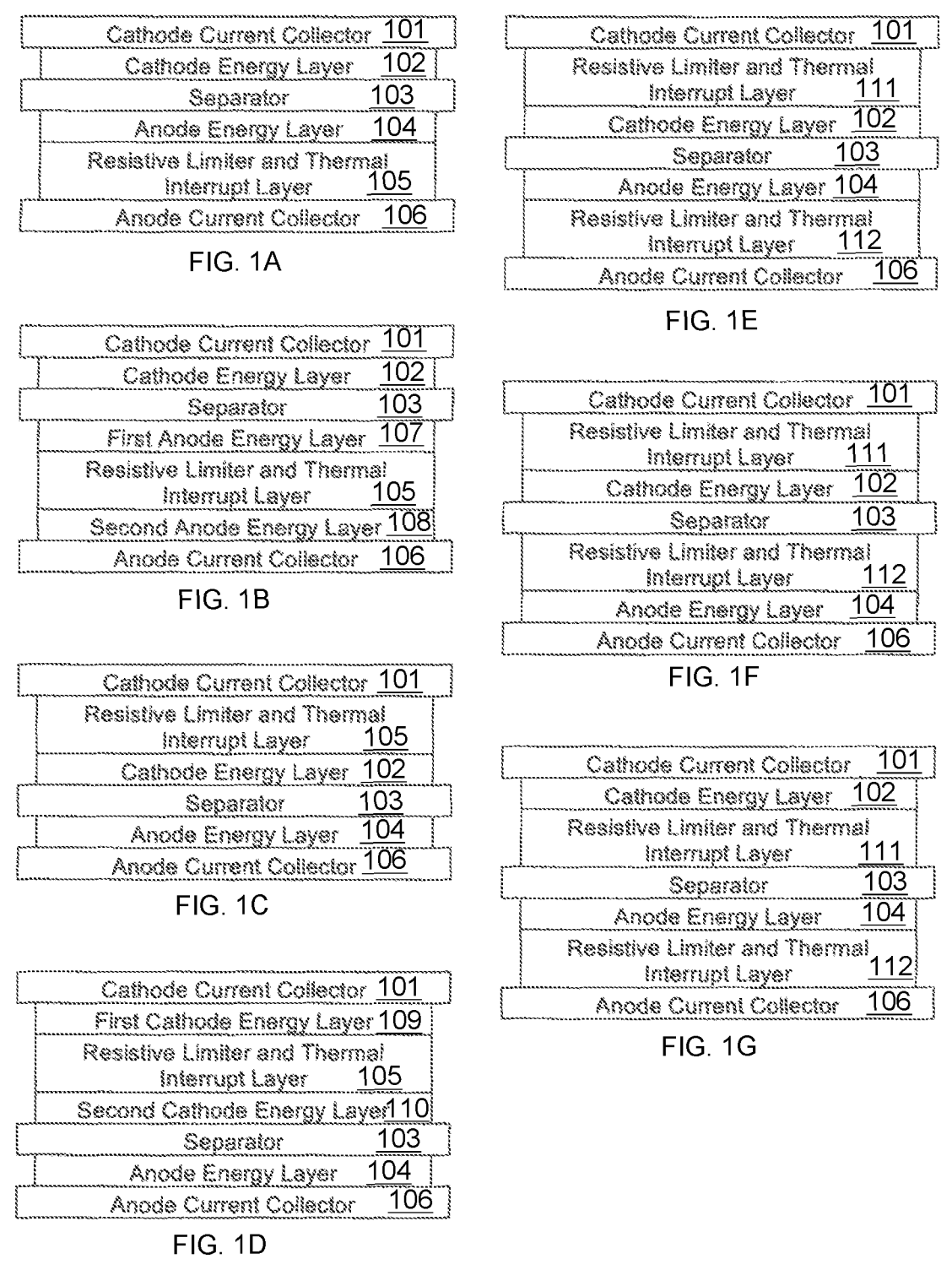

| Cathode Current Collector 101 |
| Cathode Energy Layer 102 |
| Separator 103 |
| Anode Energy Layer 104 |
| Resistive Limiter and Thermal Interrupt Layer 105 |
| Anode Current Collector 106 |

FIG. 1A

| Cathode Current Collector 101 |
| Cathode Energy Layer 102 |
| Separator 103 |
| First Anode Energy Layer 107 |
| Resistive Limiter and Thermal Interrupt Layer 105 |
| Second Anode Energy Layer 108 |
| Anode Current Collector 106 |

FIG. 1B

| Cathode Current Collector 101 |
| Resistive Limiter and Thermal Interrupt Layer 105 |
| Cathode Energy Layer 102 |
| Separator 103 |
| Anode Energy Layer 104 |
| Anode Current Collector 106 |

FIG. 1C

| Cathode Current Collector 101 |
| First Cathode Energy Layer 109 |
| Resistive Limiter and Thermal Interrupt Layer 105 |
| Second Cathode Energy Layer 110 |
| Separator 103 |
| Anode Energy Layer 104 |
| Anode Current Collector 106 |

FIG. 1D

| Cathode Current Collector 101 |
| Resistive Limiter and Thermal Interrupt Layer 111 |
| Cathode Energy Layer 102 |
| Separator 103 |
| Anode Energy Layer 104 |
| Resistive Limiter and Thermal Interrupt Layer 112 |
| Anode Current Collector 106 |

FIG. 1E

| Cathode Current Collector 101 |
| Resistive Limiter and Thermal Interrupt Layer 111 |
| Cathode Energy Layer 102 |
| Separator 103 |
| Resistive Limiter and Thermal Interrupt Layer 112 |
| Anode Energy Layer 104 |
| Anode Current Collector 106 |

FIG. 1F

| Cathode Current Collector 101 |
| Cathode Energy Layer 102 |
| Resistive Limiter and Thermal Interrupt Layer 111 |
| Separator 103 |
| Anode Energy Layer 104 |
| Resistive Limiter and Thermal Interrupt Layer 112 |
| Anode Current Collector 106 |

FIG. 1G

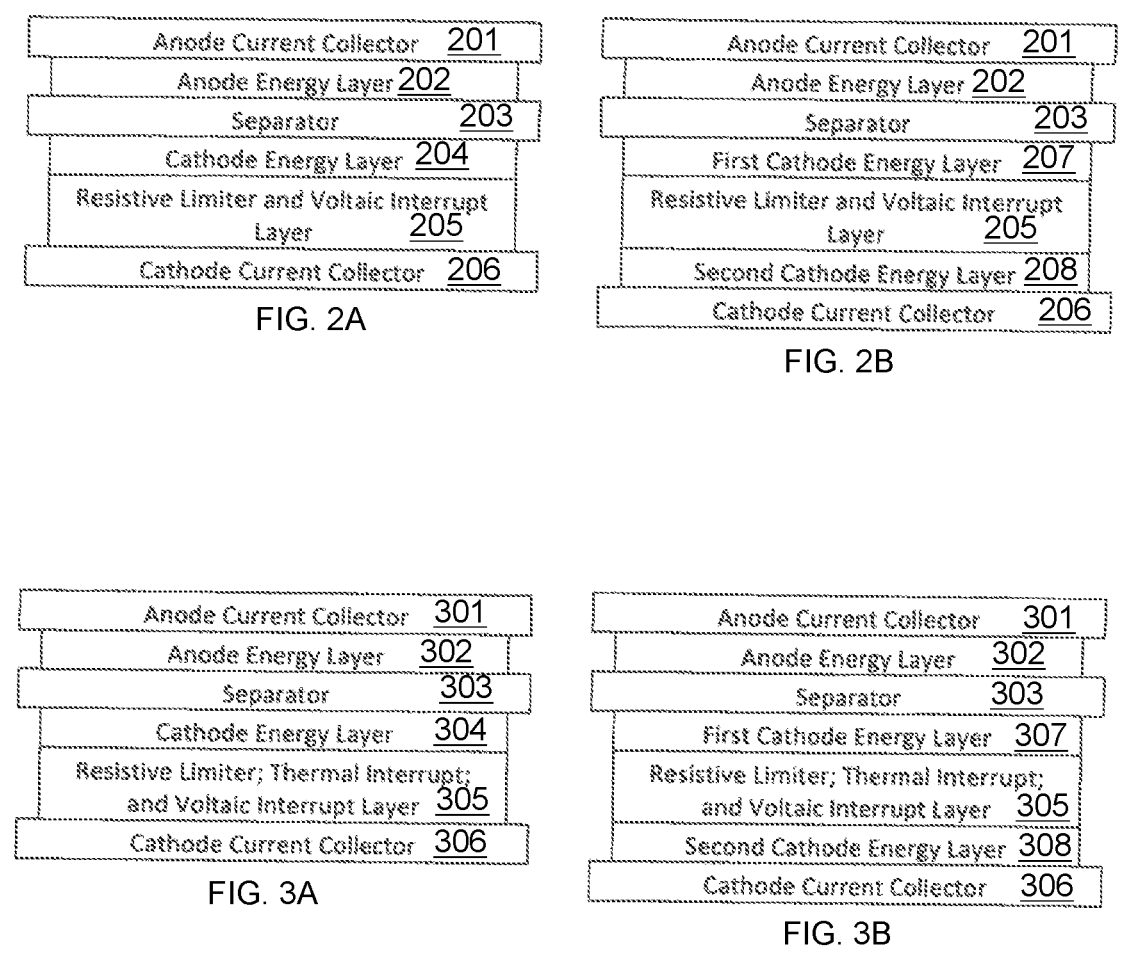

| Anode Current Collector   201 |
| Anode Energy Layer 202 |
| Separator   203 |
| Cathode Energy Layer   204 |
| Resistive Limiter and Voltaic Interrupt Layer   205 |
| Cathode Current Collector   206 |

FIG. 2A

| Anode Current Collector   201 |
| Anode Energy Layer 202 |
| Separator   203 |
| First Cathode Energy Layer   207 |
| Resistive Limiter and Voltaic Interrupt Layer   205 |
| Second Cathode Energy Layer   208 |
| Cathode Current Collector   206 |

FIG. 2B

| Anode Current Collector   301 |
| Anode Energy Layer   302 |
| Separator   303 |
| Cathode Energy Layer   304 |
| Resistive Limiter; Thermal Interrupt; and Voltaic Interrupt Layer   305 |
| Cathode Current Collector   306 |

FIG. 3A

| Anode Current Collector   301 |
| Anode Energy Layer   302 |
| Separator   303 |
| First Cathode Energy Layer   307 |
| Resistive Limiter; Thermal Interrupt; and Voltaic Interrupt Layer   305 |
| Second Cathode Energy Layer   308 |
| Cathode Current Collector   306 |

FIG. 3B

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

Prior Art – Unshorted

Prior Art – Shorted

Unshorted

Shorted

Prior Art - Unshorted

Prior Art - Shorted

Unshorted

Shorted

| Cell # | Positive Electrode | Negative Electrode | Comments |
|---|---|---|---|
| 1 | POS1A:<br>$LiNi_{0.5}Mn_{0.3}Co_{0.2}O_2$: 93.4%;<br>Carbon Black: 3%;<br>PVDF: 3.6%;<br>Loading: 15.55 mg/cm²;<br>Thickness: 117 µm. | NEG1A:<br>SLP 30: 18.272%;<br>MCMB : 75.728%;<br>Carbon Black: 2%;<br>CMC: 1.5%;<br>SBR: 2.5%;<br>Loading: 9.14 mg/cm²;<br>Thickness: 117 µm. | Baseline; no protection layer |
| 2 | POS2A:<br>$Li_{1+x}Ni_{0.33}Co_{0.33}Mn_{0.33}O_2$: 95.3%<br>Carbon black: 1.5%;<br>PVDF: 3%;<br>Dispersing agent: 0.2%;<br>Loading: 15.92 mg/cm²;<br>Thickness: 123 µm. | NEG2A:<br>SLP 30: 18.872%;<br>MCMB: 75.728%;<br>Carbon Black: 2%;<br>CMC: 1.3%;<br>SBR: 2.1%;<br>Loading: 8.54 mg/cm²;<br>Thickness: 118 µm. | Baseline; no protection layer; resistance measurement for positive POS2A at 3.6V vs graphite |
| 3 | POS3B:  1st layer<br>$CaCo_3$: 85.2%;<br>Carbon black: 0.8%;<br>TF-4000: 2%;<br>PVDF: 12%;<br>1st layer Loading: 1 mg/cm²;<br>1st layer Thickness: ~10 µm.<br>POS3A:  2nd layer<br>$LiNi_{0.33}Mn_{0.33}Co_{0.33}O_2$ 93.4%;<br>Carbon Black: 3%;<br>PVDF: 3.6%.<br>Total electrode (two layers):<br>Loading: 19.44 mg/cm²;<br>Thickness: ~148 µm. | NEG3A:<br>SLP 30: 18.872%;<br>MCMB: 75.728%;<br>Carbon Black: 2%;<br>CMC: 1.3%;<br>SBR: 2.1%;<br>Loading: 11.8 mg/cm²;<br>Thickness: 159 µm. | Gas generating layer coated on positive electrode. |
| 4 | POS4B:  1st layer<br>$Al_2O_3$: 42.6%;<br>$CaCo_3$: 42.6%;<br>Carbon Black: 0.8%;<br>TF-4000: 2%;<br>PVDF: 12%;<br>1st layer Loading: 1 mg/cm²;<br>1st layer Thickness: 10 µm.<br><br>POS4A:  2nd layer<br>$LiNi_{0.5}Mn_{0.3}Co_{0.2}O_2$: 93.4%;<br>Carbon Black: 3%;<br>PVDF: 3.6%.<br><br>Total electrode (two layers):<br>Loading: 19.4 mg/cm²;<br>Thickness: ~153 µm. | NEG4A:<br>SLP 30: 18.872%;<br>MCMB: 75.728%;<br>Carbon Black: 2%;<br>CMC: 1.3%;<br>SBR: 2.1%:<br>Loading: 11.8 mg/cm²;<br>Thickness: 159 µm. | Resistance and gas generating layer coated on positive electrode. |

FIG. 13A

| | | | |
|---|---|---|---|
| 5 | POS5B:  1st layer<br>$Al_2O_3$: 42.6%;<br><br>$Na_2O_7Si_3$: 42.6%;<br>Carbon Black: 0.8%;<br>TF-4000: 2%;<br>PVDF: 12%.<br>1st layer Loading: 0.7 mg/cm²;<br>1st layer Thickness: 10 µm.<br>POS5A:  2nd layer<br>$LiNi_{0.33}Mn_{0.33}Co_{0.33}O_2$:95.%;<br>Carbon Black: 1.5%;<br>PVDF: 3.5%.<br>Total electrode (two layers):<br>Loading: 19.5 mg/cm²;<br>Thickness: ~150 µm. | NEG5A:<br>SLP 30: 18.872%;<br>MCMB : 75.728%;<br>Carbon Black: 2%;<br>CMC: 1.3%;<br>SBR: 2.1%;<br>Loading: 11.8 mg/cm²;<br>Thickness: 159 µm. | Resistance and gas generating layer coated on positive electrode. ($Na_2O_7Si_3$ will absorb the water during the processing in the air and decompose into quartz, sodium disilicate, and liquid) |
| 6 | POS6B:  1st layer<br>$CaCo_3$: 49.8%;<br>Carbon Black: 3.7%;<br>PVDF: 46.5%;<br>1st layer Loading: 1 mg/cm²;<br>1st layer Thickness: ~10 µm.<br>POS6A:  2nd layer<br>$LiNi_{0.33}Mn_{0.33}Co_{0.33}O_2$: 93%;<br>Carbon Black: 3%;<br>PVDF: 4%;<br>Total electrode (two layers):<br>Loading: 22 mg/cm²;<br>Thickness: ~167 µm. | NEG6A:<br>MCMB: 94%;<br>Carbon Black: 2%;<br>CMC: 1.5%;<br>SBR: 2.5%;<br>Loading: 12 mg/cm²;<br>Thickness: 170 µm. | Gas generating layer coated on positive electrode. |
| 7 | POSO71A:  1st layer<br>$LiNi_{0.33}Mn_{0.33}Co_{0.33}O_2$: 89.96%<br>$CaCo_3$: 4.74%<br>Carbon Black: 1.2%;<br>TF- 4000: 0.6%<br>PVDF: 3.5%<br>1st layer Loading: 4 mg/cm²<br>1st layer Thickness: ~0.04 mm<br><br>POSO71B:  2nd layer<br>$LiNi_{0.82}Al_{0.03}Co_{0.15}O_2$: 92.8%<br>Carbon Black: 3%<br>PVDF A: 3.6%<br>TF-4000: 0.6%<br>Total electrode (two layers):<br>Loading: 16 mg/cm²<br>Thickness: ~ 0.105 µm. | NEG015B:<br>MCMB: 94.5%<br>Carbon Black: 1.5%<br>CMC: 1.5%<br>SBR: 2.5%<br>Loading:~11.8 mg/cm²<br>Thickness: ~0.155 mm. | The first layer , the gas generator contains the gas generator $CaCO_3$ and active $LiNi_{0.33}Mn_{0.33}CO_{0.33}O_2$, which will maximize the battery cell capacity |

FIG. 13B

| Electrode ID | Materials | (%) | (g) | Comments |
|---|---|---|---|---|
| POS7B | Carbopol®-934 | 98.2 | 19.64 | Polymer with $CO_3^{2-}$ anion. |
| | Super-P® | 0.8 | 0.16 | |
| | LiOH | 1 | 0.2 | |
| POS8B | Al-50 | 99.2 | 19.84 | Polymer containing carbonyl group and $NH_2$ group which may decompose into $CO_2$. |
| | Super-P® | 0.8 | 0.16 | |
| POS9B | CMC-DN-800H | 99.2 | 19.84 | Polymer containing carboxylic acid groups with $NH_4$ cations |
| | Super-P® | 0.8 | 0.16 | |
| POS10B | $ZnCO_3.Zn(OH)_2$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS11B | $Na_2SO_3$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS12B | $CuCO_3.Cu(OH)_2$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS13B | $La_2(CO_3)_3$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS14B | $Cu(NO_3)_2$ | 85.2 | 17.04 | Salt |
| | Super-P® | 0.8 | 0.16 | |
| | Torlon® 4000TF | 12 | 2.4 | |
| | PVDF-A | 0.1 | 0.02 | |

FIG. 14

| Cell# | Impedance (mohm) | Cap. At 1A (Ah) | Cap. At 3A (Ah) | Cap. At 6A (Ah) | Cap. At 10A (Ah) | Ratio (Cap. At/3 A/Cap. At 1A) | Ratio (Cap. At/6 A/Cap. at 1A) | Ratio (Cap. At/10 A/Cap. At 1A) |
|---|---|---|---|---|---|---|---|---|
| 1 | 14 | 2.32 | 2.24 | 2.13 | 1.93 | 0.97 | 0.95 | 0.91 |
| 3 | 51.6 | 2.3687 | 2.104 | 1.64 | 0.94 | 0.89 | 0.78 | 0.57 |
| 4 | 46.8 | 2.3809 | 2.2607 | 1.8414 | 1.0256 | 0.95 | 0.81 | 0.56 |
| 5 | 16.5 | 2.4168 | 2.3792 | 2.3 | 2.06 | 0.98 | 0.97 | 0.9 |
| 6 | 15.8 | 2.3383 | 2.2495 | 2.1446 | 1.967 | 0.96 | 0.95 | 0.92 |

| Cell # | Maximum Cell Temperature (°C) | Comments |
|---|---|---|
| 1 | 334 | fire and explosion |
| 3 | 80 | pass |
| 4 | 84 | pass |
| 5 | 90 | pass |
| 6 | 84 | pass |

| Cell # | Maximum Cell Temperature/°C | Comments |
|---|---|---|
| 1 | 680 | fire and explosion |
| 3 | 80 | pass |
| 4 | 80 | pass |
| 5 | 75 | pass |
| 6 | 80 | pass |

| Compounds | Peak current (mA) | Peak Voltage (V) |
|---|---|---|
| $CaCO_3$ | 0.2 | >6 |
| $La_2(CO_3)_3$ | 0.2 | >6 |
| $Na_2So_3$ | 0.48 | 5.84 |
| $ZnCO_3Zn(OH)_2$ | 0.77 | 5.89 |
| $CuCO_3Cu(OH)_2$ | 0.78 | 5.78 |
| $Cu(NO_3)_2$ | 1 | 5.8 |

| Polymers | Peak current/mA | Peak Voltage/V |
|---|---|---|
| Carbopol | 0.94 | 4.95 |
| Al-50 | 0.96 | 5.88 |
| CMC | 0.4 | >6 |
| PVDF | 1.178 | 5.38 |

| Cell No. | Impedance (mohm) | Cap. At 1A (Ah) | Cap. At 3A (Ah) | Cap. At 6A (Ah) | Cap. At 10A (Ah) | Ratio (Cap. At 3A/Cap.At/1A) | Ratio (Cap. At 6A/Cap.At/1A) | Ratio (Cap. At 10A/Cap.At/1A) |
|---|---|---|---|---|---|---|---|---|
| 1 | 14 | 2.32 | 2.24 | 2.13 | 1.93 | 0.97 | 0.95 | 0.91 |
| 3 | 25.8 | 2.9117 | 2.8172 | 2.6473 | 2.3289 | 0.97 | 0.94 | 0.88 |
| 4 | 89 | 1.756 | 1.096 | 0.023 | 0 | 0.62 | 0.02 | 0 |
| 5 | 15.8 | 2.3383 | 2.2495 | 2.1446 | 1.967 | 0.96 | 0.95 | 0.92 |
| 6 | 16 | 2.416 | 2.379 | 2.3 | 2.06 | 0.98 | 0.97 | 0.9 |

RT to 200°C Cell #3 Positive (4.09V)

| Cell No. | Maximum Cell Temperature/°C | Comments |
|---|---|---|
| 1 | 334 | fire & explosion |
| 3 | 70 | pass |
| 4 | 90 | pass |
| 5 | 106 | pass |
| 6 | 90 | pass |

RECHARGEABLE BATTERY WITH INTERNAL CURRENT LIMITER AND INTERRUPTER

CROSS-REFERENCE TO RELATED APPLICATIONS

This application is a continuation application of U.S. patent application Ser. No. 17/370,973, filed Jul. 8, 2021, entitled "RECHARGEABLE BATTERY WITH INTERNAL CURRENT LIMITER AND INTERRUPTER," which is a continuation application of U.S. patent application Ser. No. 15/529,651, filed Nov. 25, 2015, entitled "RECHARGEABLE BATTERY WITH INTERNAL CURRENT LIMITER AND INTERRUPTER," which is a national stage entry, filed under 35 U.S.C. § 371, of International Application No. PCT/US2015/062767, filed on Nov. 25, 2015, entitled "RECHARGEABLE BATTERY WITH INTERNAL CURRENT LIMITER AND INTERRUPTER," which claims priority to the following five Provisional Applications: U.S. Provisional Application No. 62/084,454, filed Nov. 25, 2014, entitled "BATTERY SAFETY DEVICE;" U.S. Provisional Application No. 62/114,001, filed Feb. 9, 2015, entitled "RECHARGEABLE BATTERY WITH RESISTIVE LAYER FOR ENHANCED SAFETY;" U.S. Provisional Application No. 62/114,006, filed Feb. 9, 2015, entitled "RECHARGEABLE BATTERY WITH TEMPERATURE ACTIVATED CURRENT INTERRUPTER;" U.S. Provisional Application No. 62/114,007, filed Feb. 9, 2015, entitled "RECHARGEABLE BATTERY WITH VOLTAGE CURRENT INTERRUPTER;" and U.S. Provisional Application No. 62/114,508, filed Feb. 10, 2015, entitled "RECHARGEABLE BATTERY WITH INTERNAL CURRENT LIMITER AND INTERRUPTER;" as well as to U.S. patent application Ser. No. 14/714,160, now U.S. Pat. No. 10,396,341, filed May 15, 2015, entitled "RECHARGEABLE BATTERY WITH INTERNAL CURRENT LIMITER AND INTERRUPTER," which claims priority to U.S. Provisional Application No. 62/084,454, filed Nov. 25, 2014, entitled "BATTERY SAFETY DEVICE," and U.S. Provisional Application No. 62/114, 508, filed Feb. 10, 2015, titled "RECHARGEABLE BATTERY WITH INTERNAL CURRENT LIMITER AND INTERRUPTER." The disclosures of which are all hereby incorporated by reference herein, each in its entirety.

BACKGROUND

Technical Field

This disclosure relates to an internal current limiter or current interrupter used to protect a battery in the event of an internal short circuit or overcharge leads to thermal runaway. In particular, it relates to a high energy density rechargeable (HEDR) battery with improved safety.

Background

There is a need for rechargeable battery systems with enhanced safety which have a high energy density and hence are capable of storing and delivering large amounts of electrical energy per unit volume and/or weight. Such stable high energy battery systems have significant utility in a number of applications including military equipment, communication equipment, and robotics.

An example of a high energy density rechargeable (HEDR) battery commonly in use is the lithium-ion battery.

A lithium-ion battery is a rechargeable battery wherein lithium ions move from the negative electrode to the positive electrode during discharge and back when charging.

Lithium-ion batteries can be dangerous under some conditions and can pose a safety hazard. The fire energy content (electrical+chemical) of lithium cobalt-oxide cells is about 100 to 150 kJ per A-h, most of it chemical. If overcharged or overheated, Li-ion batteries may suffer thermal runaway and cell rupture. In extreme cases this can lead to combustion. Also, short-circuiting the battery, either externally or internally, will cause the battery to overheat and possibly to catch fire.

Overcharge:

In a lithium-ion battery, useful work is performed when electrons flow through a closed external circuit. However, in order to maintain charge neutrality, for each electron that flows through the external circuit, there must be a corresponding lithium ion that is transported from one electrode to the other. The electric potential driving this transport is achieved by oxidizing a transition metal. For example, cobalt (Co), from $Co^{3+}$ to $Co^{4+}$ during charge and reduced from $Co^{4+}$ to $Co^{3+}$ during discharge. Conventionally, $Li_{1-\chi}CoO_2$ may be employed, where the coefficient $\chi$ represents the molar fraction of both the Li ion and the oxidative state of $CoO_2$, viz., $Co^{3+}$ or $Co^{4+}$. Employing these conventions, the positive electrode half-reaction for the lithium cobalt battery is represented as follows:

$$LiCoO_2 \leftrightarrow Li_{1-\chi}CoO_2 + \chi Li^+ + \chi e^-$$

The negative electrode half reaction is represented as follows:

$$\chi Li^+ + \chi e^- + \chi C_6 \leftrightarrow \chi LiC_6$$

The cobalt electrode reaction is reversible limited to x<0.5, limiting the depth of discharge allowable because of cycle life considerations and the stability of $LiCoO_2$.

Overcharge leads to the synthesis of cobalt (IV) oxide, as follows:

$$LiCoO_2 \rightarrow Li^+ + CoO_2 + O_2 + e^-$$

$LiCoO_2$ will decompose into $CoO_2$ and release a large amount of heat and oxygen. The released oxygen will then oxidize the electrolyte, which will lead to thermal runaway. This process is irreversible. Therefore, what is needed is some device or design that can decompose below or before positive decomposition. This device will protect the cell from thermal runaway.

Thermal Runaway:

If the heat generated by a lithium ion battery exceeds its heat dissipation capacity, the battery can become susceptible to thermal runaway, resulting in overheating and, under some circumstances, to destructive results such as fire or violent explosion. Thermal runaway is a positive feedback loop wherein an increase in temperature changes the system so as to cause further increases in temperature. The excess heat can result from battery mismanagement, battery defect, accident, or other causes. However, the excess heat generation often results from increased joule heating due to excessive internal current or from exothermic reactions between the positive and negative electrodes. Excessive internal current can result from a variety of causes, but a lowering of the internal resistance due to separator short circuit caused by the factors such as conductive particles spearing through the separator is one possible cause. Heat resulting from a separator short circuit can cause a further breach within the separator, leading to a mixing of the reagents of the negative and positive electrodes and the generation of further heat due to the resultant exothermic reaction.

Internal Short Circuit:

Lithium ion batteries employ a separator between the negative and positive electrodes to electrically separate the two electrodes from one another while allowing lithium ions to pass through. When the battery performs work by passing electrons through an external circuit, the permeability of the separator to lithium ions enables the battery to close the circuit. Short circuiting the separator by providing a conductive path across it allows the battery to discharge rapidly. A short circuit across the separator can result from improper charging and discharging or cell manufacturing defects such as metal impurities and metal shard formation during electrode production. More particularly, improper charging can lead to the deposition of metallic lithium dendrites on the surface of the negative electrode and these dendrites grow to penetrate the separator through the nanopores so as to provide a conductive path for electrons from one electrode to the other. In addition, improper discharge at or below 1.5V will cause copper dissolution which can ultimately lead to the formation of metallic copper dendrites on the surface of the negative electrode which can also grow to penetrate the separator through the nanopore. The lower resistance of these conductive paths allows for rapid discharge and the generation of significant joule heat. Overheating and thermal runaway can result.

What was needed was a combination internal current limiter and current interrupter that could, at first, limit the rate of internal discharge resulting from an internal short circuit so as to reduce the generation of Joule heat, if the rate of internal discharge is insufficiently limited, could also interrupt the internal short circuit to further curtail the rate of internal discharge, regardless of the temperature increase, so as to avert fire and/or explosion.

SUMMARY

In a first aspect, provided in some implementations herein is an improved high energy density rechargeable (HEDR) battery of a type including two electrodes of opposite polarity, each electrode characterized by its resistivity, by its safe operating temperature range, and its safe charging voltage; and a separator for separating the two electrodes and preventing internal discharge therebetween. The HEDR battery includes at least one electrode employing a current collector for transferring electrons, with the separator being subject to a risk of forming a short circuit, the short circuit potentially allowing a rapid internal discharge between the two electrodes, the rapid internal discharge between the two electrodes potentially allowing a rapid production of joule heat therefrom, the rapid production of joule heat potentially allowing a thermal runaway. In the HEDR battery, the two electrodes can be subject to a risk of overcharge above the safe charging voltage and the formation of the short circuit therefrom and the two electrodes can be subject to a risk of thermal runaway above the safe operating temperature range. The HEDR battery can include an improvement for slowing the rate of internal discharge resulting from the short circuit, for slowing the production of joule heat therefrom, and for reducing the risk of thermal runaway, the improvement includes: a current limiter forming an electrical coupling between one of the electrodes and its corresponding current collector, the current limiter having a resistivity for resistively impeding current therethrough and, in the event the separator forms the short circuit, for diverting current from the electrode current collector to which it is coupled, and for reducing the rate of the internal discharge between the two electrodes; and a current interrupter having an engaged configuration, an disengaged configuration, and a gas generating component for transitioning the current interrupter from the engaged to the unengaged configuration. The gas generating component can have a trigger for generating a gas, the trigger being selected from the group consisting of temperature triggers and voltage triggers, and the temperature triggers can be activatable above the safe operating temperature range. The voltage triggers can be activatable above the safe charging voltage in the engaged configuration, the current interrupter electrically coupling one of the electrodes and its corresponding current collector with a laminated connection, and in the disengaged configuration, the laminated connection becoming delaminated and the current interrupter forming a nonconductive gap for interrupting the electrical coupling between the electrode and its corresponding current collector. The current interrupter transitions from the engaged to the disengaged configuration by triggering the gas generating component responsive to the trigger, the generated gas delaminating the laminated connection for interrupting the electrical coupling between the electrode and its corresponding current collector. The current limiter and the current interrupter, in combination, diminish the risk of thermal runaway resulting from separator short circuit, electrode overcharge, and electrode overheating.

The following features can be present in the improved high energy density rechargeable (HEDR) battery in any suitable combination. The current limiter and the current interrupter can be simultaneously incorporated into a protective layer interposed by lamination between the same electrode and current collector. The HEDR battery can include two current collectors, including a first current collector and a second current collector, the two electrodes including a first electrode and a second electrode, and the first electrode including a first portion and a second portion, the second portion of the first electrode interposed between the first portion of the first electrode and the first current collector, the improvement further characterized in which: the current limiter being layered between the first portion of the first electrode and the second portion of the first electrode; and the current interrupter being layered between the second portion of the first electrode and the first current collector. The current limiter can be layered between the second portion of the first electrode and the first current collector, and the current interrupter can be layered between the first portion of the first electrode and the second portion of the first electrode. The HEDR battery can have two current collectors, including a first current collector and a second current collector and the two electrodes including a first electrode and a second electrode, and the current limiter can be layered between the first electrode and the first current collector; and the current interrupter can be layered between the second electrode and the second current collector. In the HEDR battery, each electrode can have a temperature range for safe operation and an internal resistivity therein, and the current limiter can have a resistivity greater than the internal resistivity of the electrode with which the current limiter is layered within the temperature range for safe operation. The current limiter can lack a resistivity transition switch at temperatures within the temperature range for safe operation. The HEDR battery can be such that each electrode has a temperature range for standard operation and the current limiter can have a resistivity transition with a resistivity less than the internal resistivity of the electrode within the temperature range for standard operation and a resistivity greater than the internal resistivity of the electrode above the temperature range for standard operation. The HEDR battery can be such that each electrode has a temperature range for standard operation and the current interrupter can be activated by temperature above the temperature range for standard operation. In some implementations, the HEDR battery can be of a type in which each electrode has a temperature range for standard operation and a temperature range for safe operation, an in which the current interrupter can be activated by temperature above the temperature range for standard operation and within the temperature range for safe operation. In some implementations, the HEDR battery can be such that each electrode has an internal resistivity within the temperature range for safe operation, in which the current limiter can have a resistivity greater than the internal resistivity of the electrode with which the current limiter is layered within the temperature range for safe operation. The current limiter and the current interrupter can be simultaneously incorporated into a protective layer interposed by lamination between the same electrode and current collector. The HEDR battery can be of a type in which each electrode has a voltage range for standard operation, and in which the current interrupter is activated by voltage above the voltage range for standard operation. The HEDR battery can be of a type in which each electrode has a voltage range for standard operation and a voltage range for safe operation, and in which the current interrupter is activated by voltage above the voltage range for standard operation and within the voltage range for safe operation. The current limiter and the current interrupter can be simultaneously incorporated into a protective layer interposed by lamination between the same electrode and current collector.

In a related aspect, provided herein is an improved high energy density rechargeable battery of a type including two electrodes of opposite polarity, a separator separating the two electrodes, and at least one current collector electrically coupled to one of the electrodes, the separator preventing internal discharge between the two electrodes, failure of the separator potentially causing an internal discharge between the two electrodes, the internal discharge causing a generation of joule heat of potential danger, that includes a thermally activatable current interrupter and a voltage activatable current interrupter. The thermally activatable current interrupter can be layered by lamination between one of the current collectors and one of the electrodes, the thermally activatable current interrupter, when unactivated, electrically coupling the current collector to the electrode with which it is layered, the current interrupter, when activated, delaminating from the current collector for forming a non-conductive gap for electrically decoupling the current collector from the electrode with which it had been layered, the electrical decoupling slowing the rate of internal discharge between the two electrodes in the event of separator failure. The voltage activatable current interrupter can be layered by lamination between one of the current collectors and one of the electrodes, the voltage activatable current interrupter, when unactivated, electrically coupling the current collector to the electrode with which it is layered, the current interrupter, when activated, delaminating from the current collector for forming a nonconductive gap for electrically decoupling the current collector from the electrode with which it had been layered, the electrical decoupling slowing the rate of internal discharge between the two electrodes in the event of separator failure. In the HEDR battery, the activation of either the thermally activated current interrupter or voltage activated current interrupter in the event of separator failure, can slow the generation joule heat for diminishing the potential danger.

In a further related aspect, provided in some implementations herein is a process for avoiding thermal runaway within a high energy density rechargeable battery undergoing internal discharge due to separator failure, that includes delaminating an electrode within the battery from its current collector by generating a gas from a heat sensitive gas generating material within an interrupt layer interposed between the electrode and current collector, the delaminating electrically decoupling the electrode from its current collector for slowing the rate of internal discharge.

In a first aspect, provided herein is a high energy density rechargeable (HEDR) battery that includes an anode energy layer, a cathode energy layer, a separator between the anode energy layer and the cathode energy layer for preventing internal discharge thereof, at least one current collector for transferring electrons to and from either the anode or cathode energy layer, the anode and cathode energy layers each having an internal resistivity, the HEDR battery having a preferred temperature range for discharging electric current and an upper temperature safety limit; and a resistive layer interposed between the separator and one of the current collectors, the resistive layer configured to limit the rate of internal discharge through the separator in the event of separator failure and the generation of joule heat resulting therefrom, the resistive layer having a fixed resistivity at temperatures between the preferred temperature range and the upper temperature safety limit, the fixed resistivity of the resistive layer being greater than the internal resistivity of either energy layer, the resistive layer for avoiding temperatures in excess of the upper temperature safety limit in the event of separator failure.

The following features can be included in the HEDR battery in any suitable combination. In some implementations, the resistive layer of the HEDR battery can be porous and include a ceramic powder defining an interstitial space, a binder for partially filling the interstitial space for binding the ceramic powder; and a conductive component dispersed within the binder for imparting resistivity to the resistive layer, the interstitial space remaining partially unfilled for imparting porosity and permeability to the resistive layer. The resistive layer can be compressed to reduce the unfilled interstitial space and increase the binding of the ceramic powder by the binder. The resistive layer can include greater than 30% ceramic powder by weight. The resistive layer can include greater than 50% ceramic powder by weight. The resistive layer can include greater than 70% ceramic powder by weight. The resistive layer can include greater than 75% ceramic powder by weight. The resistive layer can include greater than 80% ceramic powder by weight. The resistive layer of the HEDR battery can be permeable to transport of ionic charge carriers. The resistive layer can be non-porous and have a composition that includes a non-conductive filler, a binder for binding the non-conductive filler, and a conductive component dispersed within the binder for imparting resistivity to the resistive layer. The resistive layer can be impermeable to transport of ionic charge carriers. The fixed resistivity of the resistive layer of the HEDR battery can be at least twice as great as the internal resistivity of either energy layer. The fixed resistivity of the resistive layer can be at least five times as great as the internal resistivity of either energy layer. The fixed resistivity of the resistive layer can be at least ten times as great as the internal resistivity of either energy layer. The resistive layer can lack a transformation from solid phase to non-solid phase for transforming the resistivity of the resistive layer from low resistivity to high resistivity at temperatures between the maximum operating temperature and the upper temperature safety limit. The resistive layer can be non-sacrificial at temperatures below the upper temperature safety limit. The resistive layer can be sacrificial at temperatures above the upper temperature safety limit. The resistive layer can include a ceramic powder that chemically decomposes above the upper temperature safety limit for evolving a fire retardant gas. The resistive layer can include a ceramic powder that chemically decomposes above the upper temperature safety limit for evolving a gas for delaminating the current collector from the resistive layer. The current collector can include an anode current collector for transferring electrons to and from the anode energy layer, wherein the resistive layer is interposed between the separator and the anode current collector. The resistive layer can be interposed between the anode current collector and the anode energy layer. The resistive layer can be interposed between the anode energy layer and the separator. In some implementations, the anode energy layer of the HEDR battery can include a first anode energy layer, and a second anode energy layer interposed between the first anode energy and the separator, wherein the resistive layer is interposed between the first anode energy layer and the second anode energy layer. The current collector can include a cathode current collector for transferring electrons to and from the cathode energy layer, wherein the resistive layer is interposed between the separator and the cathode current collector. The resistive layer can be interposed between the cathode current collector and the cathode energy layer. The resistive layer can be interposed between the cathode energy layer and the separator. The cathode energy layer can include a first cathode energy layer, and a second cathode energy layer interposed between the first cathode energy and the separator, wherein the resistive layer is interposed between the first cathode energy layer and the second cathode energy layer. In some implementations, the HEDR battery can include two current collectors that include an anode current collector for transferring electrons to and from the anode energy layer, and a cathode current collector for transferring electrons to and from the cathode energy layer in which the resistive layer comprises an anode resistive layer and a cathode resistive layer, the anode resistive layer interposed between the separator and the anode current collector, the cathode resistive layer interposed between the separator and the cathode current collector.

In a related aspect, provided herein is a method for limiting the rate of an internal discharge of energy layers resulting from a separator failure within a high energy density rechargeable (HEDR) battery, the method that includes resisting the internal discharge with a resistive layer, the resistive layer being interposed between a separator and a current collector within the HEDR battery, the resistive layer having a fixed resistivity at temperatures between a preferred temperature range for discharging the energy layers and an upper temperature safety limit, the fixed resistivity of the resistive layer being greater than the internal resistivity of the energy layers.

Provided in some embodiments herein is a high energy density rechargeable (HEDR) metal-ion battery that includes an anode energy layer, a cathode energy layer, a separator for separating the anode energy layer from the cathode energy layer, at least one current collector for transferring electrons to and from either the anode or cathode energy layer, the high energy density rechargeable metal-ion battery having an upper temperature safety limit for avoiding thermal runaway, and an interrupt layer activatable for interrupting current within high energy density rechargeable metal-ion battery upon exposure to temperature at or above the upper temperature safety limit, the interrupt layer interposed between the separator and one of the current collectors, the interrupt layer, when unactivated, being laminated between the separator and one of the current collectors for conducting current therethrough, the interrupt layer, when activated, being delaminated for interrupting current through the high energy density rechargeable metal-ion battery, the interrupt layer including a temperature sensitive decomposable component for decomposing upon exposure to temperature at or above the upper temperature safety limit, the temperature sensitive decomposable component for evolving a gas upon decomposition, the evolved gas for delaminating the interrupt layer for interrupting current through the high energy density metal-ion battery, in which the high energy density rechargeable metal-ion battery avoids thermal runaway by activation of the interrupt layer upon exposure to temperature at or above the upper temperature safety limit for interrupting current in high energy density rechargeable metal-ion battery.

The following features can be present in the HEDR metal-ion battery in any suitable combination. The interrupt layer can be porous. The temperature sensitive decomposable component can include a ceramic powder. The interrupt layer can have a composition comprising the ceramic powder, a binder, and a conductive component. The ceramic powder can define an interstitial space. The binder can partially fill the interstitial space for binding the ceramic powder. The conductive component can be dispersed within the binder for imparting conductivity to the interrupt layer. The interstitial space can remain partially unfilled for imparting porosity and permeability to the interrupt layer. The interrupt layer can include greater than 30% ceramic powder by weight. The interrupt layer can include greater than 50% ceramic powder by weight. The interrupt layer can include greater than 70% ceramic powder by weight. The interrupt layer can include greater than 75% ceramic powder by weight. The interrupt layer can include greater than 80% ceramic powder by weight. The interrupt layer can be permeable to transport of ionic charge carriers. The interrupt layer can be non-porous and have a composition that includes a non-conductive filler, a binder for binding the non-conductive filler, and a conductive component dispersed within the binder for imparting conductivity to the interrupt layer. The interrupt layer can be impermeable to transport of ionic charge carriers. The interrupt layer can be sacrificial at temperatures above the upper temperature safety limit. The interrupt layer can include a ceramic powder that chemically decomposes above the upper temperature safety limit for evolving a fire retardant gas. The current collector can include an anode current collector for transferring electrons to and from the anode energy layer, wherein the interrupt layer being interposed between the separator and the anode current collector. The interrupt layer can be interposed between the anode current collector and the anode energy layer. The interrupt layer can be interposed between the anode energy layer and the separator. The anode energy layer of the HEDR battery can include a first anode energy layer; and a second anode energy layer interposed between the first anode energy and the separator, wherein the interrupt layer being interposed between the first anode energy layer and the second anode energy layer. The current collector can include a cathode current collector for transferring electrons to and from the cathode energy layer, wherein the interrupt layer is interposed between the separator and the cathode current collector. The interrupt layer can be interposed between the cathode current collector and the cathode energy layer. The interrupt layer can be interposed between the cathode energy layer and the separator. The cathode energy layer can include a first cathode energy layer and a second cathode energy layer interposed between the first cathode energy and the separator, wherein the interrupt layer is interposed between the first cathode energy layer and the second cathode energy layer. The HEDR battery can further include two current collectors that include an anode current collector for transferring electrons to and from the anode energy layer and a cathode current collector for transferring electrons to and from the cathode energy layer, in which the interrupt layer includes an anode interrupt layer and a cathode interrupt layer, the anode interrupt layer interposed between the separator and the anode current collector, the cathode interrupt layer interposed between the separator and the cathode current collector.

In a related aspect, a method is presented for interrupting current within a high energy density rechargeable metal-ion battery upon exposure to temperature at or above an upper temperature safety limit for avoiding thermal runaway, that includes: raising the temperature of the high energy density rechargeable metal-ion battery above the upper temperature safety limit, and activating the interrupt layer for interrupting current through the high energy density metal-ion battery. The high energy density rechargeable metal-ion battery can include: an anode energy layer; a cathode energy layer; a separator separating the anode energy layer from the cathode energy layer; a current collector for transferring electrons to and from either the anode or cathode energy layer; and an interrupt layer, the interrupt layer interposed between the separator and one of the current collectors, the interrupt layer, when unactivated, being laminated between the separator and one of the current collectors for conducting current therethrough, the interrupt layer, when activated, being delaminated for interrupting current through the lithium ion battery, the interrupt layer comprising a temperature sensitive decomposable component for decomposing upon exposure to temperature at or above the upper temperature safety limit, the temperature sensitive decomposable component for evolving a gas upon decomposition, the evolved gas for delaminating the interrupt layer for interrupting current through the high energy density metal-ion battery; whereby thermal runaway by the high energy density rechargeable metal-ion battery is avoided by interruption of current therethrough.

Provided in some implementations herein is a high energy density rechargeable (HEDR) metal-ion battery that includes an anode energy layer, a cathode energy layer, a separator for separating the anode energy layer from the cathode energy layer, an anode current collector for transferring electrons to and from the anode energy layer, the high energy density rechargeable metal-ion battery being rechargeable and characterized by a maximum safe voltage for avoiding overcharge; and an interrupt layer activatable for interrupting current within the high energy density rechargeable battery upon exposure to voltage in excess of the maximum safe voltage, the interrupt layer sandwiched between the cathode energy layer and the cathode current collector, the interrupt layer, when unactivated, being laminated to the anode current collector for conducting current therethrough, the interrupt layer, when activated, being delaminated from the anode current collector for interrupting current therethrough, the interrupt layer including a voltage sensitive decomposable component for decomposing upon exposure to voltage in excess of the maximum safe voltage, the voltage sensitive decomposable component for evolving a gas upon decomposition, the evolved gas for delaminating the interrupt layer from the anode current collector for interrupting current therethrough, whereby the high energy density rechargeable metal-ion battery avoids overcharge by activation of the interrupt layer upon exposure to voltage in excess of the maximum safe voltage for interrupting current therethough.

The following features can be present in the high energy density rechargeable metal-ion battery in any suitable combination. The interrupt layer of the HEDR battery can be porous and have a composition that includes a ceramic powder defining an interstitial space; a binder for partially filling the interstitial space for binding the ceramic powder; and a conductive component dispersed within the binder for imparting conductivity to the interrupt layer, the interstitial space remaining partially unfilled for imparting porosity and permeability to the interrupt layer. The interrupt layer can be compacted for reducing the unfilled interstitial space and increasing the binding of the ceramic powder by the binder. The interrupt layer can include greater than 30% ceramic powder by weight. The interrupt layer can include greater than 50% ceramic powder by weight. The interrupt layer can include greater than 70% ceramic powder by weight. The interrupt layer can include greater than 75% ceramic powder by weight. The interrupt layer can include greater than 80% ceramic powder by weight. The interrupt layer can be permeable for transporting ionic charge carriers. The interrupt layer of the HEDR battery can be non-porous and have a composition that includes a non-conductive filler; a binder for binding the non-conductive filler; and a conductive component dispersed within the binder for imparting conductivity to the interrupt layer. The interrupt layer can be impermeable to transport of ionic charge carriers. The interrupt layer can be sacrificial at voltages above the maximum safe voltage for recharging. The interrupt layer can include a ceramic powder that chemically decomposes above maximum safe voltage for evolving the gas. The gas can be fire retardant.

In a related aspect, provided herein is a method for interrupting a recharging process for a high energy density rechargeable metal-ion battery upon exposure to voltage at or above a maximum safe voltage for avoiding overcharge, the high energy density rechargeable metal-ion battery comprising an anode energy layer, a cathode energy layer, a separator between the anode energy layer and the cathode energy layer, and an anode current collector for transferring electrons to and from the anode energy layer. The method includes overcharging the high energy density rechargeable metal-ion battery for increasing the voltage above the maximum safe voltage for recharging; and interrupting the overcharging by evolving a gas by decomposition of a voltage sensitive decomposable component within a interrupt layer laminated to the anode current collector, the evolved gas delaminating the interrupt layer from the anode current collector, whereby the overcharging of the high energy density rechargeable metal-ion battery is interrupted by evolution of gas within the interrupt layer for delaminating the interrupt layer from the anode current collector.

A first aspect of the disclosure is directed to an improved high energy density rechargeable (HEDR) battery of a type including two electrodes of opposite polarity (12 and 14). Each electrode is characterized by its resistivity, by its safe operating temperature range, and its safe charging voltage. The HEDR is further of a type having a separator 2 for separating the two electrodes (12 and 14) and preventing internal discharge there between and at least one electrode (12 or 14) employing a current collector 4 for transferring electrons. The separator 2 is subject to a risk of forming a short circuit. The short circuit can potentially allow a rapid internal discharge between the two electrodes (12 and 14), potentially allowing a rapid production of joule heat therefrom, the rapid production of joule heat potentially allowing a thermal runaway. The two electrodes (12 and 14) are subject to a risk of overcharge above the safe charging voltage and the formation of the short circuit therefrom. The two electrodes (12 and 14) are subject to a risk of thermal runaway above the safe operating temperature range.

The improvement for this first aspect of the disclosure is employable for slowing the rate of internal discharge resulting from the short circuit, for slowing the production of joule heat therefrom, and for reducing the risk of thermal runaway.

The improvement comprises the addition to the HEDR battery of a current limiter 6 combined with a current interrupter 8.

The current limiter 6 forms an electrical coupling between one of the electrodes (12 or 14) and its corresponding current collector 4. The current limiter 6 has a resistivity for resistively impeding current therethrough and, in the event the separator 2 forms the short circuit, for diverting current from the electrode current collector 4 to which it is coupled, and for reducing the rate of the internal discharge between the two electrodes (12 and 14).

The current interrupter 8 has an engaged configuration, a disengaged configuration, and a gas generating component for transitioning the current interrupter 8 from the engaged to the unengaged configuration. The gas generating component also has a trigger for generating a gas. The trigger is selected from the group consisting of temperature triggers and voltage triggers.

The temperature triggers are activatable above the safe operating temperature range.

The voltage triggers are activatable above the safe charging voltage.

In its engaged configuration, the current interrupter 8 electrically couples one of the electrodes (12 or 14) and its corresponding current collector 4 with a laminated connection.

In the disengaged configuration, the laminated connection becomes delaminated and the current interrupter 8 forms a nonconductive gap for interrupting the electrical coupling between the electrode (12 or 14) and its corresponding current collector 4.

The current interrupter 8 transitions from its engaged configuration to its disengaged configuration by triggering the gas generating component responsive to the trigger. The resulting generated gas delaminates the laminated connection for interrupting the electrical coupling between the electrode (12 or 14) and its corresponding current collector 4.

In this first aspect of the disclosure, the current limiter 6 and the current interrupter 8, in combination, diminishes the risk of thermal runaway resulting from separator short circuit, electrode overcharge, and electrode overheating.

In one embodiment of this first aspect of the disclosure, the current limiter 6 and the current interrupter 8 are simultaneously incorporated into a protective layer interposed by lamination between the same electrode (12 or 14) and current collector 4.

In another embodiment of this first aspect of the disclosure, the battery is of a type having two current collectors 4, including a first current collector 4 and a second current collector 4. The two electrodes (12 and 14) include a first electrode and a second electrode. The first electrode includes a first portion and a second portion. The second portion of the first electrode is interposed between the first portion of the first electrode and the first current collector 4. The improvement of this embodiment of the disclosure is further characterized by the current limiter 6 being layered between the first portion of the first electrode and the second portion of the first electrode; and the current interrupter 8 being layered between the second portion of the first electrode and the first current collector 4. In a sub-embodiment of this first aspect of the disclosure, the current limiter 6 is layered between the second portion of the first electrode and the first current collector 4, and the current interrupter 8 is layered between the first portion of the first electrode and the second portion of the first electrode.

In another embodiment of this first aspect of the disclosure, the battery is of a type having two current collectors 4, including a first current collector 4 and a second current collector 4 and the two electrodes (12 and 14) including a first electrode and a second electrode, the improvement further characterized wherein. In this embodiment, the current limiter 6 is layered between the first electrode and the first current collector 4; and the current interrupter 8 being layered between the second electrode and the second current collector 4.

In another embodiment of this first aspect of the disclosure, the battery is of a type wherein each electrode (12 or 14) has a temperature range for safe operation and an internal resistivity therein. In this embodiment, the current limiter 6 has a resistivity greater than the internal resistivity of the electrode (12 or 14) with which the current limiter 6 is layered within the temperature range for safe operation.

In another embodiment of this first aspect of the disclosure, the improvement is further characterized by the current limiter 6 lacking a resistivity transition switch at temperatures within the temperature range for safe operation.

In another embodiment of this first aspect of the disclosure, the battery is of a type wherein each electrode (12 and 14) has a temperature range for standard operation. In this embodiment, the current limiter 6 has a resistivity transition with a resistivity less than the internal resistivity of the electrode (12 and/or 14) within the temperature range for standard operation and a resistivity greater than the internal resistivity of the electrode (12 and/or 14) above the temperature range for standard operation.

In another embodiment of this first aspect of the disclosure, the battery is of a type wherein each electrode (12 and 14) has a temperature range for standard operation. In this embodiment, the current interrupter 8 is activated by temperature above the temperature range for standard operation.

In another embodiment of this first aspect of the disclosure, the battery is of a type wherein each electrode (12 and 14) has a temperature range for standard operation and a temperature range for safe operation. In this embodiment, the current interrupter 8 is activated by temperature above the temperature range for standard operation and within the temperature range for safe operation.

In another embodiment of this first aspect of the disclosure, the battery is of a type wherein each electrode (12 and 14) has an internal resistivity within the temperature range for safe operation. In this embodiment, the current limiter 6 has a resistivity greater than the internal resistivity of the electrode (12 or 14) with which the current limiter 6 is layered within the temperature range for safe operation. In an alternative to this embodiment, the current limiter 6 and the current interrupter 8 are simultaneously incorporated into a protective layer interposed by lamination between the same electrode (12 or 14) and current collector 4.

In another embodiment of this first aspect of the disclosure, the battery is of a type wherein each electrode (12 and 14) has a voltage range for standard operation. In this embodiment, the current interrupter 8 is activated by voltage above the voltage range for standard operation.

In another embodiment of this first aspect of the disclosure, the battery is of a type wherein each electrode (12 and 14) has a voltage range for standard operation and a voltage range for safe operation. In this embodiment, the current interrupter 8 is activated by voltage above the temperature range for standard operation and within the voltage range for safe operation. In an alternative of this embodiment, the current limiter 6 and current interrupter 8 are simultaneously incorporated into a protective layer interposed by lamination between the same electrode (12 or 14) and current collector 4.

A second aspect of the disclosure is directed to another improved high energy density rechargeable battery of a type including two electrodes (12 and 14) of opposite polarity, a separator 2 separating the two electrodes (12 and 14), and at least one current collector 4 electrically coupled to one of the electrodes (12 or 14). The separator 2 prevents internal discharge between the two electrodes (12 and 14). Failure of the separator 2 potentially causes an internal discharge between the two electrodes (12 and 14). The internal discharge causes the generation of joule heat of potential danger.

The improvement for this second aspect of the disclosure comprises a thermally activatable current interrupter 8 and a voltage activatable current interrupter 8.

The thermally activatable current interrupter 8 is layered by lamination between one of the current collectors 4 and one of the electrodes (12 or 14). The thermally activatable current interrupter 8, when unactivated, electrically couples the current collector 4 to the electrode (12 or 14) with which it is layered, the current interrupter 8. When activated, the thermally activatable current interrupter 8 delaminates from the current collector 4 for forming a nonconductive gap for electrically decoupling the current collector 4 from the electrode (12 or 14) with which it had been layered. The electrical decoupling serves to slow the rate of internal discharge between the two electrodes (12 and 14) in the event of separator failure.

The voltage activatable current interrupter 8 is layered by lamination between one of the current collectors 4 and one of the electrodes (12 or 14). The voltage activatable current interrupter 8, when unactivated, electrically couples the current collector 4 to the electrode (12 or 14) with which it is layered. The current interrupter 8, when activated, delaminates from the current collector 4 by forming a nonconductive gap for electrically decoupling the current collector 4 from the electrode (12 or 14) with which it had been layered. The resultant electrical decoupling serves to slow the rate of internal discharge between the two electrodes (12 and 14) in the event of separator failure. In this second aspect of the disclosure, activation of either the thermally activated current interrupter 8 or the voltage activated current interrupter 8 in the event of separator failure, slows the generation joule heat for diminishing the potential danger.

A second aspect of the disclosure is directed to a process for avoiding thermal runaway within a high energy density rechargeable battery undergoing internal discharge due to separator failure. The process comprises the step of delaminating an electrode (12 or 14) within the battery from its current collector 4 by generating a gas from a heat sensitive gas generating material within an interrupt layer interposed between the electrode (12 or 14) and current collector 4. The delamination electrically decouples the electrode (12 or 14) from its current collector 4 for slowing the rate of internal discharge.

A third aspect of the disclosure is directed to a process for avoiding thermal runaway within a high energy density rechargeable battery at risk of suffering from separator failure due to voltage overcharge. The process comprises the step of delaminating an electrode (12 or 14) within the battery from its current collector 4 by generating a gas from a voltage sensitive gas generating material within an interrupt layer interposed between the electrode (12 or 14) and current collector 4. The delamination electrically decouples the electrode (12 or 14) from its current collector 4 for interrupting the voltage overcharge.

A fourth aspect of the disclosure is directed to a process for avoiding thermal runaway within a high energy density rechargeable battery at risk of suffering from separator failure due to voltage overcharge. The process comprises the step of delaminating an electrode (12 or 14) within the battery from its current collector 4 by generating a gas from a voltage or temperature sensitive material that will form the gas indirectly through its decomposition compound (at the high voltage) that will react with the battery components such as electrolyte and electrodes (12 and 14). This voltage or temperature sensitive material will be still called as gas generator, and can be within an interrupt layer interposed between the electrode (12 or 14) and current collector 4. The delamination electrically decouples the electrode (12 or 14) from its current collector 4 for interrupting the voltage overcharge.

BRIEF DESCRIPTION OF DRAWINGS

The present disclosure is described more fully herein with reference to the accompanying drawings, in which some exemplary embodiments of the present disclosure are shown. As those skilled in the art would realize, the described embodiments may be modified in various different ways, all without departing from the spirit or scope of the present disclosure. Accordingly, the drawings and description are to be regarded as illustrative in nature and not restrictive. In the drawings, the thicknesses of layers and regions may be exaggerated for clarity.

FIGS. 1A-1G illustrate schematic representations of exemplary configurations of film-type lithium ion batteries having one or more resistive layers serving as current limiters 6, for protecting the battery against overheating in the event of an internal short circuit, combined with current interrupters 8 that are thermally activatable by an increase in temperature, for irreversibly interrupting the self-discharge process in the event that the battery should overheat or achieve an or unsafe temperature.

FIGS. 2A and 2B illustrate schematic representations of exemplary configurations of film-type lithium ion batteries having one or more layers serving as combined current limiters 6 and current interrupters 8, for protecting the battery against overheating in the event of an internal short circuit, combined with current interrupters 8 that are voltaicly activable by an increase in voltage, for irreversibly interrupting the self-discharge process in the event that the battery should become overcharged.

FIGS. 3A and 3B illustrate schematic representations of exemplary configurations of film-type lithium ion batteries having one or more resistive layers serving a current limiters 6 for protecting the battery against overheating in the event of an internal short circuit, combined with current interrupters 8 that are thermally activable by an increase in temperature, for irreversibly interrupting the self-discharge process in the event that the battery should overheat or achieve an or unsafe temperature, and further combined with current interrupters 8 that can be activated by an increase in voltage, for irreversibly interrupting the self-discharge process in the event that the battery should become overcharged.

FIGS. 13A and 13B illustrate exemplified Cell compositions.

FIG. 14 illustrates the various positive electrode 14 formulations used in chemical decomposition voltage measurements.

DETAILED DESCRIPTION

Figures 4A, 4B, 4C, 4D:
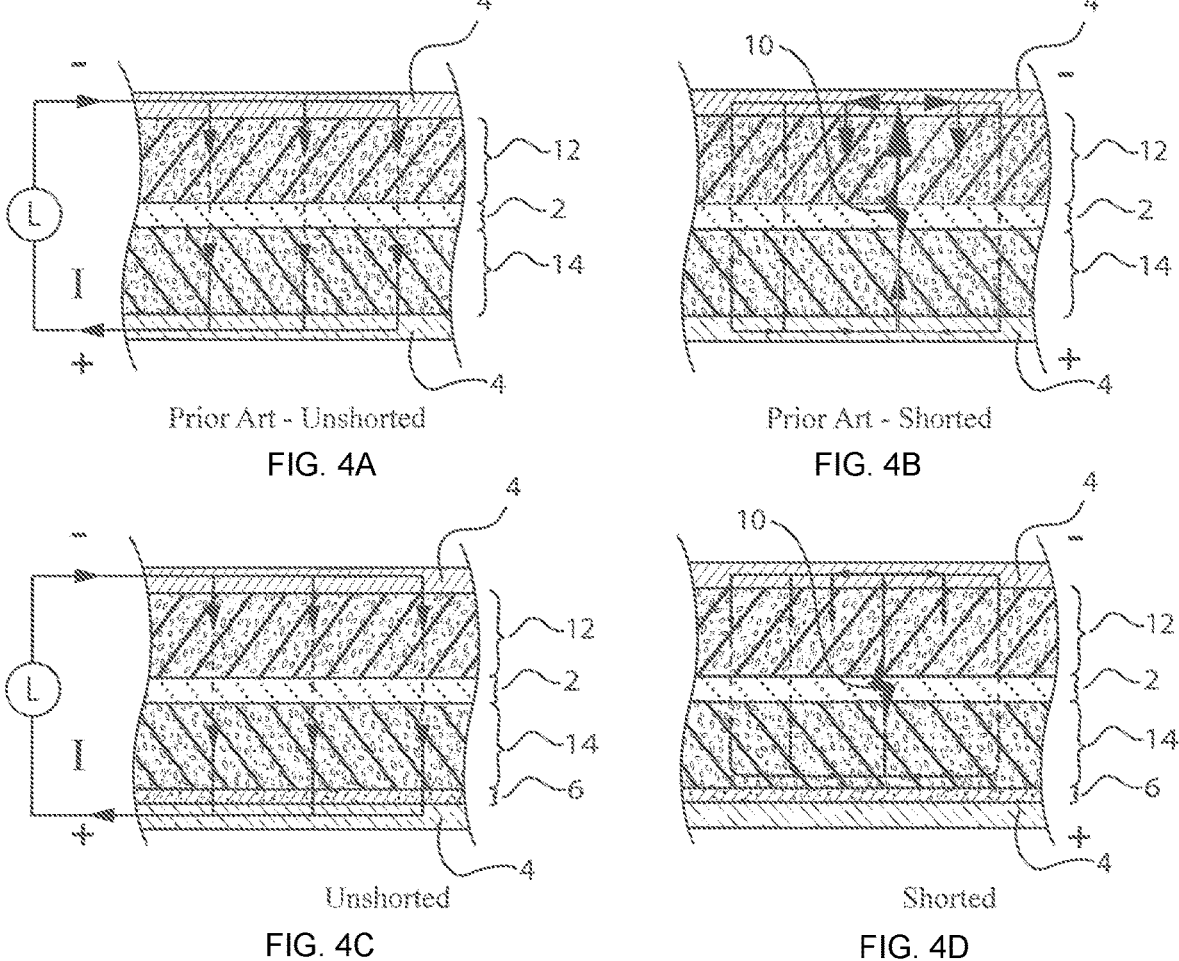
FIGS. 4A-4D illustrates cross sectional views of prior art film-type lithium ion batteries (FIGS. 4A and B) and of film-type lithium ion batteries of the present disclosure (FIGS. 4C and D).

Safe, long-term operation of high energy density rechargeable batteries, including lithium ion batteries, is a goal of battery manufacturers. One aspect of safe battery operation is controlling the heat generated by rechargeable batteries. As described above, many factors may cause the heat generated by a rechargeable battery to exceed its heat dissipation capacity, such as a battery defect, accident, or excessive internal current. When the heat generated by a battery exceeds its ability to dissipate heat, a rechargeable battery becomes susceptible to thermal runaway, overheating, and possibly even fire or violent explosion. Described below are apparatus and methods associated with a thermally activated internal current interrupter that can interrupt the internal circuit of a rechargeable battery, preventing thermal runaway.

Another aspect of safe battery operation is controlling the reactions at the electrodes of these rechargeable batteries during both battery charging and discharge. As described above, electrical current flows outside the battery, through an external circuit during use, while ions move from one electrode to another within the battery. In some cases, overcharge occurs and can lead to thermal runaway within the battery. Described below are apparatus and methods associated with an internal current limiter that limits the rate of internal discharge in a rechargeable battery when there is an internal short circuit.

A further aspect of safe battery operation is controlling the discharge of these rechargeable batteries. As described above, a separator, or barrier layer, is used to separate the negative and positive electrodes in rechargeable batteries in which ions can move through the battery, but electrical current is forced to flow outside the battery, through an external circuit. Many factors may cause the separator to be breached, and may cause a short-circuit to occur within a rechargeable battery. A short-circuit leads to rapid discharge and possibly overheating and thermal runaway. Described below are apparatus and methods associated with an internal current limiter that limits the rate of internal discharge in a rechargeable battery when there is an internal short circuit.

The terminology used herein is for the purpose of describing some particular exemplary embodiments only and is not intended to be limiting of the disclosure. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," etc. may be used herein to describe various members, elements, regions, layers and/or parts, these members, elements, regions, layers and/or parts should not be limited by these terms. These terms may be used merely to distinguish one member, element, region, layer and/or part from another member, element, region, layer and/or part. Thus, for example, a first member, element, region, layer and/or part discussed below could be termed a second member, element, region, layer and/or part without departing from the teachings of the present disclosure.

FIGS. 1A-1G illustrate schematic representations of exemplary configurations of film-type lithium ion batteries having one or more resistive layers serving as current limiters (6 in FIGS. 4A-4D), for protecting the battery against overheating in the event of an internal short circuit, combined with current interrupters 8 that are thermally activatable by an increase in temperature, for irreversibly interrupting the self-discharge process in the event that the battery should overheat or achieve an or unsafe temperature. FIGS. 1A and 1C show configurations for batteries with a cathode current collector 101, a cathode energy layer 102, a separator 103, an anode energy layer 104, a resistive limiter and thermal interrupt layer 105, and an anode current collector 106. The configuration shown in FIG. 1B has a cathode current collector 101, a cathode energy layer 102, a separator 103, a first anode energy layer 107, a resistive limiter and thermal interrupt layer 105, a second anode energy layer 108, and an anode current collector 106. FIG. 1D shows a configuration a cathode current collector 101, a first cathode energy layer 109, a separator 103, a second cathode energy layer 110, a resistive limiter and thermal interrupt layer 105, an anode energy layer 104, and an anode current collector 106. FIGS. 1E-1G show configurations for batteries with a cathode current collector 101, a cathode energy layer 102, a separator 103, an anode energy layer 104, a first resistive limiter and thermal interrupt layer 111, a second resistive limiter and thermal interrupt layer 112, an anode energy layer 104, and an anode current collector 106.

FIGS. 2A and 2B illustrate schematic representations of exemplary configurations of film-type lithium ion batteries having one or more layers serving as combined current limiters 6 and current interrupters 8, for protecting the battery against overheating in the event of an internal short circuit, combined with current interrupters 8 that are voltaicly activable by an increase in voltage, for irreversibly interrupting the self-discharge process in the event that the battery should become overcharged. FIG. 2A shows a configuration for a battery with an anode current collector 201, an anode energy layer 202, a separator 203, a cathode energy layer 204, a resistive limiter and thermal interrupt layer 205, and a cathode current collector 206. The configuration shown in FIG. 2B has an anode current collector 201, an anode energy layer 202, a separator 203, a first cathode energy layer 207, a resistive limiter and thermal interrupt layer 205, a second cathode energy layer 208, and a cathode current collector 206.

FIGS. 3A and 3B illustrate schematic representations of exemplary configurations of film-type lithium ion batteries having one or more resistive layers serving a current limiters 6 for protecting the battery against overheating in the event of an internal short circuit, combined with current interrupters 8 that are thermally activable by an increase in temperature, for irreversibly interrupting the self-discharge process in the event that the battery should overheat or achieve an or unsafe temperature, and further combined with current interrupters 8 that can be activated by an increase in voltage, for irreversibly interrupting the self-discharge process in the event that the battery should become overcharged. FIG. 3A shows a configuration for a battery with an anode current collector 301, an anode energy layer 302, a separator 303, a cathode energy layer 304, a resistive limiter, thermal interrupt, and voltaic interrupt layer 305, and a cathode current collector 306. The configuration shown in FIG. 3B has an anode current collector 301, an anode energy layer 302, a separator 303, a first cathode energy layer 307, a resistive limiter, thermal interrupt, and voltaic interrupt layer 305, a second cathode energy layer 308, and a cathode current collector 306.

FIGS. 4C and D illustrate the film-type lithium ion batteries of FIG. 1A, 2A, or 3A. More particularly, FIGS. 4A-4D illustrates the current flow through film-type lithium ion batteries undergoing discharge for powering a load (L). FIGS. 4A and C illustrate the current flow of film-type lithium ion batteries having an intact fully operational separator 2 (unshorted). FIGS. 4B and D illustrate the current flow of film-type lithium ion batteries having resistive layer serving as a current limiter 6, wherein the separator 2 has been short circuited by a conductive dendrite 10 penetrating therethrough. In FIGS. 4B and D, the cells are undergoing internal discharge due to a dendrite 10 penetrating the separator 2. Note that devices with unshorted separators 2 (FIGS. 4A and C) and the prior art device with the shorted separator 2 (FIG. 4B), current flows from one current collector 4 to the other. However, in the exemplary device of the present disclosure having a shorted separator 2 and resistive layer 6 (FIG. 4D), current flow is diverted from the current collector 4 and is much reduced. In FIG. 4D, the interrupter 8 has not been triggered.

Figures 5A, 5B, 5C, 5D:
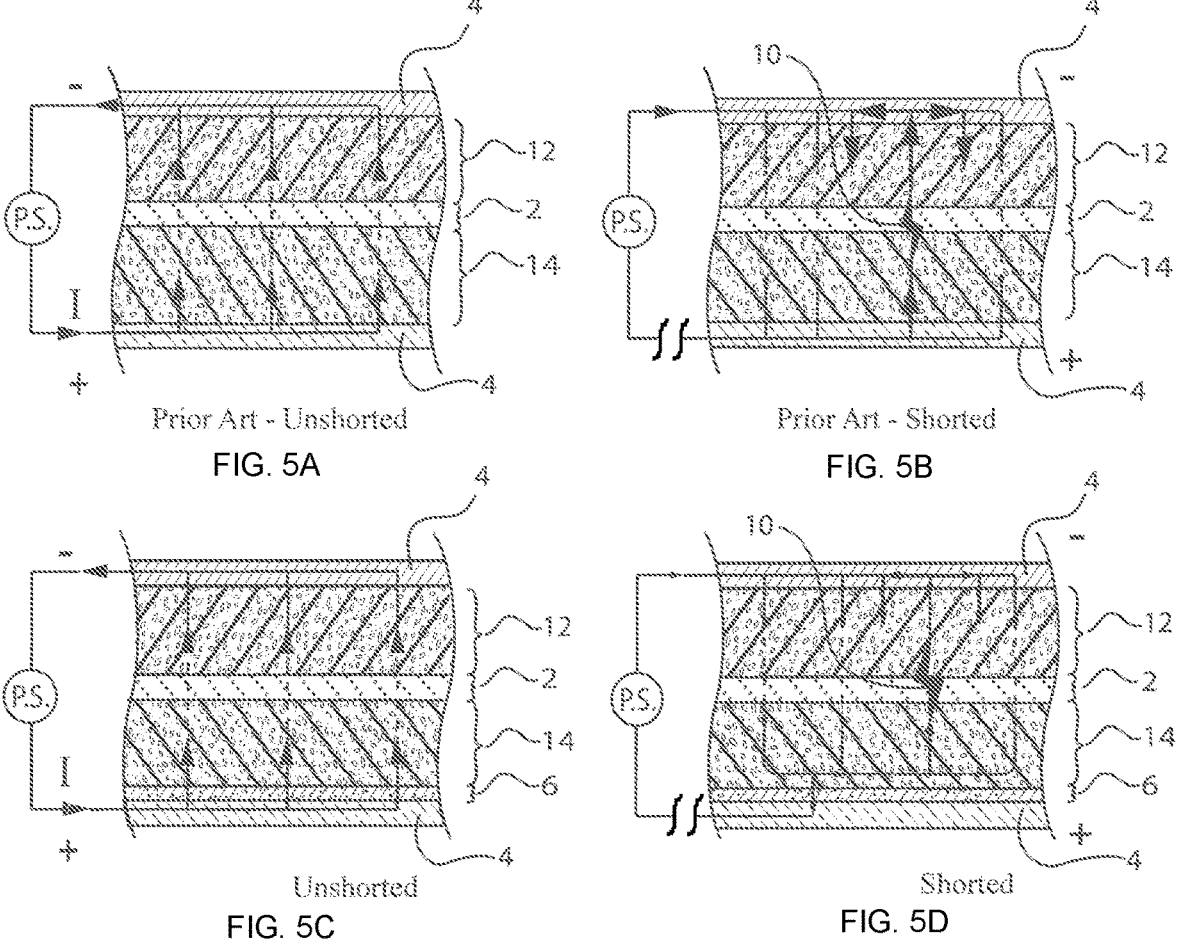
FIGS. 5A-5D illustrate cross sectional views of prior art film-type lithium ion batteries (FIGS. 5A and B) and of film-type lithium ion batteries of the present disclosure (FIGS. 5C and D).

FIGS. 5C and D illustrate the film-type lithium ion batteries of FIG. 1A, 2A, or 3A. More particularly, FIGS. 5A-5D illustrate the current flow through film-type lithium ion batteries while it's being charged by a smart power supply (PS) that will stop the charging when it detects the any abnormal charge voltage. FIGS. 5A and C illustrate the current flow of film-type lithium ion batteries having an intact fully operational separator 2 (unshorted). FIGS. 5B and D illustrate the current flow of film-type lithium ion batteries having a separator 2 shorted by a conductive dendrite 10. Note that devices with unshorted separators 2 (FIGS. 5A and C) and the prior art device with the shorted separator 2 (FIG. 5B), current flows from one current collector 4 to the other. However, in the exemplary device of the present disclosure having a shorted separator 2 and resistive layer 6 (FIG. 5D), current flow is diverted from the current collector 4 and is much reduced. In FIG. 5D, the interrupter 8 has not been triggered.

Figures 6A, 6B, 6C, 6D:
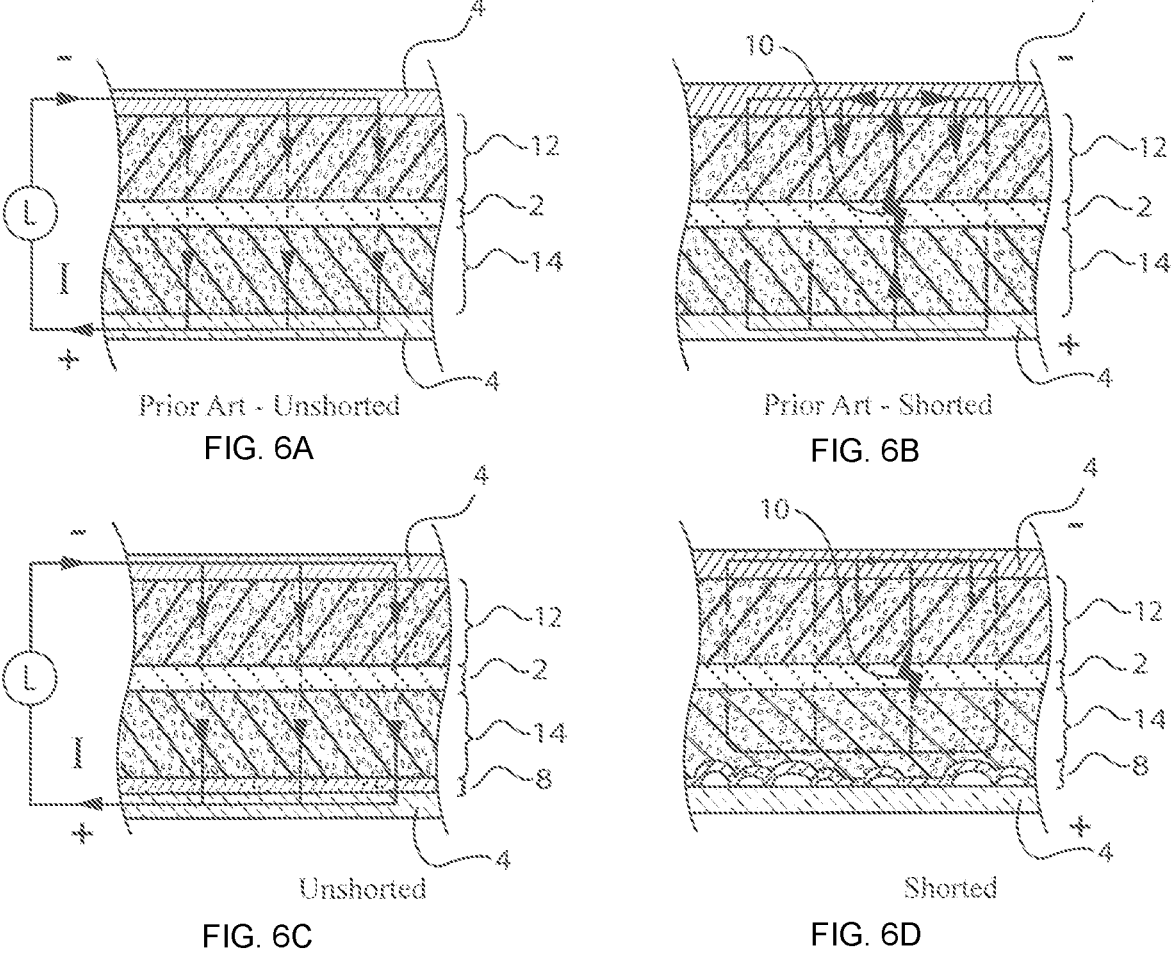
FIGS. 6A-6D illustrate cross sectional views of prior art film-type lithium ion batteries (FIGS. 6A and B) and of film-type lithium ion batteries of the present disclosure (FIGS. 6C and D).

FIGS. 6C and D illustrate the film-type lithium ion batteries of FIG. 1A, 2A, or 3A, after the interrupter 8 has been triggered by excessive temperature or voltage. More particularly, FIGS. 6A-6D illustrate the current flow through film-type lithium ion batteries undergoing discharge for powering a load (L). FIGS. 6A and C illustrate the current flow of film-type lithium ion batteries having an intact fully operational separator 2 (unshorted). FIGS. 6B and D illustrate the current flow of film-type lithium ion batteries having a short circuit caused by a conductive dendrite 10 penetrating the separator 2. Note that devices with unshorted separators 2 (FIGS. 6A and C) and the prior art device with the shorted separator 2 (FIG. 6B), current flows from one current collector 4 to the other. However, in the exemplary device of the present disclosure having a shorted separator 2 and both a resistive layer (current limiter 6) and a current interrupter 8 (FIG. 6D), current flow is diverted from the current collector 4 and is much reduced. In FIG. 6D, the interrupter 8 has been triggered.

Figures 7A, 7B, 7C, 7D:
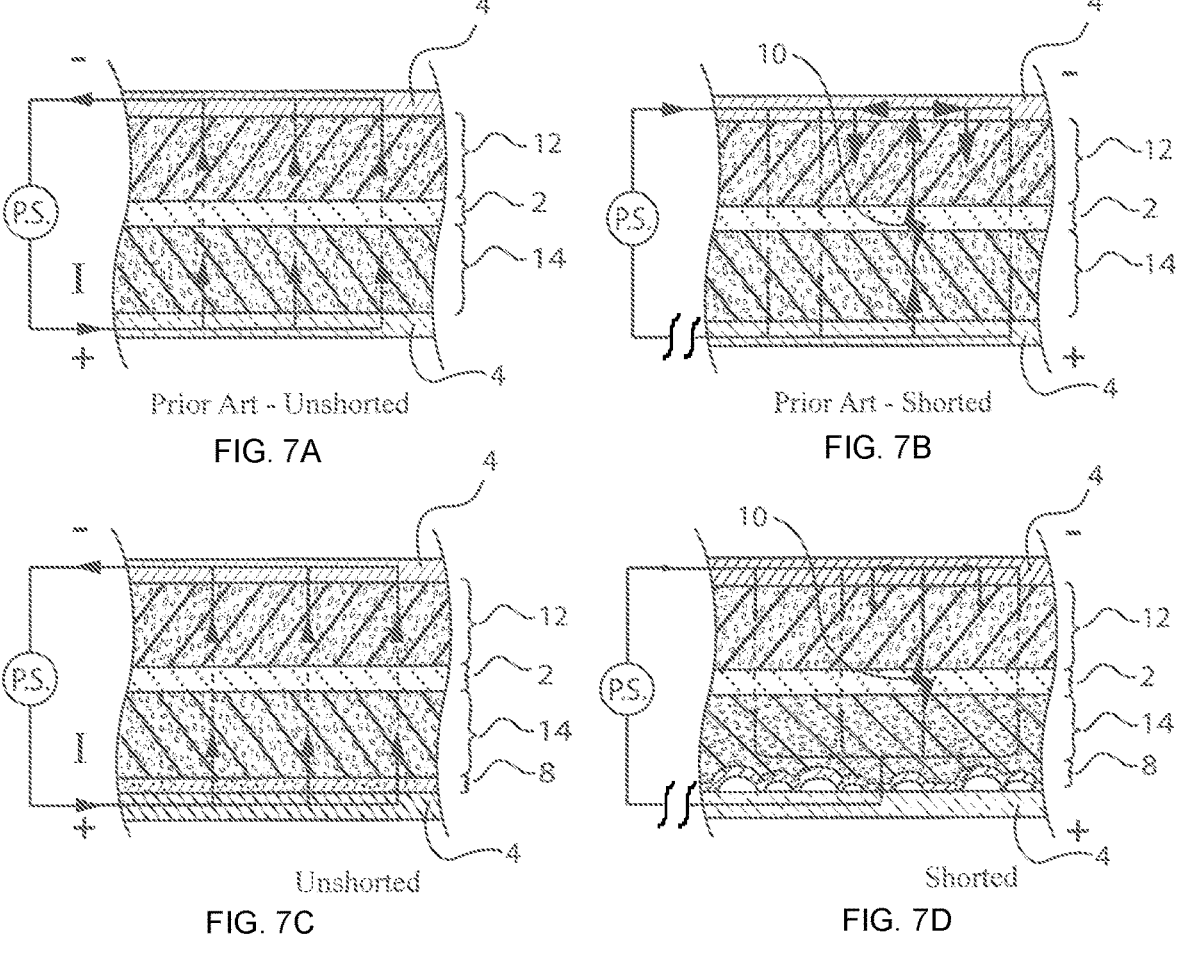
FIGS. 7A-7D illustrates cross sectional views of prior art film-type lithium ion batteries (FIGS. 7A and B) and of film-type lithium ion batteries of the present disclosure (FIGS. 7C and D).

FIGS. 7C and D illustrate the film-type lithium ion batteries of FIG. 1A, 2A, or 3A, after the interrupter 8 has been triggered by excessive temperature or voltage. More particularly, FIG. 7 illustrates the current flow through film-type lithium ion batteries while it's being charged by a smart power supply (PS) which will stop the charging when it detects any abnormal charging voltage. FIGS. 7A and C illustrate the current flow of film-type lithium ion batteries having an intact fully operational separator 2 (unshorted). FIGS. 7B and D illustrate the current flow of film-type lithium ion batteries having a having a short circuit caused by a separator 2 shorted by a dendrite 10. Note that devices with unshorted separators 2 (FIGS. 7A and C) and the prior art device with the shorted separator 2 (FIG. 7B), current flows from one current collector 4 to the other. However, in the exemplary device of the present disclosure having a shorted separator 2 and resistive layer 6 (current limiter 6) (FIG. 7D), current flow is diverted from the current collector 4 and is much reduced. In FIG. 7D, the interrupter 8 has been triggered.

Figures 8A, 8B, 8C, 8D:
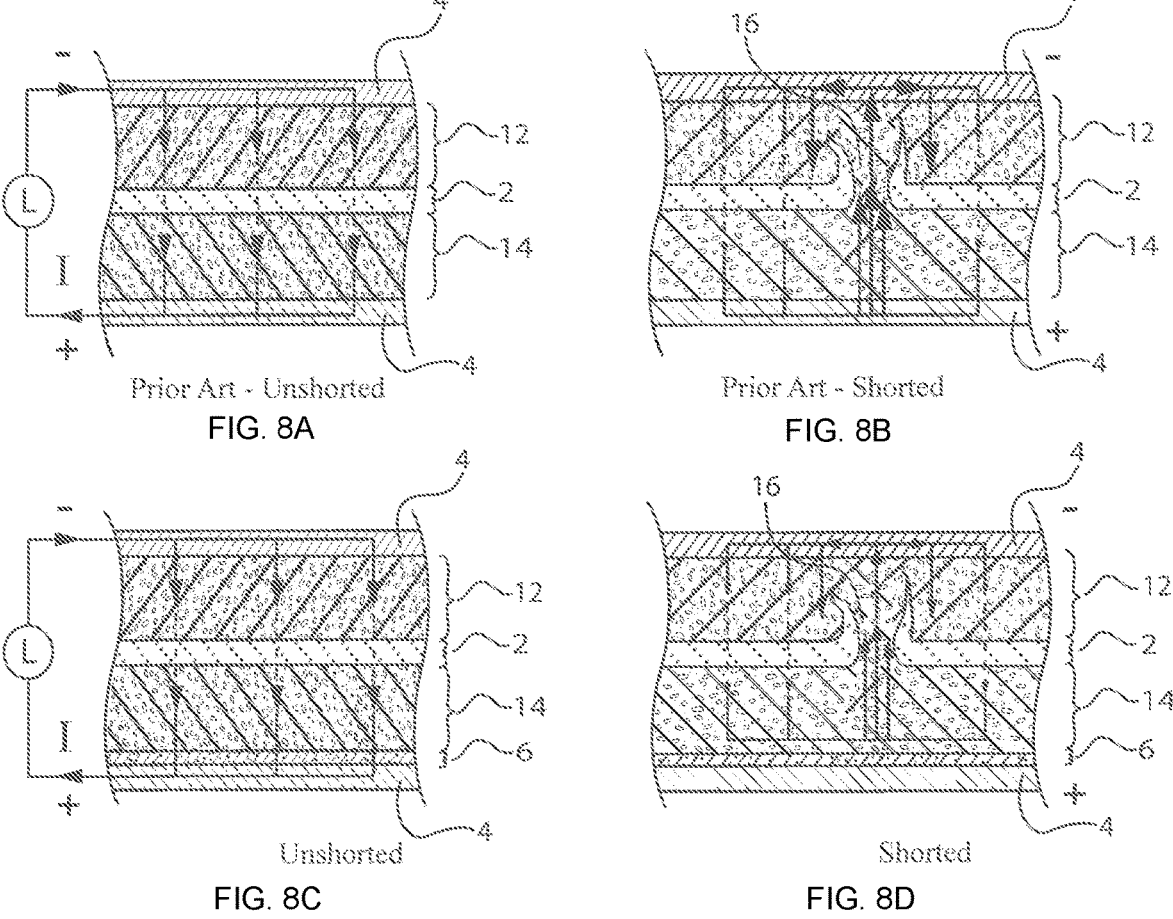
FIGS. 8A-8D illustrate cross sectional views of prior art film-type lithium ion batteries (FIGS. 8A and B) and of film-type lithium ion batteries of the present disclosure (FIGS. 8C and D).

FIGS. 8C and D illustrate the film-type lithium ion batteries of FIG. 1A, 2A, or 3A. More particularly, FIGS. 8A-8D illustrate the current flow through film-type lithium ion batteries undergoing discharge for powering a load (L). FIGS. 8A and C illustrate the current flow of film-type lithium ion batteries having an intact fully operational separator 2 (unshorted). FIGS. 8B and D illustrate the current flow of film-type lithium ion batteries having resistive layer serving as a current limiter 6, wherein the separator 2 has been short circuited by a disruption 16. In FIGS. 8B and D, the cells are undergoing internal discharge due to a breach 16 penetrating the separator 2. Note that devices with unshorted separators 2 (FIGS. 8A and C) and the prior art device with the shorted separator 2 (FIG. 8B), current flows from one current collector 4 to the other. However, in the exemplary device of the present disclosure having a shorted separator 2 and resistive layer 6 (FIG. 8D), current flow is diverted from the current collector 4 and is much reduced. In FIG. 8D, the interrupter 8 has not been triggered.

Figures 9A, 9B, 9C, 9D:
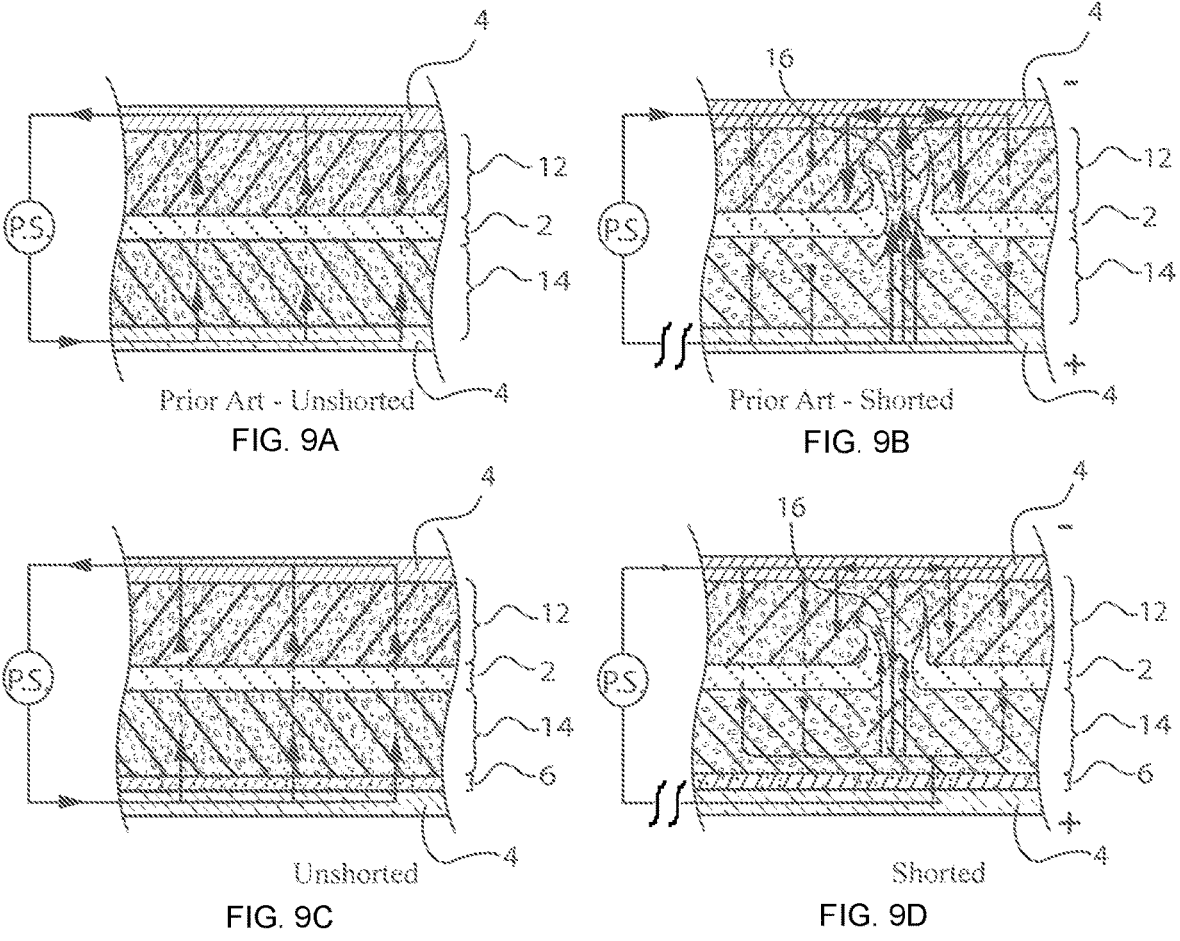
FIGS. 9A-9D illustrate cross sectional views of prior art film-type lithium ion batteries (FIGS. 9A and B) and of film-type lithium ion batteries of the present disclosure (FIGS. 9C and D).

FIGS. 9C and D illustrate the film-type lithium ion batteries of FIG. 1A, 2A, or 3A. More particularly, FIGS. 9A-9D illustrate the current flow through film-type lithium ion batteries while it's being charged by a smart power supply (PS) that will stop the charging when it detects any abnormal charge voltage. FIGS. 9A and C illustrate the current flow of film-type lithium ion batteries having an intact fully operational separator 2 (unshorted). FIGS. 9B and D illustrate the current flow of film-type lithium ion batteries having a having a separator 2 shorted by a by a disruption 16. Note that devices with unshorted separators 2 (FIGS. 9A and C) and the prior art device with the shorted separator 2 (FIG. 9B), current flows from one current collector 4 to the other. However, in the exemplary device of the present disclosure having a shorted separator 2 and resistive layer 6 (FIG. 9D), current flow is diverted from the current collector 4 and is much reduced. In FIG. 9D, the interrupter 8 has not been triggered.

Figures 10A, 10B, 10C, 10D:
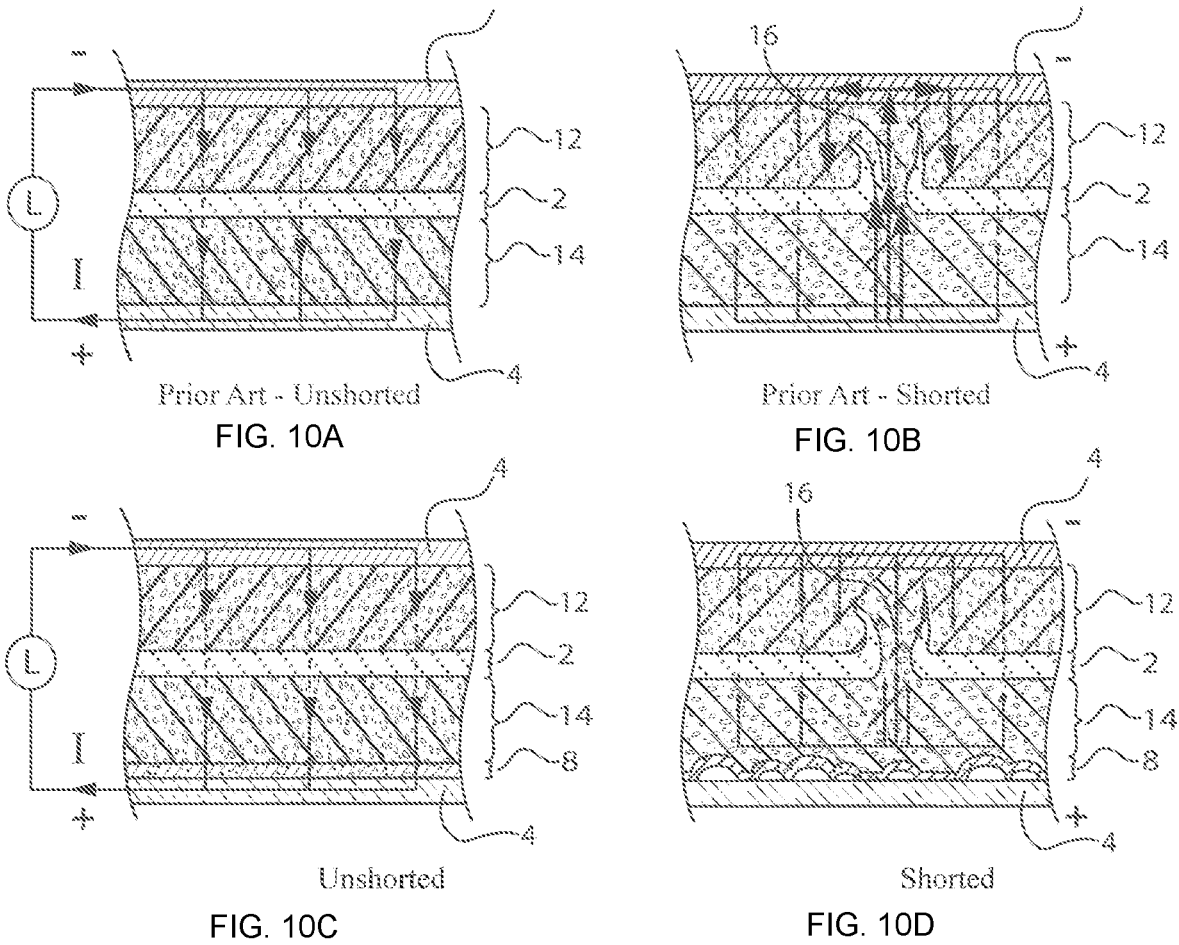
FIGS. 10A-10D illustrate cross sectional views of prior art film-type lithium ion batteries (FIGS. 10A and B) and of film-type lithium ion batteries of the present disclosure (FIGS. 10C and D).

FIGS. 10C and D illustrate the film-type lithium ion batteries of FIG. 1A, 2A, or 3A, after the interrupter 8 has been triggered by excessive temperature or voltage. More particularly, FIGS. 10A-10D illustrate the current flow through film-type lithium ion batteries undergoing discharge for powering a load (L). FIGS. 10A and C illustrate the current flow of film-type lithium ion batteries having an intact fully operational separator 2 (unshorted). FIGS. 10B and D illustrate the current flow of film-type lithium ion batteries having a short circuit caused by a disruption 16. Note that devices with unshorted separators 2 (FIGS. 10A and C) and the prior art device with the shorted separator 2 (FIG. 10B), current flows from one current collector 4 to the other. However, in the exemplary device of the present disclosure having a shorted separator 2 and both a resistive layer (current limiter 6) and a current interrupter 8 (FIG. 6D), current flow is diverted from the current collector 4 and is much reduced. In FIG. 10D, the interrupter 8 has been triggered.

Figures 11A, 11B, 11C, 11D:
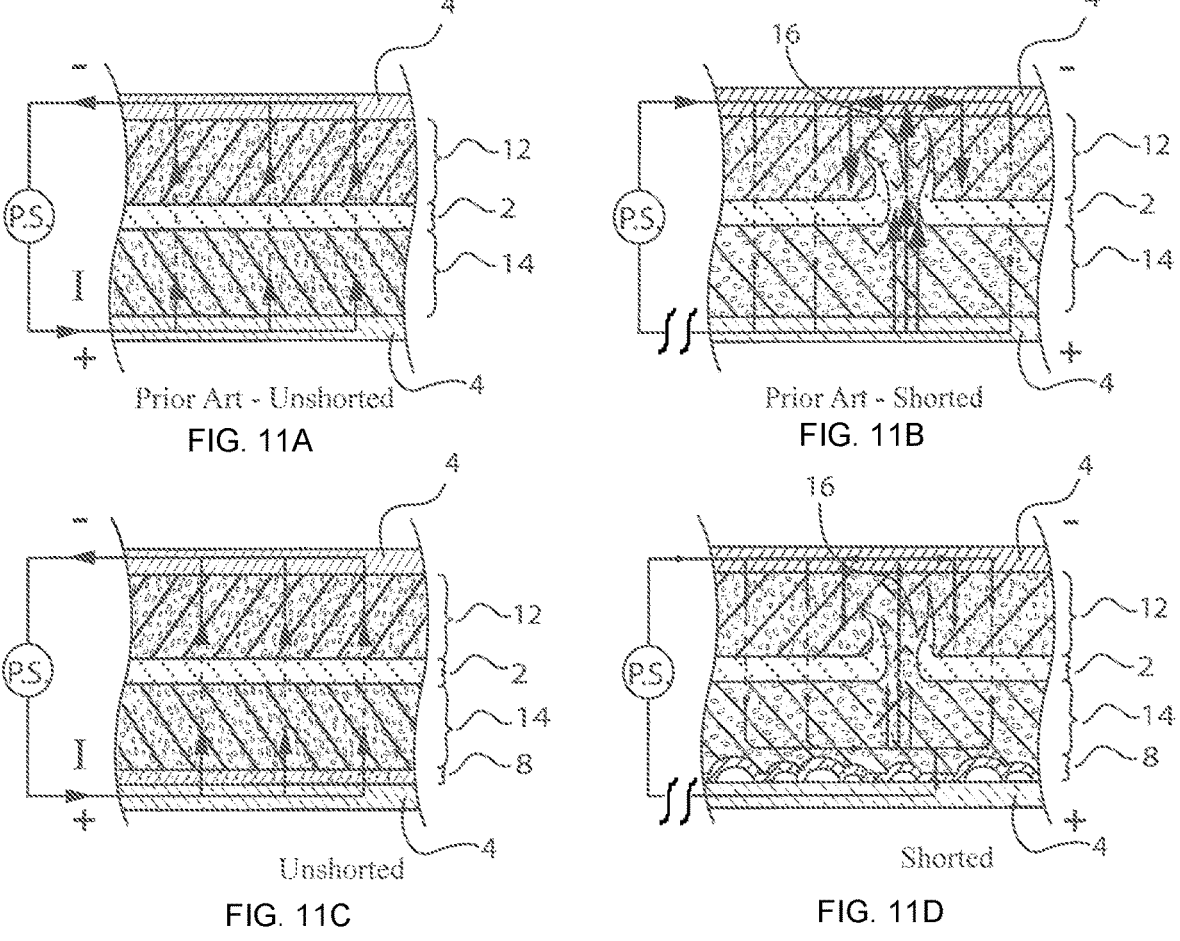
FIGS. 11A-11D illustrate cross sectional views of prior art film-type lithium ion batteries (FIGS. 11A and B) and of film-type lithium ion batteries of the present disclosure (FIGS. 11C and D).

FIGS. 11C and D illustrate the film-type lithium ion batteries of FIG. 1A, 2A, or 3A, after the interrupter 8 has been triggered by excessive temperature or voltage. More particularly, FIGS. 11A-11D illustrate the current flow through film-type lithium ion batteries while it's being charged by a smart power supply (PS) that will stop the charging when it detects any abnormal charge voltage. FIGS. 11A and C illustrate the current flow of film-type lithium ion batteries having an intact fully operational separator 2 (unshorted). FIGS. 11B and D illustrate the current flow of film-type lithium ion batteries having a having a short circuit caused by a separator 2 shorted by a disruption 16. Note that devices with unshorted separators 2 (FIGS. 11A and C) and the prior art device with the shorted separator 2 (FIG. 11B), current flows from one current collector 4 to the other. However, in the exemplary device of the present disclosure having a shorted separator 2 and resistive layer 6 (current limiter 6) (FIG. 11D), current flow is diverted from the current collector 4 and is much reduced. In FIG. 11D, the interrupter 8 has been triggered.

Figures 12A, 12B, 12C:
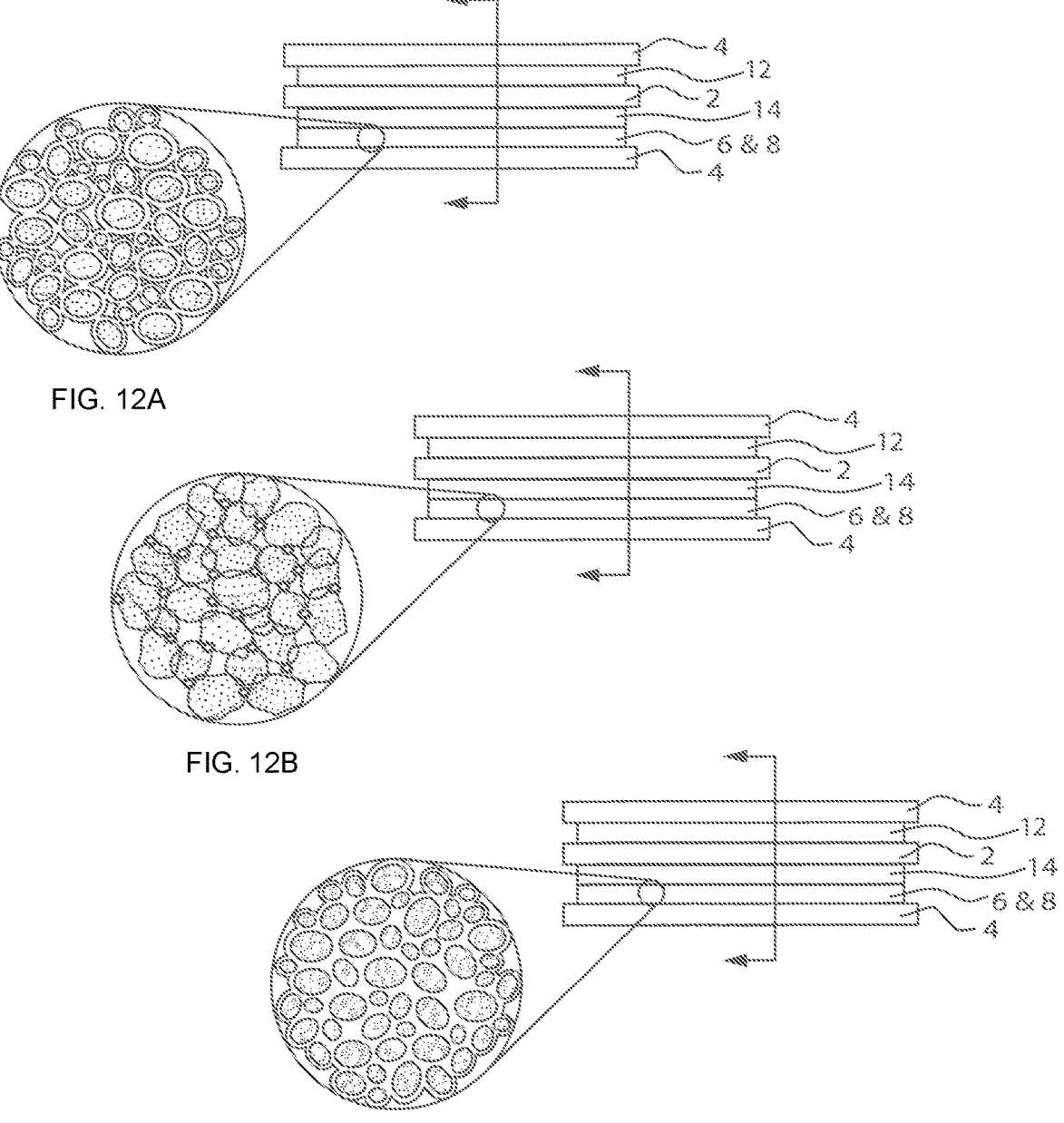
FIGS. 12A-12C illustrates exemplary structures for the combined current limiter 6 and current interrupter 8.

FIG. 12A illustrates resistive layer 6 having a high proportion of ceramic particles coated with binder. Interstitial voids between the coated ceramic particles render the resistive layer 6 porous. FIG. 12B illustrates resistive layer 6 having a high proportion of ceramic particles bound together by particles of binder. Interstitial voids between the coated ceramic particles render the resistive layer 6 porous. FIG. 12C illustrates resistive layer 6 having an intermediate proportion of ceramic particles (less than 80%) held together with binder. The resistive layer 6 lacks interstitial voids between the coated ceramic particles and is non-porous.

Current Limiter

A first aspect of the disclosure is directed to an improved HEDR battery of a type including an anode energy layer 12, a cathode energy layer 14, a separator 2 between the anode energy layer 12 and the cathode energy layer 14 for preventing internal discharge thereof, and at least one current collector 4 for transferring electrons to and from either the anode or cathode energy layer. The anode and cathode energy layers each have an internal resistivity. The HEDR battery has a preferred temperature range for discharging electric current and an upper temperature safety limit. The improvement is employable, in the event of separator failure, for limiting the rate of internal discharge through the failed separator and the generation of joule heat resulting therefrom. More particularly, the improvement comprises a resistive layer 6 interposed between the separator and one of the current collectors 4 for limiting the rate of internal discharge through the failed separator in the event of separator failure. The resistive layer 6 has a fixed resistivity at temperatures between the preferred temperature range and the upper temperature safety limit. The fixed resistivity of the resistive layer 6 is greater than the internal resistivity of either energy layer. The resistive layer 6 helps the battery avoid temperatures in excess of the upper temperature safety limit in the event of separator failure.

Some embodiments of the present disclosure include an improved high energy density rechargeable battery are of a type including:

1. two electrodes (12 and 14) of opposite polarity, each electrode characterized by its resistivity, by its safe operating temperature range, and its safe charging voltage; the two electrodes being subject to a risk of overcharge above the safe charging voltage and the formation of the short circuit therefrom; the two electrodes being subject to a risk of thermal runaway above the safe operating temperature range.

2. a separator 2 for separating the two electrodes and preventing internal discharge therebetween; the separator being subject to a risk of forming a short circuit, the short circuit potentially allowing a rapid internal discharge between the two electrodes, the rapid internal discharge between the two electrodes potentially allowing a rapid production of joule heat therefrom, the rapid production of joule heat potentially allowing a thermal runaway.

3. at least one electrode employing a current collector 4 for transferring electrons.

4. a current limiter 6 forming an electrical coupling between one of the electrodes and its corresponding current collector, the current limiter having a resistivity for resistively impeding current therethrough and, in the event the separator forms the short circuit, for diverting current from the electrode current collector to which it is coupled, and for reducing the rate of the internal discharge between the two electrodes.

5. a current interrupter 8 having an engaged configuration, an disengaged configuration, and a gas generating component for transitioning the current interrupter from the engaged to the unengaged configuration, the gas generating component having a trigger for generating a gas, the trigger being selected from the group consisting of temperature triggers and voltage triggers, the temperature triggers being activatable above the safe operating temperature range; the voltage triggers being activatable above the safe charging voltage; in the engaged configuration, the current interrupter electrically coupling one of the electrodes and its corresponding current collector with a laminated connection, in the disengaged configuration, the laminated connection becoming delaminated and the current interrupter forming a nonconductive gap for interrupting the electrical coupling between the electrode and its corresponding current collector, the current interrupter transitioning from the engaged to the disengaged configuration by triggering the gas generating component responsive to the trigger, the generated gas delaminating the laminated connection for interrupting the electrical coupling between the electrode and its corresponding current collector, whereby the current limiter and the current interrupter, in combination, diminishing the risk of thermal runaway resulting from separator short circuit, electrode overcharge, and electrode overheating.

In some embodiments, the current interrupter is triggered by temperature.

In some embodiments, the current interrupter includes a layer containing a single gas generating component triggered by temperature.

In some embodiments, the current interrupter is triggered by voltage.

In some embodiments, the current interrupter includes a layer containing a single gas generating component triggered by voltage.

In some embodiments, the current interrupter is triggered by temperature and voltage.

In some embodiments, the current interrupter includes a layer containing a single gas generating component triggered by temperature and voltage.

In some embodiments, the current interrupter includes a layer containing two gas generating components, one triggered by temperature and the other triggered by voltage.

In some embodiments, the current interrupter may include a layer containing one or more inorganic gas generating compounds that generate gas at a specific temperature or voltage.

Figures 31, 32:
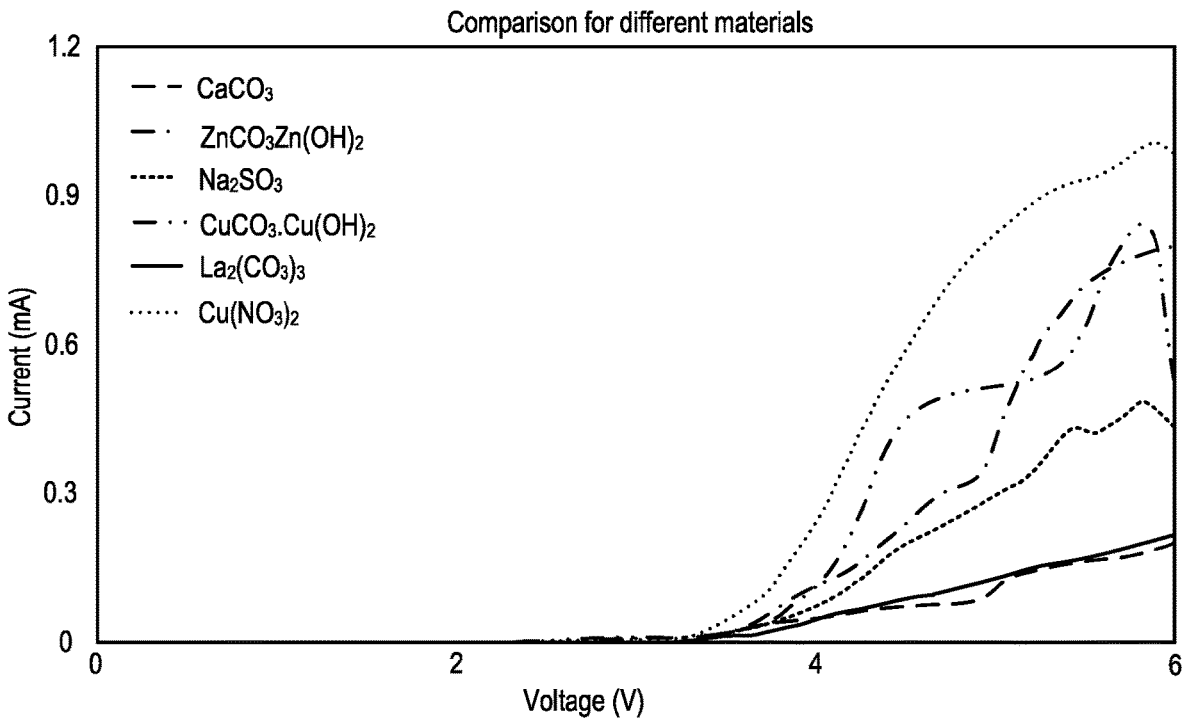
FIG. 31 illustrates the current profiles vs the voltage at room temperature for compounds (gas generators) containing different anions for potential use in rechargeable batteries with different operation voltage. The peak current and voltages are listed in FIG. 32. The peak current for Cu(NO$_3$)$_2$ was the highest while the peak current for CaCO$_3$ was the lowest. The peak voltage for Cu(NO$_3$)$_2$ was the lowest while the peak voltage of CaCO$_3$ was the highest. Therefore, Cu(NO$_3$)$_2$ may be useful in lithium ion batteries with a relatively low operation voltage such as lithium ion cell using lithium iron phosphate positive electrode (3.7 V as the typical maximum charging voltage). CaCO$_3$ may be useful in lithium ion batteries with a high operation voltage like lithium ion cell using the high voltage positive such as lithium cobalt oxide (4.2V as the typical maximum charging voltage) or lithium nickel cobalt manganese oxides (4.3 or 4.4V as the typical high charging voltage).
FIG. 32 summarizes the peak current and voltage for compounds containing different anions.

In some embodiments, the inorganic gas generating compounds are selected from the group consisting of $CaCO_3$, $La_2(CO_3)_3$, $Na_2SO_3$, $ZnCO_3Zn(OH)_2$, $CuCO_3Cu(OH)_2$, and $Cu(NO_3)_2$ as disclosed in FIG. 32.

In some embodiments, the current interrupter may include a layer containing one or more organic gas generating compounds that generate gas at a specific temperature or voltage.

Figures 33, 34:
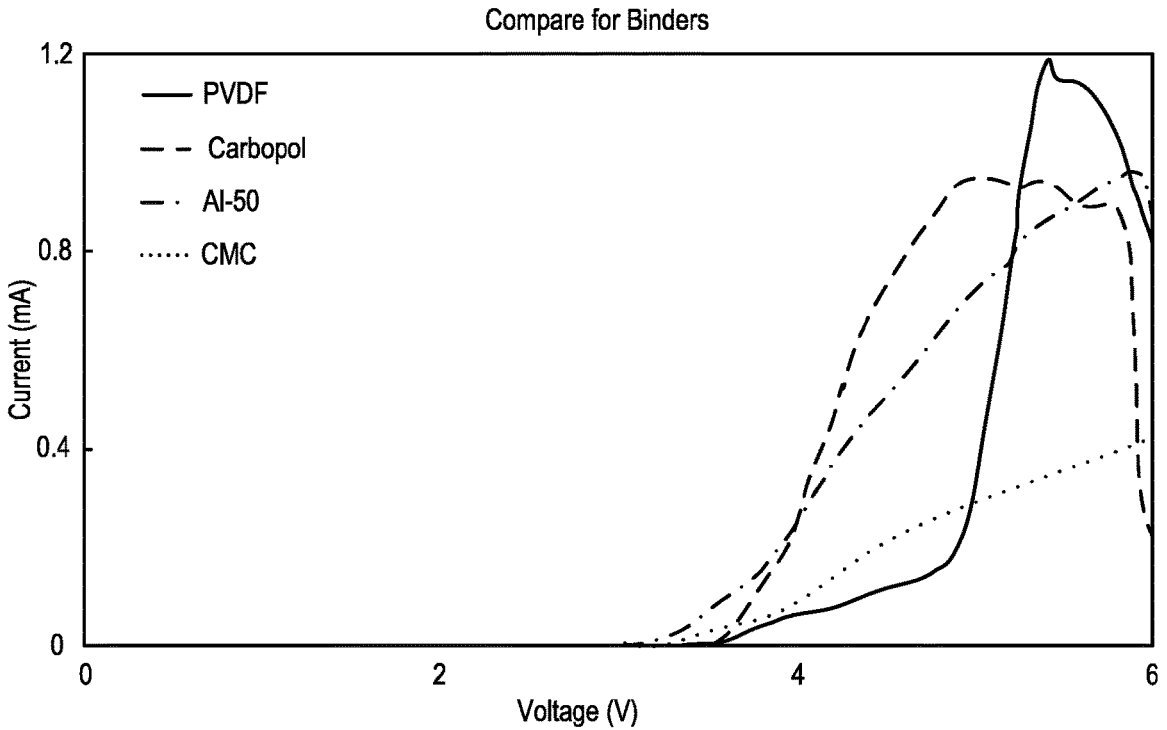
FIG. 33 illustrates the current profiles vs the voltage for the polymers (organic gas generators) with or without different anions for potential use in rechargeable batteries with different operation voltage. PVDF is included as the reference. The peak current and voltages are listed in FIG. 34. The peak current for Carbopol, AI-50 and PVDF were very similar while CMC was the lowest. The peak voltage of Carbopol was the lowest while the CMC peak voltage was the highest. Therefore, Carbopol containing CO$_3^{2-}$ anion maybe useful in lithium ion batteries with a relatively low operation voltage such as lithium ion cell using lithium iron phosphate positive electrode (3.7 V as the typical maximum charging voltage). CMC maybe useful in lithium ion batteries with a high operation voltage like lithium ion cell using the high voltage positive such as lithium cobalt oxide (4.2V as the typical maximum charging voltage) or lithium nickel cobalt manganese oxides (4.3 or 4.4V as the typical high charging voltage). Water is one of CMC decomposition compound and will react with the electrolyte and intercalated lithium in the negative graphite electrode to generate the gases such as hydrogen fluoride (HF) and oxygen (O$_2$) besides being vapor or gas above 100° C.
FIG. 34 summarizes the peak current and voltage for polymers with or without different anions.

In some embodiments, the organic gas generating compounds are selected from the group consisting of Carbopol, Torlon® AI-50, CMC, and PVDF as disclosed in FIG. 34.

In some embodiments, the current interrupter may include a layer containing a combination of inorganic and organic gas generating compounds that generate gas at a specific temperature or voltage.

In some embodiments of the improved high energy density rechargeable battery, the current limiter and the current interrupter are simultaneously incorporated into a protective layer interposed by lamination between the same electrode and current collector, as disclosed in FIGS. 1A, 1C, and 2A.

In some embodiments of the improved high energy density rechargeable battery, the current limiter and the current interrupter triggered by both temperature and voltage are simultaneously incorporated into a protective layer interposed by lamination between the same electrode and current collector, as disclosed in FIG. 3A.

In some embodiments, the improved high energy density rechargeable battery is of a type having two current collectors, including a first current collector and a second current collector, the two electrodes including a first electrode and a second electrode, the improvement further characterized wherein:

the current limiter and the current interrupter are simultaneously incorporated into a first protective layer interposed by lamination between the first electrode and the first current collector; and the current limiter and the current interrupter are simultaneously incorporated into a second protective layer interposed by lamination between the second electrode and the second current collector, as disclosed in FIG. 1E.

In some embodiments, the improved high energy density rechargeable battery is of a type having two current collectors, including a first current collector and a second current collector, the two electrodes including a first electrode and a second electrode, the improvement further characterized wherein:

the current limiter and the current interrupter are simultaneously incorporated into a first protective layer interposed by lamination between the first electrode and the first current collector; and the current limiter and the current interrupter are simultaneously incorporated into a second protective layer interposed by lamination between the second electrode and the separator, as disclosed in FIG. 1F.

In some embodiments, the improved high energy density rechargeable battery is of a type having two current collectors, including a first current collector and a second current collector, the two electrodes including a first electrode and a second electrode, the improvement further characterized wherein:

the current limiter and the current interrupter are simultaneously incorporated into a first protective layer interposed by lamination between the first electrode and the separator; and the current limiter and the current interrupter are simultaneously incorporated into a second protective layer interposed by lamination between the second electrode and the second current collector, as disclosed in FIG. 1G.

In some embodiments, the improved high energy density rechargeable battery is of a type having two current collectors, including a first current collector and a second current collector, the two electrodes including a first electrode and a second electrode, and the first electrode including a first portion and a second portion, the second portion of the first electrode interposed between the first portion of the first electrode and the first current collector, the improvement further characterized wherein:

1. the current limiter being layered between the first portion of the first electrode and the second portion of the first electrode; and 2. the current interrupter being layered between the second portion of the first electrode and the first current collector.

In some embodiments, the improved high energy density rechargeable battery is of a type having two current collectors, including a first current collector and a second current collector, the two electrodes including a first electrode and a second electrode, and the first electrode including a first portion and a second portion, the second portion of the first electrode interposed between the first portion of the first electrode and the first current collector, the improvement further characterized, wherein the current limiter and the current interrupter are simultaneously incorporated into a protective layer interposed by lamination between the first portion and the second portion of the first electrode, as disclosed in FIGS. 1B and 2B.

In some embodiments, the improved high energy density rechargeable battery is of a type having two current collectors, including a first current collector and a second current collector, the two electrodes including a first electrode and a second electrode, and the first electrode including a first portion and a second portion, the second portion of the first electrode interposed between the first portion of the first electrode and the first current collector, the improvement further characterized, wherein the current limiter and the current interrupter triggered by both temperature and voltage are simultaneously incorporated into a protective layer interposed by lamination between the first portion and the second portion of the first electrode, as disclosed in FIG. 3B.

In some embodiments, the improved high energy density rechargeable battery is of a type having two current collectors, including a first current collector and a second current collector, the two electrodes including a first electrode and a second electrode, and the second electrode including a first portion and a second portion, the first portion of the second electrode interposed between the second portion of the second electrode and the second current collector, the improvement further characterized wherein:

1. the current limiter being layered between the first portion of the second electrode and the second portion of the second electrode; and 2. the current interrupter being layered between the second portion of the second electrode and the second current collector.

In some embodiments, the improved high energy density rechargeable battery is of a type having two current collectors, including a first current collector and a second current collector, the two electrodes including a first electrode and a second electrode, and the second electrode including a first portion and a second portion, the first portion of the second electrode interposed between the second portion of the second electrode and the second current collector, the improvement further characterized wherein:

1. the current interrupter being layered between the first portion of the second electrode and the second portion of the second electrode; and 2. the current limiter being layered between the second portion of the second electrode and the second current collector.

In some embodiments, the improved high energy density rechargeable battery is of a type having two current collectors, including a first current collector and a second current collector, the two electrodes including a first electrode and a second electrode, and the first electrode including a first portion and a second portion, the first portion of the second electrode interposed between the second portion of the second electrode and the second current collector, the improvement further characterized, wherein the current limiter and the current interrupter are simultaneously incorporated into a protective layer interposed by lamination between the first portion and the second portion of the second electrode, as disclosed in FIG. 1D.

In some embodiments, the improved high energy density rechargeable battery is of a type having two current collectors, including a first current collector and a second current collector, the two electrodes including a first electrode and a second electrode, and the first electrode including a first portion and a second portion, the second portion of the first electrode interposed between the first portion of the first electrode and the first current collector, the improvement further characterized wherein:

1. the current limiter being layered between the second portion of the first electrode and the first current collector; and 2. the current interrupter being layered between the first portion of the first electrode and the second portion of the first electrode.

In some embodiments, the improved high energy density rechargeable battery is of a type having two current collectors, including a first current collector and a second current collector and the two electrodes including a first electrode and a second electrode, the improvement further characterized, wherein:

1. the current limiter being layered between the first electrode and the first current collector; and 2. the current interrupter being layered between the second electrode and the second current collector.

In some embodiments, the improved high energy density rechargeable battery is of a type, wherein each electrode has a temperature range for safe operation and an internal resistivity therein, the improvement further characterized wherein the current limiter having a resistivity greater than the internal resistivity of the electrode with which the current limiter is layered within the temperature range for safe operation.

In some embodiments of the improved high energy density rechargeable battery, the improvement further characterized, wherein the current limiter lacking a resistivity transition switch at temperatures within the temperature range for safe operation.

In some embodiments, the improved high energy density rechargeable battery is of a type, wherein each electrode has a temperature range for standard operation, the improvement further characterized, wherein the current limiter having a resistivity transition with a resistivity less than the internal resistivity of the electrode within the temperature range for standard operation and a resistivity greater than the internal resistivity of the electrode above the temperature range for standard operation.

In some embodiments, the improved high energy density rechargeable battery is of a type, wherein each electrode has a temperature range for standard operation, the improvement further characterized, wherein the current interrupter is activated by temperature above the temperature range for standard operation.

In some embodiments, the improved high energy density rechargeable battery is of a type, wherein each electrode has a temperature range for standard operation and a temperature range for safe operation, the improvement further characterized, wherein the current interrupter is activated by temperature above the temperature range for standard operation and within the temperature range for safe operation.

In some embodiments, the improved high energy density rechargeable battery is of a type, wherein each electrode has an internal resistivity within the temperature range for safe operation, the improvement further characterized, wherein the current limiter having a resistivity greater than the internal resistivity of the electrode with which the current limiter is layered within the temperature range for safe operation.

In some embodiments of the improved high energy density rechargeable battery, the improvement further characterized, wherein the current limiter and the current interrupter are simultaneously incorporated into a protective layer interposed by lamination between the same electrode and current collector.

In some embodiments, the improved high energy density rechargeable battery is of a type, wherein each electrode has a voltage range for standard operation, the improvement further characterized, wherein the current interrupter is activated by voltage above the voltage range for standard operation.

In some embodiments, the improved high energy density rechargeable battery is of a type, wherein each electrode has a voltage range for standard operation and a voltage range for safe operation, the improvement further characterized, wherein the current interrupter is activated by voltage above the temperature range for standard operation and within the voltage range for safe operation.

In some embodiments of the improved high energy density rechargeable battery, the improvement further characterized, wherein the current limiter and the current interrupter are simultaneously incorporated into a protective layer interposed by lamination between the same electrode and current collector.

Other embodiments of the present disclosure include an improved high energy density rechargeable battery of a type including two electrodes of opposite polarity, a separator separating the two electrodes, and at least one current collector electrically coupled to one of the electrodes, the separator preventing internal discharge between the two electrodes, failure of the separator potentially causing an internal discharge between the two electrodes (as illustrated in FIGS. 6A-B and FIGS. 7A-B), the internal discharge causing a generation of joule heat of potential danger, the improvement comprising:

1. a thermally activatable current interrupter and a voltage activatable current interrupter, wherein the thermally activatable current interrupter layered by lamination between one of the current collectors and one of the electrodes, the thermally activatable current interrupter, when unactivated, electrically coupling the current collector to the electrode with which it is layered, the current interrupter, when activated, delaminating from the current collector for forming a nonconductive gap for electrically decoupling the current collector from the electrode with which it had been layered (as illustrated in FIGS. 6C-D and FIGS. 7C-D), the electrical decoupling slowing the rate of internal discharge between the two electrodes in the event of separator failure;

2. the voltage activatable current interrupter layered by lamination between one of the current collectors and one of the electrodes, the voltage activatable current interrupter, when unactivated, electrically coupling the current collector to the electrode with which it is layered, the current interrupter, when activated, delaminating from the current collector for forming a nonconductive gap for electrically decoupling the current collector from the electrode with which it had been layered, the electrical decoupling slowing the rate of internal discharge between the two electrodes in the event of separator failure (as illustrated in FIGS. 6C-D and FIGS. 7C-D);

whereby, activation of either the thermally activated current interrupter or voltage activated current interrupter in the event of separator failure, slows the generation joule heat for diminishing the potential danger.

Some embodiments of the present disclosure include a process for avoiding thermal runaway within a high energy density rechargeable battery undergoing internal discharge due to separator failure, the process comprising delaminating an electrode within the battery from its current collector by generating a gas from a heat sensitive gas generating material within an interrupt layer interposed between the electrode and current collector, the delaminating electrically decoupling the electrode from its current collector for slowing the rate of internal discharge.

Some embodiments of the present disclosure include a process for avoiding thermal runaway within a high energy density rechargeable battery at risk of suffering from separator failure due to voltage overcharge (as illustrated in FIGS. 7A-B), the process comprising delaminating an electrode within the battery from its current collector by generating a gas from a voltage sensitive gas generating material within an interrupt layer interposed between the electrode and current collector, the delaminating electrically decoupling the electrode from its current collector for interrupting the voltage overcharge (as illustrated in FIGS. 7C-D).

The following abbreviations have the indicated meanings:
Carbopol®-934=cross-linked polyacrylate polymer supplied by Lubrizol Advanced Materials, Inc.
CMC=carboxymethyl cellulose
CMC-DN-800H=CMC whose sodium salt of the carboxymethyl group had been replaced by ammonium (supplied by Daicel FineChem Ltd).
MCMB=mesocarbon microbeads
NMC=Nickel, Manganese and Cobalt
NMP=N-methylpyrrolidone
PTC=positive temperature coefficient
PVDF=polyvinylidene fluoride
SBR=styrene butadiene rubber
Super P®=conductive carbon blacks supplied by Timcal
Torlon® AI-50=water soluble analog of Torlon® 4000TF
Torlon® 4000TF=neat resin polyamide-imide (PAI) fine powder Preparation of the resistance layer and electrode active layer is described below, along with battery cell assembly.

The following is a generalized procedure for preparing a resistance layer (first layer):
 i. Dissolve the binder into an appropriate solvent.
 ii. Add the conductive additive and ceramic powder into the binder solution to form a slurry.
 iii. Coat the slurry made in Step ii. onto the surface of a metal foil, and then dry it to form a resistance layer on the surface of the foil.

The following is a generalized procedure for the electrode preparation (on the top of the first layer):
 i. Dissolve the binder into an appropriate solvent.
 ii. Add the conductive additive into the binder solution to form a slurry.
 iii. Put the cathode or anode material into the slurry made in the Step v. and mix it to form the slurry for the electrode coating.
 iv. Coat the electrode slurry made in the Step vi. onto the surface of the layer from Step iii.
 v. Compress the electrode into the design thickness.

The following is a generalized procedure for Cell assembly:
 i. Dry the positive electrode at 125° C. for 10 hr and negative electrode at 140° C. for 10 hr.
 ii. Punch the electrodes into the pieces with the electrode tab.
 iii. Laminate the positive and negative electrodes with the separator as the middle layer.
 iv. Put the flat jelly-roll made in the Step xi. into the Aluminium composite bag.

Figures 20, 21:
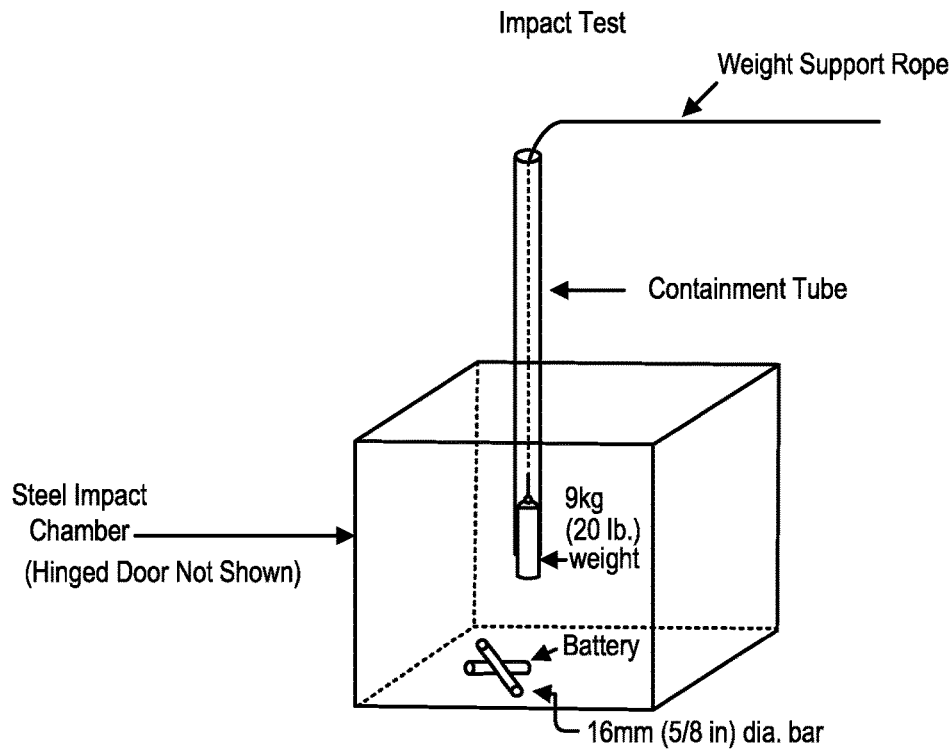
FIG. 20 summarizes the cell impedance and discharge capacities at 1 A, 3 A, 6 A and 10 A and their corresponding ratios of the capacity at 3 A, 6 A or 10 A over that at 1 A for Cell #1 (baseline), #3, #4, #5, and #6. The cell impedance at 1 KHz goes up with the resistive and gas-generator layer. The resistive layer 6 has caused the increase in the cell impedance since all cells with the resistive layer 6 gets higher impedance while the cell discharge capacity depends on the individual case.
FIG. 21 illustrates the Impact Test.

Below are the generalized steps for conducting an impact test, as shown in FIG. 21, for a battery cell as described herein.
 i. Charge the cell at 2 A and 4.2V for 3 hr.
 ii. Put the cell onto a hard flat surface such as concrete.
 iii. Attach a thermal couple to the surface of the cell with high temperature tape and connect the positive and negative tabs to the voltage meter.
 iv. Place a steel rod (15.8 mm±0.1 mm in diameter X about 70 mm long) on its side across the center of the cell.
 v. Suspend a 9.1±0.46 Kg steel block (75 mm in diameter X 290 mm high) at a height of 610±25 mm above the cell.
 vi. Using a containment tube (8 cm inside diameter) to guide the steel block, release the steel block through the tube and allow it to free fall onto the steel bar laying on the surface of the cell causing the separator to breach while recording the temperature.

vii. Leave the steel rod and steel block on the surface of the cell until the cell temperature stabilizes near room temperature.
 viii. End test.

Below are the generalized steps for performing an overcharge test.
 i. Charge the cell at 2 A and 4.2V for 3 hr.
 ii. Put the charged cell into a room temperature oven.
 iii. Connect the cell to a power supply (manufactured by Hewlett-Packard).
 iv. Set the voltage and current on the power supply to 12V and 2 A.
 v. Turn on the power supply to start the overcharge test while recording the temperature and voltage.
 vi. Test ends when the cell temperature decreases and stabilizes near room temperature.

Below are the generalized steps for performing the Resistance Measurement Test.
 i. Place one squared copper foil (4.2×2.8 cm) with the tab on to a metal plate (~12x~8 cm). Then cut a piece of thermal tape and carefully cover the squared copper foil.
 ii. Cut a piece of the electrode that is slightly larger than the copper paper. Place the electrode on to the copper foil.
 iii. Place another copper foil (4.2×2.8 cm) with tab on the electrode surface, repeat steps i-ii with it.
 iv. At this point, carefully put them together and cover them using high temperature tape and get rid of any air bubble
 v. Cut a "V" shaped piece of metal off both tabs.
 vi. Attach the completed strip to the metal clamp and tighten the screws. Make sure the screws are really tight.
 vii. Attach the tabs to the connectors of Battery HiTester (produced by Hioki USA Corp.) to measure the resistance to make sure that a good sample has been made for the measurement.
 viii. Put the metal clamp inside the oven, connect the "V" shaped tabs to the connectors and then tightened the screw. Tape the thermocouple onto the metal clamp.
 ix. Attach the Battery HiTester to the wires from oven. Do not mix up the positive and the negative wires.
 x. Close the oven and set the temperature to 200° C. at 4° C. per minute, and start the test. Record data every 15 seconds.
 xi. Stop recording the data when the metal clamp and oven reach just a little over 200° C.
 xii. Turn off the oven and the Battery HiTester.
 xiii. End Test.

Below are the generalized steps for performing the Cycle Life procedure.
 i. Rest for 5 minutes.
 ii. Discharge to 2.8V at 1 A.
 iii. Rest for 20 minutes.
 iv. Charge to 4.2V at 0.7 A for 270 minutes.
 v. Rest for 10 minutes.
 vi. Discharge to 2.8V at 0.7 A.
 vii. Rest for 10 minutes.
 viii. Repeat Steps iii to vii 100 times.
 ix. End test.

Below are the generalized steps for testing a battery cell with a resistance layer for discharge at 1 A, 3 A, 6 A, and 10 A. In each test, the battery cell is tested in a chamber with controlled, constant temperature, for example 50° C.
 i. Rest for 5 minutes.
 ii. Discharge to 2.8V at 1 A.

iii. Rest for 20 minutes.

iv. Charge to 4.2V at 0.7 A for 270 minutes.

v. Rest for 10 minutes.

vi. Discharge to 2.8V at 1 A.

vii. Rest for 10 minutes.

viii. Charge to 4.2V at 0.7 A for 270 minutes.

ix. Rest for 10 minutes.

x. Discharge to 2.8V at 3 A.

xi. Charge to 4.2V at 0.7 A for 270 minutes.

xii. Rest for 10 minutes.

xiii. Discharge to 2.8V at 6 A.

xiv. Charge to 4.2V at 0.7 A for 270 minutes.

xv. Rest for 10 minutes.

xvi. Discharge to 2.8V at 10 A.

xvii. Rest for 10 minutes.

xviii. End Test.

Definitions

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

As used herein, "high energy density rechargeable (HEDR) battery" means a battery capable of storing relatively large amounts of electrical energy per unit weight on the order of about 50 W-hr/kg or greater and is designed for reuse, and is capable of being recharged after repeated uses. Non-limiting examples of HEDR batteries include metal-ion batteries and metallic batteries.

As used herein, "metal-ion batteries" means any rechargeable battery types in which metal ions move from the negative electrode to the positive electrode during discharge and back when charging. Non-limiting examples of metal-ion batteries include lithium-ion, aluminum-ion, potassium-ion, sodium-ion, magnesium-ion, and others.

As used herein, "metallic batteries" means any rechargeable battery types in which the anode is a metal or metal alloy. The anode can be solid or liquid. Metal ions move from the negative electrode to the positive electrode during discharge and back when charging. Non-limiting examples of metallic batteries include $M-S$, $M-NiCl_2$, $M-V_2O_5$, $M-Ag_2VP_2O_8$, $M-TiS_2$, $M-TiO_2$, $M-MnO_2$, $M-Mo_3S_4$, $M-MoS_6Se_2$, $M-MoS_2$, $M-MgCoSiO_4$, $M-Mg_{1.03}Mn_{0.97}SiO_4$, and others, where $M=Li$, Na, K, Mg, Al, or Zn.

As used herein, "lithium-ion battery" means any rechargeable battery types in which lithium ions move from the negative electrode to the positive electrode during discharge and back when charging. Non-limiting examples of lithium-ion batteries include lithium cobalt oxide ($LiCoO_2$), lithium iron phosphate ($LiFePO_4$), lithium cobalt phosphate ($LiCoPO_4$), lithium excess layered oxides such as ($LiMnO_3$) $x(LiMO_2)$ ($M=Ni$, Co, Mn), olivines, $LiMSiO_4$ ($M=iron$, Cobalt, Nickel and Vanadium); lithium manganese oxide ($LiMn_2O_4$), lithium nickel oxide ($LiNiO_2$), lithium nickel manganese cobalt oxide ($LiNiMnCoO_2$), lithium nickel cobalt aluminum oxide ($LiNiCoAlO_2$), lithium titanate ($Li_4Ti_5O_{12}$), lithium titanium dioxide, lithium/graphene, lithium/graphene oxide coated sulfur, lithium-sulfur, lithium-purpurin, and others. Lithium-ion batteries can also come with a variety of anodes including silicon-carbon nanocomposite anodes and others. Lithium-ion batteries can be in various shapes including small cylindrical (solid body without terminals), large cylindrical (solid body with large threaded terminals), prismatic (semi-hard plastic case with large threaded terminals), and pouch (soft, flat body).

Lithium polymer batteries can be in a soft package or pouch. The electrolytes in these batteries can be a liquid electrolyte (such as carbonate based or ionic), a solid electrolyte, a polymer based electrolyte or a mixture of these electrolytes.

As used herein, "aluminum-ion battery" means any rechargeable battery types in which aluminum ions move from the negative electrode to the positive electrode during discharge and back when charging. Non-limiting examples of aluminum-ion batteries include $Al_nM_2$ $(XO_4)_3$, wherein $X=Si$, P, S, Mo, As, and others; and $M=Fe$, Ca, Mg, V, Cr and others; aluminum transition-metal oxides ($Al_xMO_2$ wherein $M=Fe$, Mn, Ni, Mo, Co, Cr, Ti, V and others) such as $Al_x$ $(V_4O_8)$, $Al_xNiS_2$, $Al_xFeS_2$, $Al_xVS_2$ and $Al_xWS_2$ and others.

As used herein, "potassium-ion battery" means any rechargeable battery types in which potassium ions move from the negative electrode to the positive electrode during discharge and back when charging. Non-limiting examples of potassium-ion batteries include $K_nM_2(XO_4)_3$, wherein $X=Si$, P, S, Mo, As, and others; and $M=Fe$, Ca, Mg, V, Cr and others; potassium transition-metal oxides ($KMO_2$ wherein $M=Fe$, Mn, Ni, Mo, Co, Cr, Ti, V and others), and others.

As used herein, "sodium-ion battery" means any rechargeable battery types in which sodium ions move from the negative electrode to the positive electrode during discharge and back when charging. Non-limiting examples of sodium-ion batteries include $Na_nM_2(XO_4)_3$, wherein $X=Si$, P, S, Mo, As, and others; and $M=Fe$, Ca, Mg, V, Cr and others; $NaV_{1-x}Cr_xPO_4F$, $NaVPO_4F$, $Na_4Fe_3(PO_4)_2(P_2O_7)$, $Na_2FePO_4F$, $Na_2FeP_2O_7$, $Na_{2/3}[Fe_{1/2}Mn_{1/2}]O_2$, $Na(Ni_{1/3}Fe_{1/3}Mn_{1/3})O_2$, $NaTiS_2$, $NaFeF_3$; Sodium Transition-Metal Oxides ($NaMO_2$ wherein $M=Fe$, Mn, Ni, Mo, Co, Cr, Ti, V and others) such as $Na_{2/3}[Fe_{1/2}Mn_{1/2}]O_2$, $Na(Ni_{1/3}Fe_{1/3}Mn_{1/3})O_2$, $Na_xMo_2O_4$, $NaFeO_2$, $Na_{0.7}CoO_2$, $NaCrO_2$, $NaMnO_2$, $Na_{0.44}MnO_2$, $Na_{0.7}MnO_2$, $Na_{0.7}MnO_{2.25}$, $Na_{2/3}Mn_{2/3}Ni_{1/3}O_2$, $Na_{0.61}Ti_{0.48}Mn_{0.52}O_2$; Vanadium Oxides such as $Na_{1+x}V_3O_8$, $Na_xV_2O_5$, and $Na_xVO_2$ ($x=0.7$, 1); and others.

As used herein, "magnesium-ion battery" means any rechargeable battery types in which magnesium ions move from the negative electrode to the positive electrode during discharge and back when charging. Non-limiting examples of magnesium-ion batteries include $Mg_nM_2(XO_4)_3$, wherein $X=Si$, P, S, Mo, As, and others; and $M=Fe$, Ca, Mg, V, Cr and others; magnesium Transition-Metal Oxides ($MgMO_2$ wherein $M=Fe$, Mn, Ni, Mo, Co, Cr, Ti, V and others), and others.

As used herein, "silicon-ion battery" means any rechargeable battery types in which silicon ions move from the negative electrode to the positive electrode during discharge and back when charging. Non-limiting examples of silicon-ion batteries include $Si_nM_2(XO_4)_3$, wherein $X=Si$, P, S, Mo, As, and others; and $M=Fe$, Ca, Mg, V, Cr and others; Silicon Transition-Metal Oxides ($SiMO_2$ wherein $M=Fe$, Mn, Ni, Mo, Co, Cr, Ti, V and others), and others.

As used herein, "binder" means any material that provides mechanical adhesion and ductility with inexhaustible tolerance of large volume change. Non-limiting examples of binders include styrene butadiene rubber (SBR)-based binders, polyvinylidene fluoride (PVDF)-based binders, carboxymethyl cellulose (CMC)-based binders, poly(acrylic acid) (PAA)-based binders, polyvinyl acids (PVA)-based binders, poly(vinylpyrrolidone) (PVP)-based binders, and others.

As used herein, "conductive additive" means any substance that increases the conductivity of the material. Non-limiting examples of conductive additives include carbon black additives, graphite nonaqueous ultrafine carbon (UFC) suspensions, carbon nanotube composite (CNT) additives (single and multi-wall), carbon nano-onion (CNO) additives, graphene-based additives, reduced graphene oxide (rGO), conductive acetylene black (AB), conductive poly (3-methylthiophene) (PMT), filamentary nickel powder additives, aluminum powder, electrochemically active oxides such as lithium nickel manganese cobalt oxide and others.

As used herein, "metal foil" means any metal foil that under high voltage is stable. Non-limiting examples of metal foils include aluminum foil, copper foil, titanium foil, steel foil, nano-carbon paper, graphene paper, carbon fiber sheet, and others.

As used herein, "ceramic powder" means any electrical insulator or electrical conductor that hasn't been fired. Non-limiting examples of ceramic powder materials include barium titanate ($BaTiO_3$), zirconium barium titanate, strontium titanate ($SrTiO_3$), calcium titanate ($CaTiO_3$), magnesium titanate ($MgTiO_3$), calcium magnesium titanate, zinc titanate ($ZnTiO_3$), lanthanum titanate ($LaTiO_3$), and neodymium titanate ($Nd_2Ti_2O_7$), barium zirconate ($BaZrO_3$), calcium zirconate ($CaZrO_3$), lead magnesium niobate, lead zinc niobate, lithium niobate ($LiNbO_3$), barium stannate ($BaSnO_3$), calcium stannate ($CaSnO_3$), magnesium aluminum silicate, sodium silicate ($NaSiO_3$), magnesium silicate ($MgSiO_3$), barium tantalate ($BaTa_2O_6$), niobium oxide, zirconium tin titanate, silicon dioxide ($SiO_2$), aluminum oxide ($Al_2O_3$), titanium dioxide ($TiO_2$), and others.

As used herein, "gas generator material" means any material which will decompose at the high temperature or high voltage to produce a gas either directing from the gas generator material or indirectly from reaction of the decomposition products produced from the gas generator material with other materials contained within the battery (e.g. the electrolyte and electrodes). Non-limiting examples of gas generator materials include inorganic carbonates such as $M_n(CO_3)_m$, $M_n(SO_3)_m$, $M_n(NO_3)_m$, $^1M_n{}^2M_n(CO_3)_m$, $NaSiO_3*H_2O$, $CuCO_3CU(OH)_2$, and others and organic carbonates such as polymethacrylic $[-CH_2-C(CH_3)(COOM)-]_p$ and polyacrylate salts $[-CH_2-CH(COOM)-]_p$, and others wherein M, $^1M$, $^2M$ are independently selected from the group consisting of Ba, Ca, Cd, Co, Cu, Fe, K, Li, Mg, Mn, Na, Ni, Pb, Sr, and Zn; n is 1-3 and m is 1-4. In some embodiments, M is independently selected from the group consisting of an ammonium ion, pyridinium ion and a quaternary ammonium ion. In some embodiments, the gas generator material may decompose to produce a liquid (e.g. water). The liquid may react with other materials contained within the battery to form a gas and this gas will delaminate the electrode (e.g. water reacting with the electrolyte [$LiFP_6$] to form gaseous HF and lithium in the negative to form hydrogen gas ($H_2$)). If the temperature of the cell exceeds the vaporization temperature of the liquid, the liquid may also undergo a phase transition to form a gas and this gas will also delaminate the electrode.

Layers were coated onto metal foils by an automatic coating machine (compact coater, model number 3R250W-2D) produced by Thank-Metal Co., Ltd. Layers are then compressed to the desired thickness using a calender machine (model number X15-300-1-DZ) produced by Beijing Sevenstar Huachuang Electronics Co., Ltd.

EXAMPLES

The disclosure will be described more in detail below using examples, but the disclosure is not limited to the examples shown below.

Example 1

Preparation of baseline electrodes, positive and negative electrodes, and the completed Cell #1 for the evaluation in the resistance measurement, discharge capability tests at 50° C., impact test, and cycle life test are described below.

A) Preparation of POS1 A as an Example of the Positive Electrode Preparation.

i) PVDF (21.6 g) was dissolved into NMP (250 g); ii) Carbon black (18 g) was added and mixed for 15 minutes at 6500 rpm; iii) $LiNi_{0.5}Mn_{0.3}Co_{0.2}O_2$(NMC) (560.4 g) was added to the slurry from Step ii and mixed for 30 minutes at 6500 rpm to form a flowable slurry; iv) Some NMP was added for the viscosity adjustment; v) This slurry was coated onto 15 pm aluminum foil using an automatic coating machine with the first heat zone set to about 80° C. and the second heat zone to about 130° C. to evaporate off the NMP. The final dried solid loading was about 15.55 mg/cm². The positive layer was then compressed to a thickness of about 117 μm. The electrode made here was considered as zero voltage against a standard graphite electrode and was used for the impedance measurement at 0 V in relation to the temperature, and the dry for the cell assembly.

B) Preparation of NEG2 A as an Example of the Negative Electrode Preparation i) CMC (5.2 g) was dissolved into deionized water (~300 g); ii) Carbon black (8.4 g) was added and mixed for 15 minutes at 6500 rpm; iii) Negative active graphite (JFE Chemical Corporation; Graphitized Mesophase Carbon Micro Bead (MCMB) and Synthetic Graphite (TIMCAL) (378.4 g in total) were added to the slurry from Step ii and mixed for 30 minutes at 6500 rpm to form a flowable slurry; iv) SBR (solid content 50% suspended in water) (16.8 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 70° C. and the second heat zone to about 100° C. to evaporate off the water. The final dried solid loading was about 9.14 mg/cm². The negative electrode layer was then compressed to a thickness of about 117 μm. The negative made was used for the dry for the cell assembly C) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The jelly-roll made in the Step iii was laid flat into an aluminum composite bag; v) The bag from Step iv. was dried in a 70° C. vacuum oven; vi) The bag from Step v was filled with the $LiPF_6$ containing organic carbonate based electrolyte; vii) The bag from Step vi was sealed; ix) Rest for 16 hours; ix) The cell was charged to 4.2V at C/20 rate for 5 hours and then to 4.2V at 0.5 C rate for 2 hours, then rest for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

Figure 15:
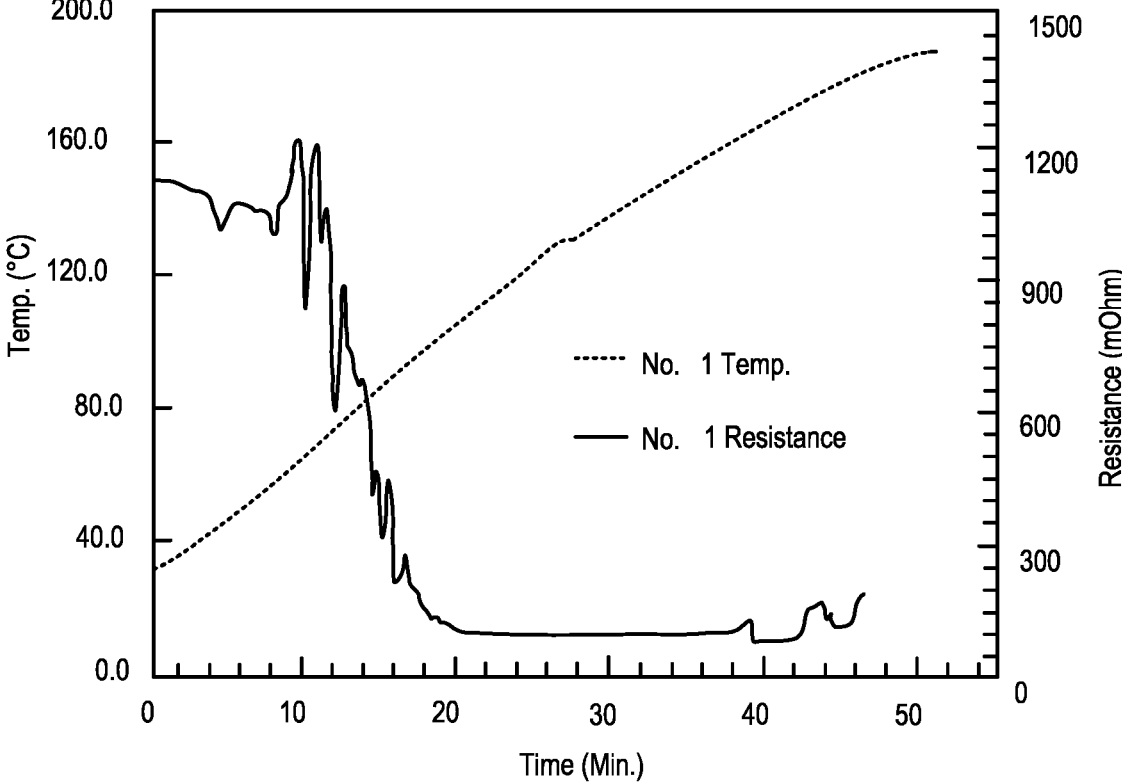
FIG. 15 illustrates the resistance of baseline Cell #2 at 3.6V vs graphite in relation to the temperature increase. The resistance decrease about 10 times with the increase in temperature.
Figure 18:
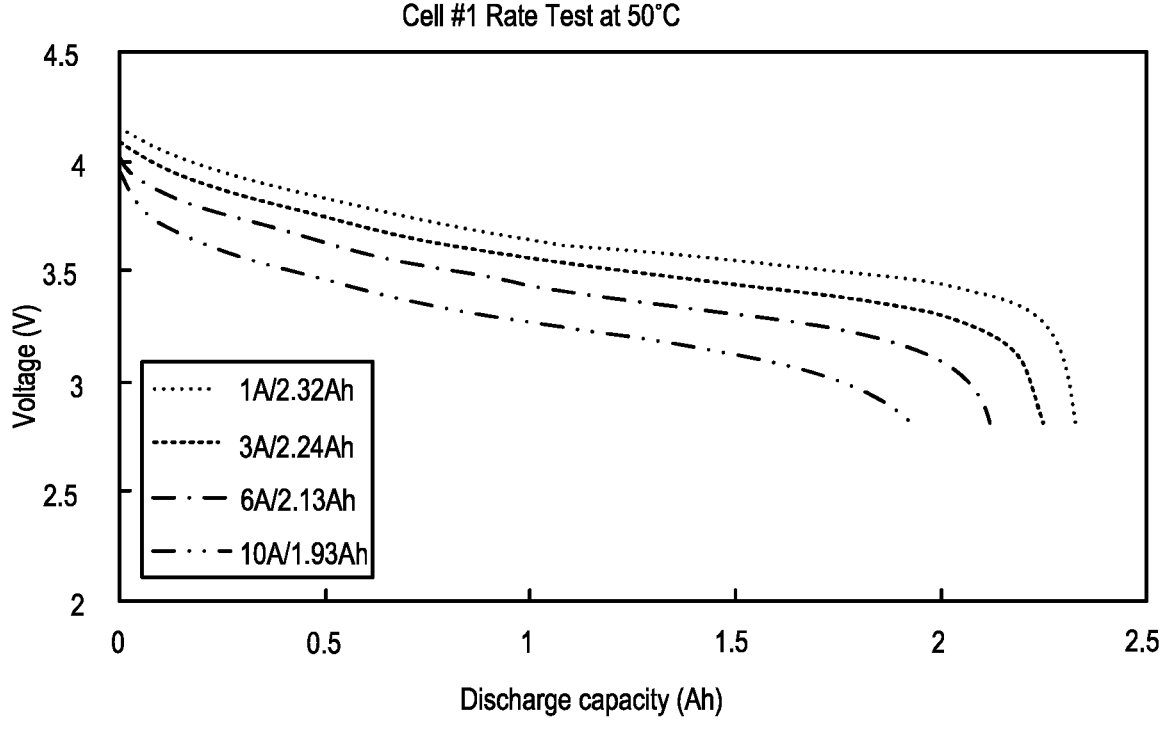
FIG. 18 illustrates the discharge capacity of baseline Cell #1 (no resistive layer) vs the cell voltage at 1 A, 3 A, 6 A and 10 A.
Figures 22, 23:
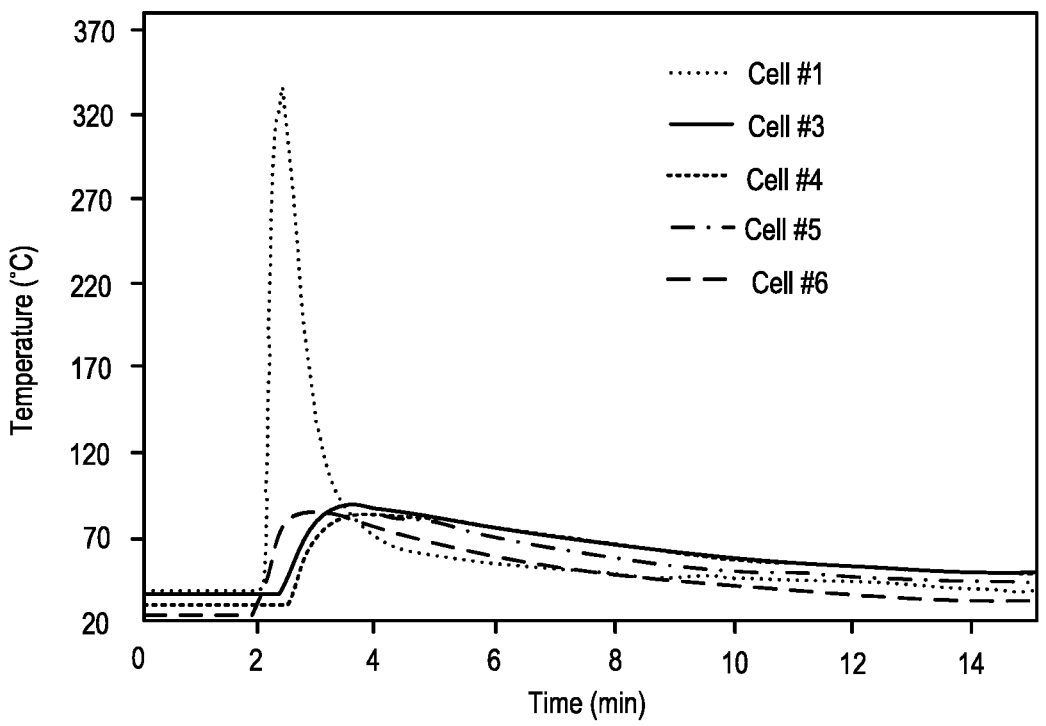
FIG. 22 illustrates the cell temperature profiles during the impact test for Cell #1 (baseline), #3, #5, and #6. The voltage of all tested cells dropped to zero as soon as the steel rod impact the cell. All cells with the resistive and gas-generator layer passed the test while the cell without any resistive layer 6 failed in the test (caught the fire). The maximum cell temperature during the impact test is summarized in FIG. 23.
FIG. 23 summarizes the cell maximum temperature in the impact test for Cell #1 (baseline), #3, #4, #5, and #6.
Figure 24:
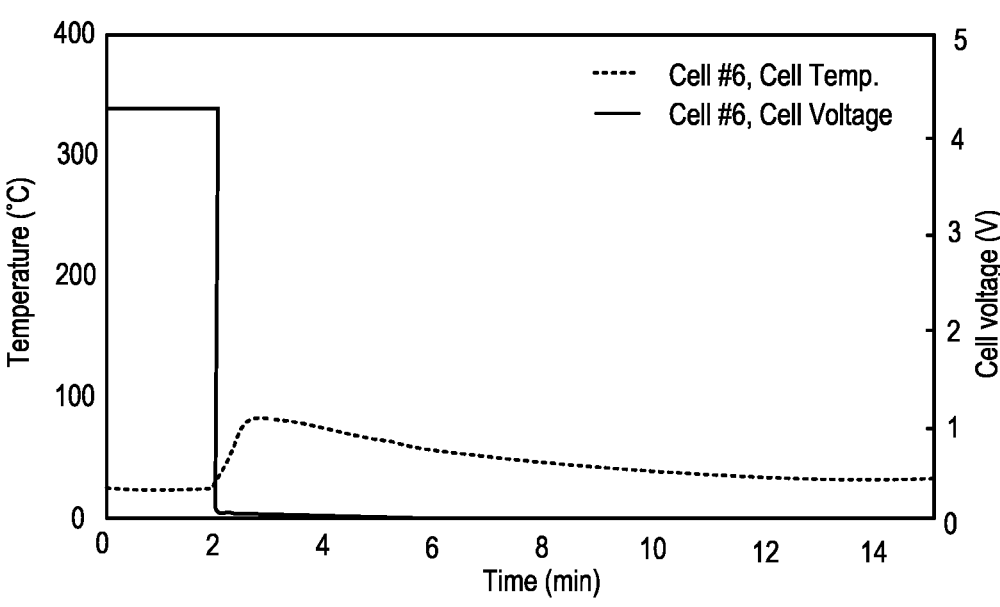
FIG. 24 illustrates the cell voltage and temperature vs the impact testing time for Cell #6. The impact starting time is set to 2 minutes. The cell voltage drop to zero as soon as the cell is impacted. The cell temperature is shown to increase rapidly.
Figure 25:
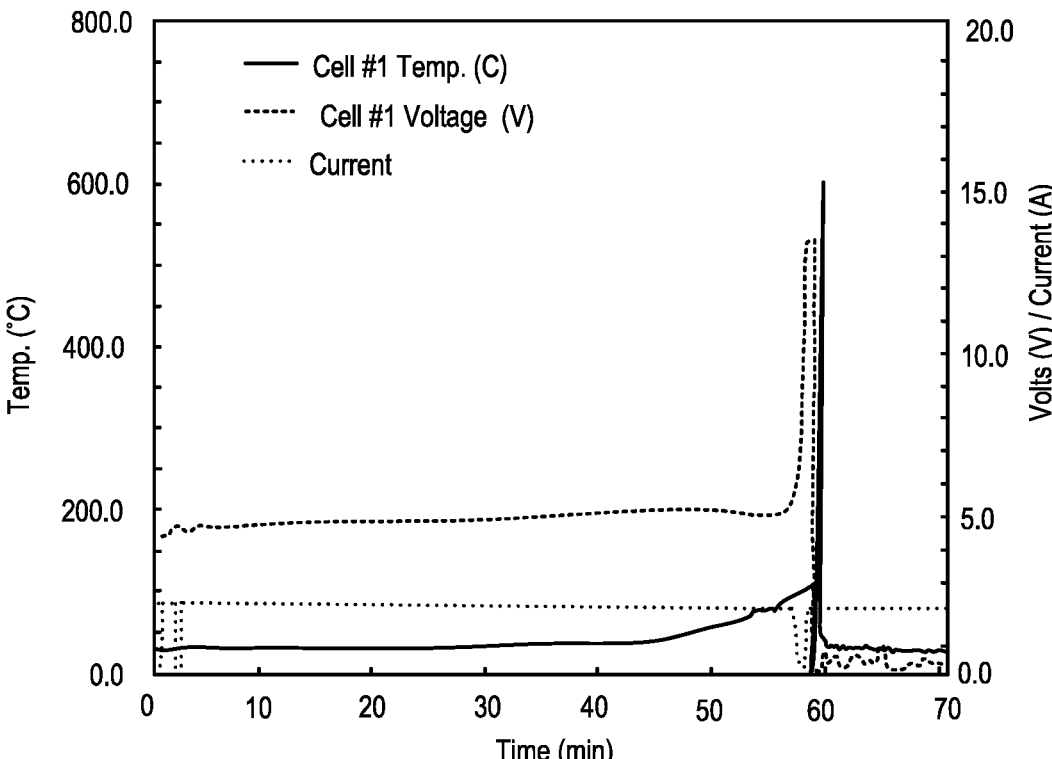
FIG. 25 illustrates the cell voltage and temperature vs the overcharging time for Cell #1 (no any protection layer). The cell voltage increased gradually up to 40 minutes and then decreased slightly and jumped to the maximum charge voltage rapidly at about 56 minutes while at the same time the cell temperature increased dramatically to above 600° C. The cell voltage and temperature then dropped to a very low value due to the connection being lost when the cell caught fire. The overcharge current was 2 A until the cell caught fire and then dropped to about 0.2 A for one or two minutes and then back to 2 A because the cell was shorted. The cell burned.
Figures 26, 27, 28:
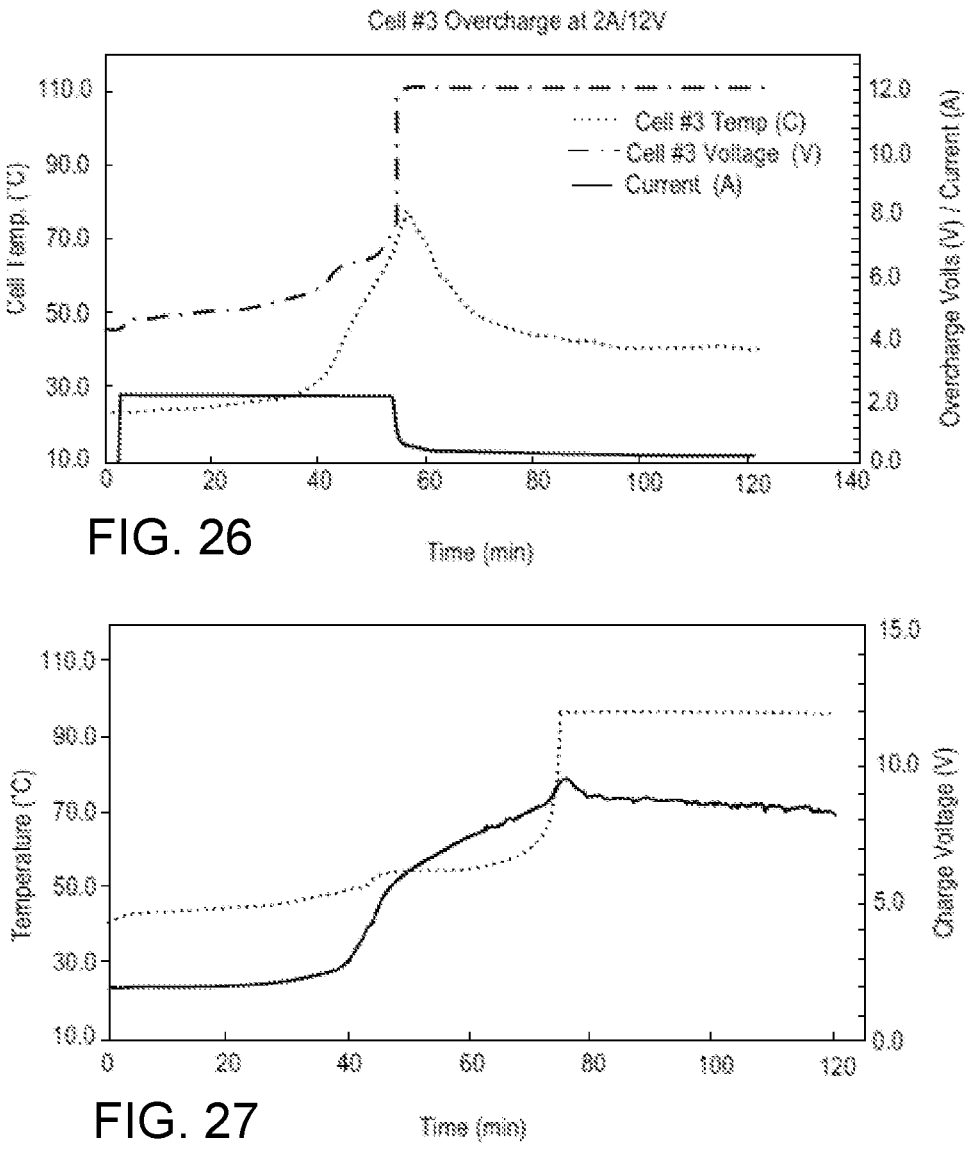
FIG. 26 illustrates the cell voltage and temperature vs the overcharging time for the cell with Cell #3 ($CaCO_3$ layer). The cell voltage increased gradually up to 40 minutes and then rapidly increased to a maximum charge voltage of 12V at about 55 minutes. The cell temperature rapidly increased to above 80° C. starting at about 40 minutes and then decreased rapidly. The over charge current decreased significantly at 55° C. and kept to 0.2 A for the rest of the testing time. The cell swelled significantly after the test.
FIG. 27 illustrates the cell voltage and temperature vs the overcharging time for Cell #5 ($Na_2O_7Si_3+Al_2O_3$ layer). The cell voltage increased gradually up to 40 minutes and then rapidly increased to a maximum charge voltage 12V at about 75 minutes. The cell overcharge voltage profiles is very different from $CaCO_3$ based resistive layer 6, which indicates the difference in the decomposition of $Na_2O_7Si_3$ compared with that of $CaCO_3$. The cell temperature increased significantly at about 40 minutes to above 75° C. and then decreased gradually. The over charge current decreased significantly at 75 minutes and kept to 1 A for the rest of the testing time. The cell swelled significantly after the test.
FIG. 28 summarizes the cell maximum temperature in the over charge test (2 A/12V) for Cell #1 (baseline), #3, #4, #5, and #6.

FIG. 15 presents the resistance in relation to the temperature increase for the positive electrode collected from autopsying a cell with 3.6 V. The resistance decreases about ten times. FIG. 18 shows the discharge capacity at the discharging currents 1, 3, 6, 10 A. FIG. 20 lists the cell impedance at 1 kHz and the capacity at 1 A, 3 A, 6 A and 10 A currents and the ratio of the capacity at 3, 6, 10 A over that at 1 A. FIG. 22 shows the cell temperature profile during the impact test. FIG. 23 summarizes the cell maximum temperature in the impact test. The cell caught the fire during the impact test. FIG. 25 shows the voltage and temperature profiles of the cells during the 12V/2 A over charge test. The cell caught the fire during the over charge test (FIG. 28).

Example 2

Preparation of $CaCO_3$ based gas generator and resistive layer, positive and negative electrodes, and the completed Cell #3 for the evaluation in the resistance measurement, discharge capability tests at 50° C., impact test, over charge, and cycle life test are described below.

A) Positive POS3B as an Example of a Gas Generator and Resistive Layer (1$^{st}$ Layer) Preparation.

i) Torlon® 4000TF (0.8 g) was dissolved into NMP (10 g); ii) PVDF (4.8 g) was dissolved into NMP (~70 g); iii) The solutions prepared in Step i and ii were mixed, and then carbon black (0.32 g) was added and mixed for 10 minutes at 6500 rpm; iv) Nano $CaCO_3$ powder (34.08 g) was added to the solution from Step iii and mixed for 20 minutes at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 1 mg/cm².

B) Preparation of POS3 A as an Example of the Positive Electrode Preparation (2$^{nd}$ Layer).

i) PVDF (21.6 g) was dissolved into NMP (250 g); ii) Carbon black (18 g) was added and mixed for 15 minutes at 6500 rpm; iii) $LiNi_{1/3}Co_{1/3}Mn_{1/3}O_2$(NMC) (560.4 g) was added to the slurry from Step ii and mixed for 30 minutes at 6500 rpm to form a flowable slurry; iv) Some NMP was added for the viscosity adjustment; v) This slurry was coated onto POS3B (Example 2A) using an automatic coating machine with the first heat zone set to about 85° C. and the second heat zone to about 135° C. to evaporate off the NMP. The final dried solid loading was about 19.4 mg/cm². The positive layer was then compressed to a thickness of about 153 μm. The electrode made here was considered as zero voltage against a standard graphite electrode and was used for the impedance measurement at 0 V in relation to the temperature.

C) Preparation of NEG3 A as an Example of the Negative Electrode Preparation i) CMC (13 g) was dissolved into deionized water (~1000 g); ii) Carbon black (20 g) was added and mixed for 15 minutes at the rate of about 6500 rpm; iii) Negative active graphite (JFE Chemical Corporation; Graphitized Mesophase Carbon Micro Bead (MCMB) and Synthetic Graphite (TIMCAL) (945.92 g in total) were added to the slurry from Step ii and mixed for 30 minutes at 6500 rpm to form a flowable slurry; iv) SBR (solid content 50% suspended in water) (42 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11.8 mg/cm². The negative electrode layer was then compressed to a thickness of about 159 μm. The negative made was used for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The jelly-roll made in the Step iii was laid flat in an aluminum composite bag; v) The bag from Step iv was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate; x) Under vacuum, the cell was punctured to release any gases and then resealed. The cell made here was used for grading and other tests such as discharging capability test at 50° C., impact test, cycle life test and so on.

Figure 16:
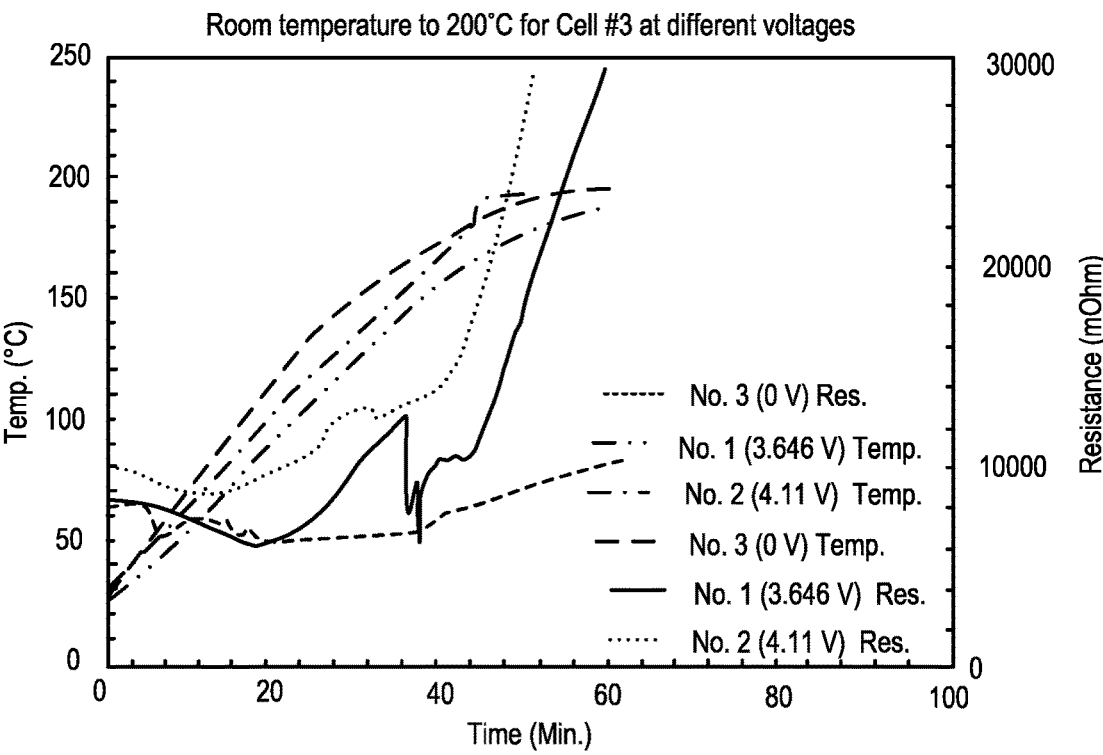
FIG. 16 illustrates the resistance of Cell #3 (positive electrode 14 with the $CaCO_3$ ceramic layer) at 0, 3.646, and 4.11 respectively, voltage vs graphite in relation to the temperature increase. The resistance increases slightly for zero voltage, and dramatically for 3.646 and 4.11 V.
Figure 17:
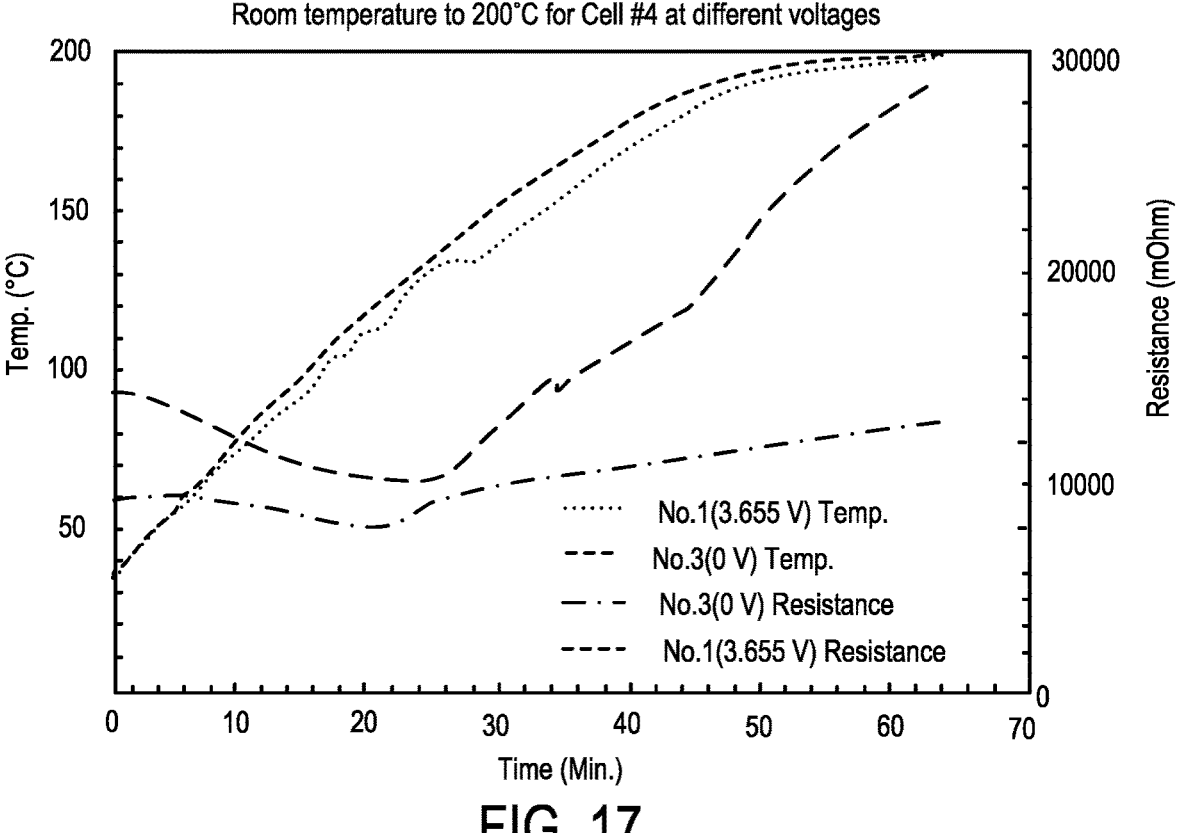
FIG. 17 illustrates the resistance of Cell #4 (positive electrode 14 with the $Al_2O_3$ and $CaCO_3$ ceramic layer) at 0V and 3.655V, respectively, voltage vs graphite in relation to the temperature increase. The resistance increases slightly for zero voltage, and dramatically for 3.655 V.
Figure 19:
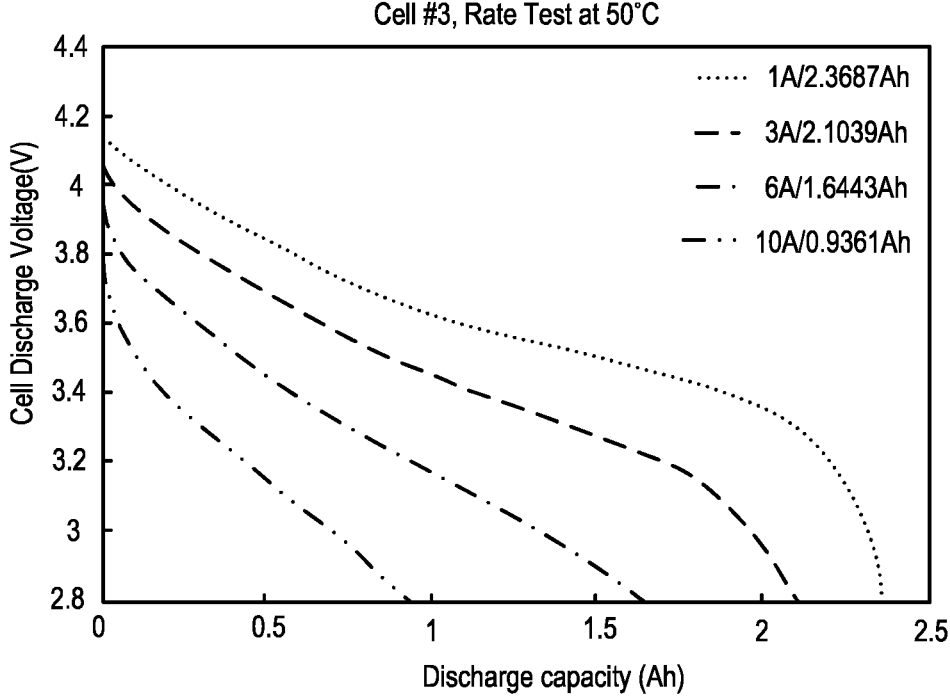
FIG. 19 illustrates the discharge capacity of Cell #3 (85.2% $CaCO_3$ based resistive layer 6) vs the cell voltage at 1 A, 3 A, 6 A and 10 A. The cell discharge capability decreases significantly with the increase in the cell discharge current with this particular resistive layer 6.
Figure 29:
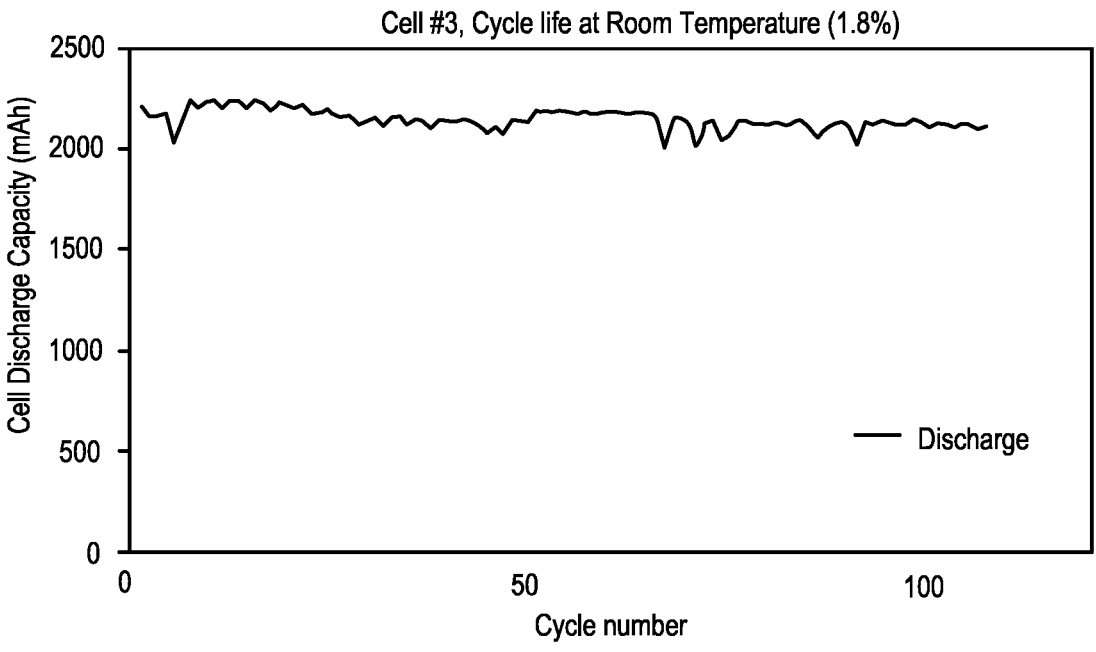
FIG. 29 illustrates the cycle life of Cell #3 (CaCO$_3$ resistive layer 6). The cell lost about 1.8% after 100 cycles which is lower than that of the cells without any resistive layer (~2.5% by average, not shown).
Figure 30:
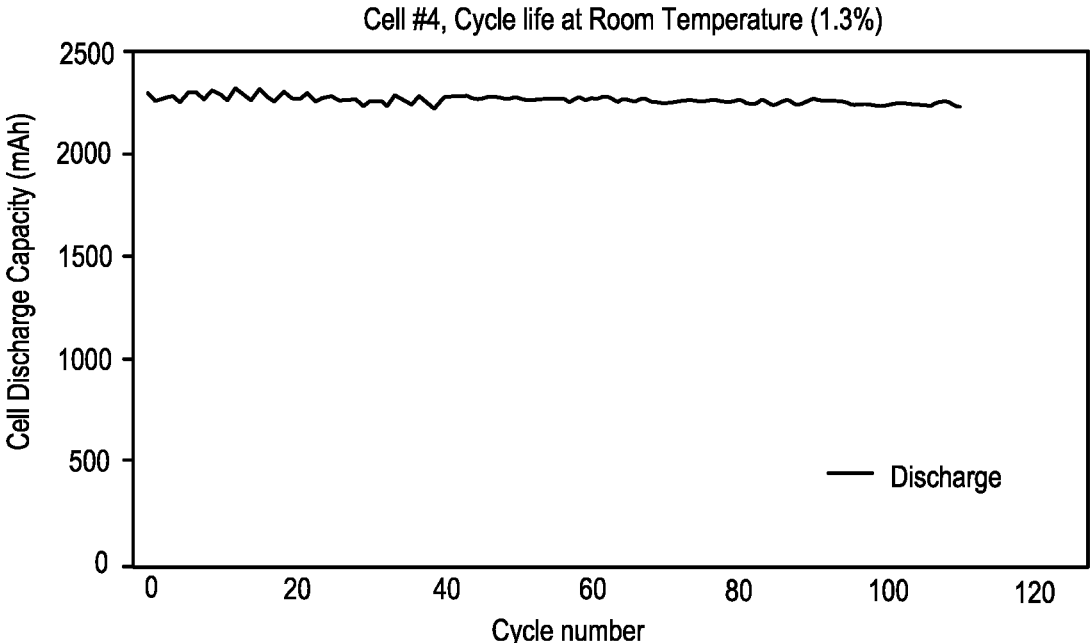
FIG. 30 illustrates the cycle life of Cell #4 (CaCO$_3$ and Al$_2$O$_3$ resistive layer 6). The cell lost about 1.3% after 100 cycles which is lower than that of the cells without any resistive layer (~2.5% by average, not shown).

FIG. 16 presents the resistance in relation to the temperature increase for the positive electrode collected from autopsying cells with 0, 3.6, and 4.09 V. The resistance increases with the increase in the temperature, especially for the positive electrodes obtained from the cell having the voltages 3.66 and 4V. FIG. 19 shows the discharge capacity at 1, 3, and 6 A current and at 50° C. The cell capacity decreases significantly with the increase of the current, indicating the strong effect from the resistive layer. FIG. 20 lists the cell impedance at 1 kHz and the capacity at 1 A, 3 A, 6 A and 10 A currents and the ratio of the capacity at 3, 6, 10 A over that at 1 A. FIG. 26 presents the over charge profiles during the over charge test. FIG. 28 summarize the cell maximum temperature during the over charge test and residual current in the end of over charge test. FIG. 29 shows the discharge capacity vs. the cycle number. The cell lost about 1% capacity that is about 100% better than that (2.5%) of the baseline cell. FIG. 22 shows the cell temperature profiles during the impact test. FIG. 23 summarizes the cell maximum temperature in the impact test.

Example 3

Preparation of 50% $Al_2O_3$ and 50% $CaCO_3$ based gas generator and resistive layer, positive and negative electrodes, and the completed Cell #4 for the evaluation in the resistance measurement, discharge capability tests at 50° C., impact test, over charge and cycle life tests are described below.

A) Positive POS4B as an Example of a Gas Generator and Resistive Layer (1$^{st}$ Layer) Preparation.

i) Torlon®4000TF (0.8 g) was dissolved into NMP (10 g); ii) PVDF (4.8 g) was dissolved into NMP (~70 g); iii) The solutions prepared in Step i and ii were mixed, and then carbon black (0.32 g) was added and mixed for 10 minutes at 6500 rpm; iv) Nano $CaCO_3$ powder (17.04 g) and $Al_2O_3$ powder (17.04 g) were added to the solution from Step iii and mixed for 20 minutes at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 1 mg/cm².

B) Preparation of POS4 A as an Example of the Positive Electrode Preparation (2$^{nd}$ Layer).

i) PVDF (21.6 g) was dissolved into NMP (250 g); ii) Carbon black (18 g) was added and mixed for 15 minutes at the rate of about 6500 rpm; iii) $LiNi_{1/3}CO_{1/3}Mn_{1/3}O_2$ (NMC) (560.4 g) was added to the slurry from Step ii and mixed for 30 minutes at 6500 rpm to form a flowable slurry; iv) Some NMP was added for the viscosity adjustment; v) This slurry was coated onto POS4B (Example 3A) using an automatic coating machine with the first heat zone set to about 85° C. and the second heat zone to about 135° C. to evaporate off the NMP. The final dried solid loading was about 19.4 mg/cm². The positive layer was then compressed to a thickness of about 153 μm. The electrode made here was considered as zero voltage against a standard graphite electrode and was used for the impedance measurement at 0 V in relation to the temperature.

C) Preparation of NEG4 A as an Example of the Negative Electrode Preparation i) CMC (13 g) was dissolved into deionized water (~1000 g); ii) Carbon black (20 g) was added and mixed for 15 minutes at 6500 rpm; iii) Negative active graphite (JFE Chemical Corporation; Graphitized Mesophase Carbon Micro Bead (MCMB) and Synthetic Graphite (TIMCAL) (945.92 g in total) were added to the slurry from Step ii and mixed for 30 minutes at 6500 rpm to form a flowable slurry; iv) SBR (solid content 50% suspended in water) (42 g) was added to the slurry formed in Step iii and mixed at about 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11.8 mg/cm². The negative electrode layer was then compressed to a thickness of about 159 μm. The negative made was used for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The jelly-roll made in the Step iii was laid flat in an aluminum composite bag; v) The bag from Step iv was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate; x) Under vacuum, the cell was punctured to release any gases and then resealed. The cell made here was used for grading and other tests such as discharging capability test at 50° C., impact test, cycle life test and so on.

FIG. 20 lists the cell impedance at 1 kHz and the capacity at 1 A, 3 A, 6 A and 10 A currents and the ratio of the capacity at 3 A, 6 A, and 10 A over that at 1 A. FIG. 22 shows the cell temperature profiles during the impact test. FIG. 23 summarizes the cell maximum temperature in the impact test. FIG. 26 shows the voltage profiles of the cell voltage and temperature during the 12V/2 A over charge test. FIG. 28 summarizes the cell maximum cell temperatures in the over charge test.

Example 4

Preparation of $Al_2O_3$ and Sodium trisilicate ($NaSiO_3$) mixed based gas generator and resistive layer, positive and negative electrodes, and the completed Cell #5 for the evaluation in the resistance measurement, discharge capability tests at 50° C., impact test, over charge, and cycle life tests are described below.

A) Positive POS5B as an Example of a Gas Generator and Resistive Layer ($1^{st}$ Layer) Preparation.

i) Torlon®4000TF (0.8 g) was dissolved into NMP (~10 g); ii) PVDF (4.8 g) was dissolved into NMP (60 g); iii) The solutions prepared in Step i and ii were mixed, and then carbon black (0.32 g) was added and mixed for 10 minutes at 6500 rpm; iv) Nano $Al_2O_3$ powder (17.04 g) and $NaSiO_3$ (17.04 g) were added to the solution from Step iii and mixed for 20 minutes at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 0.7 mg/cm².

B) Preparation of POS5 A as an Example of the Positive Electrode Preparation ($2^{nd}$ Layer).

i) PVDF (21.6 g) was dissolved into NMP (270 g); ii) Carbon black (18 g) was added and mixed for 15 minutes at the rate of about 6500 rpm; iii) $LiNi_{1/3}Co_{1/3}Mn_{1/3}O_2$ (NMC) (560.4 g) was added to the slurry from Step ii and mixed for 30 minutes at the rate of about 6500 rpm to form a flowable slurry; iv) Some NMP was added for the viscosity adjustment; v) This slurry was coated onto POS5B (Example 4A) using an automatic coating machine with the first heat zone set to about 85° C. and the second heat zone to about 135° C. to evaporate off the NMP. The final dried solid loading was about 19.4 mg/cm². The positive layer was then compressed to a thickness of about 153 μm. The electrode made here was considered as zero voltage against a standard graphite electrode and was used for the impedance measurement at 0 V in relation to the temperature.

C) Preparation of NEG5 A as an Example of the Negative Electrode Preparation i) CMC (13 g) was dissolved into deionized water (~1000 g); ii) Carbon black (20 g) was added and mixed for 15 minutes at the rate of about 6500 rpm; iii) Negative active graphite (JFE Chemical Corporation; Graphitized Mesophase Carbon Micro Bead (MCMB) and Synthetic Graphite (TIMCAL) (945.92 g in total) were added to the slurry from Step ii and mix for 30 minutes at 6500 rpm to form a flowable slurry; iv) SBR (solid content 50% suspended in water) (42 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11.8 mg/cm². The negative electrode layer was then compressed to a thickness of about 159 μm. The negative made is ready for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The jelly-roll made in the Step iii was laid flat in an aluminum composite bag; v) The bag from Step iv. was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. x) Under vacuum, the cell was punctured to release any gases and then resealed. The cell made here was used for grading and other tests such as discharging capability test at 50° C., impact test, cycle life test and so on.

FIG. 18 lists the cell impedance at 1 kHz and the capacity at 1 A, 3 A, 6 A and 10 A currents and the ratio of the capacity at 3, 6, and 10 A over that at 1 A. FIG. 22 shows the cell temperature profiles during the impact test FIG. 23 summarizes the cell maximum temperature in the impact test. FIG. 28 summarizes the cell maximum temperature in the 12V/2 A overcharge test.

Example 5

Preparation of 52% $CaCO_3$ and 48% PVDF based gas generator and resistive layer, positive and negative electrodes, and the completed Cell #6 for the evaluation in the resistance measurement, discharge capability tests at 50° C., impact test, over charge, and cycle life tests are discussed below.

A) Positive POS6B as an Example of a Gas Generator and Resistive Layer (1$^{st}$ Layer) Preparation.

i) PVDF (23.25 g) was dissolved into NMP (~250 g); ii) The solution prepared in Step I was mixed, and then carbon black (1.85 g) was added and mixed for 10 minutes at the rate of about 6500 rpm; iv) Nano $CaCO_3$ powder (24.9 g) was added to the solution from Step iii and mixed for 20 minutes at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 1 mg/cm².

B) Preparation of POS6 A as an Example of the Positive Electrode Preparation (2$^{nd}$ Layer).

i) PVDF (24 g) was dissolved into NMP (300 g); ii) Carbon black (12 g) was added and mixed for 15 minutes at 6500 rpm; iii) $LiNi_{0.4}Co_{0.3}Mn_{0.4}Co_{0.3}O_2$(NMC) (558 g) was added to the slurry from Step ii and mixed for 30 minutes at 6500 rpm to form a flowable slurry; iv) Some NMP was added for the viscosity adjustment; v) This slurry was coated onto POS6B (Example 5A) using an automatic coating machine with the first heat zone set to about 85° C. and the second heat zone to about 135° C. to evaporate off the NMP. The final dried solid loading was about 22 mg/cm². The positive layer was then compressed to a thickness of about 167 μm. The electrode made here was considered as zero voltage against a standard graphite electrode and was used for the impedance measurement at 0 V in relation to the temperature.

C) Preparation of NEG6 A as an Example of the Negative Electrode Preparation.

i) CMC (9 g) was dissolved into deionized water (~530 g); ii) Carbon black (12 g) was added and mixed for 15 minutes at 6500 rpm; iii) Negative active graphite (JFE Chemical Corporation; Graphitized Mesophase Carbon Micro Bead (MCMB) (564 g) were added to the slurry from Step ii and mixed for 30 minutes at 6500 rpm to form a flowable slurry; iv) SBR (solid content 50% suspended in water) (30 g) was added to the slurry formed in Step iii and mixed at about 6500 rpm for 5 min; v) Some water was added to adjust the viscosity for a smooth coating; vi) This slurry was coated onto 9 μm thick copper foil using an automatic coating machine with the first heat zone set to about 95° C. and the second heat zone to about 125° C. to evaporate off the water. The final dried solid loading was about 12 mg/cm². The negative electrode layer was then compressed to a thickness of about 170 μm. The negative made was used for the dry for the cell assembly.

D) Preparation of Cell for the Evaluation.

i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The jelly-roll made in the Step iii was laid flat in an aluminum composite bag; v) The bag from Step iv was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. x) Under vacuum, the cell was punctured to release any gases and then resealed. The cell made here was used for grading and other tests such as discharging capability test at 50° C., impact test, cycle life test and so on.

FIG. 20 lists the cell impedance at 1 kHz and the capacity at 1 A, 3A, 6A and 10A currents and the ratio of the capacity at 3, 6, 10 A over that at 1 A. FIG. 22 shows the cell temperature profiles during the impact test. FIG. 23 summarizes the cell maximum temperature in the impact test. FIG. 28 summarizes the cell maximum cell temperatures in the over charge test.

Example 6

Preparation of positive electrodes for chemical decomposition voltage measurements is described below.

POS7B was prepared as follows: (i) Deionized water (~300 g) was mixed into Carbopol®-934 (19.64 g); (ii) Super-P® (160 mg) and LiOH (200 mg) were added into the slurry made in Step (i) and mixed for 30 minutes at 5000 rpm; (iii) An appropriate amount of deionized water was added to adjust the slurry to form a coatable slurry. (iv) The slurry was coated onto a 15 μm aluminum foil with the automatic coating machine with the drying temperatures set to 135° C. for zone 1 and 165° C. for zone 2. The final dried solid loading was about 0.7 mg/cm².

POS8B was prepared as follows: (i) Deionized water (~100 g) was mixed into AI-50 (19.85 g); (ii) Super-P® (160 mg) was added into the slurry made in Step (i) and mixed for 30 minutes at 5000 rpm; (iii) An appropriate amount of deionized water was added to adjust the slurry to form a coatable slurry. (iv) The slurry was coated onto 15 μm aluminum foil with automatic coating machine with the drying temperatures set to 135 for zone 1 and 165° C. for zone 2. The final dried solid loading was about 0.7 mg/cm².

POS9B was prepared as follows: (i) Deionized water (~322 g) was mixed into 19.85 g CMC-DN-800H; (ii) Super-P® (160 mg) was added into the slurry made in Step (i) and mixed for 30 minutes at 5000 rpm; (iii) An appropriate amount of deionized water was added to adjust the slurry to form a coatable slurry. (iv) The slurry was coated onto 15 μm aluminum foil with automatic coating machine with the drying temperatures set to 135 for zone 1 and 165° C. for zone 2. The final dried solid loading was about 0.7 mg/cm².

POS13B was prepared as follows: (i) Torlon®4000TF (400 mg) was dissolved into NMP (4 g). (ii) PVDF-A (2.4 g) was dissolved into NMP (30 g). (iii) The two solutions were mixed and Super-P® (160 mg) was added, then mixed for 30 minutes at 5000 rpm. (iv) $La_2(CO_3)_3$ (17.04 g) or the salts listed in FIG. 8 were added into above slurry and mixed together at 5000 rpm for 30 min. (v) The slurry was coated onto 15 μm aluminum foil with automatic coating machine at first heat zone set to 13° C. and second heat zone to 16° C. for evaporate off the NMP. Final dried solid loading was about 0.7 mg/cm².

Example 7

Electrochemical test for the positives electrodes coated with gas generator layers is described below.

The decomposition voltages of all resistive layers were measured with a three electrode configuration (resistive layer as the working electrode, and lithium metal as both reference electrode and count electrode) by Linear Sweep Voltammetry technology using a VMP2 multichannel potentiostat instrument at room temperature. A 0.3 cm×2.0 cm piece of the resistive layer was the working electrode, and 0.3 cm×2.0 cm piece of lithium metal was both reference electrode and counter electrode. These electrodes were put into a glass containing $LiPF_6$ ethylene carbonate based electrolyte (5 g). The scan rate is 5 mV/second in the voltage range from 0 to 6V. FIGS. 31 and 33 shows the decomposition voltage profiles of these compounds. FIGS. 32 and 34 summarizes the peak current and peak voltage for each of the compounds tested.

Example 8

Preparation of $CaCO_3$ based gas generator layer, positive and negative electrodes, and the cell (#7) for the evaluation in the over charge test is described below. This gas generator layer could become a resistive layer if the conductive additive content is in the certain range such that the resistivity of the gas-generator layer is more resistive (50% more at least) than that of the energy layer or the layer that provide the majority (>50%) of the battery discharge energy. The gas generator content can be 2% to 99%.

A) Positive POS071 A as an Example of a Gas Generator Layer ($1^{st}$ Layer) Preparation.

i) Torlon®4000TF (0.9 g) was dissolved into NMP (10 g); ii) PVDF (5.25 g) was dissolved into NMP (~68 g); iii) The solutions prepared in Step i and ii were mixed, and then carbon black (1.8 g) was added and mixed for 10 min at the rate of about 6500 rpm; iv) Nano $CaCO_3$ powder (7.11 g) and 134.94 g $LiNi_{0.33}Al_{0.33}Co_{0.33}O_2$ were added to the solution from Step iii and mixed for 20 min at the rate of about 6500 rpm to form a flowable slurry; v) This slurry was coated onto 15 μm thick aluminum foil using an automatic coating machine with the first heat zone set to about 90° C. and the second heat zone to about 140° C. to evaporate off the NMP. The final dried solid loading was about 4 mg/cm².

B) Preparation of POS071B as an Example of the Positive Electrode Preparation (2nd Layer).

i) PVDF (25.2 g) was dissolved into NMP (327 g); ii) Carbon black (21 g) was added and mixed for 15 min at the rate of about 6500 rpm; iii) $LiNi_{0.82}Al_{0.03}Co_{0.15}O_2$ (NCA) (649 g) was added to the slurry from Step ii and mixed for 30 min at the rate of about 6500 rpm to form a flowable slurry; iv) Some NMP was added for the viscosity adjustment; v) This slurry was coated onto POS071 A using an automatic coating machine with the first heat zone set to about 85° C. and the second heat zone to about 135° C. to evaporate off the NMP. The final dried solid loading is about 20.4 mg/cm². The positive layer was then compressed to a thickness of about 155 μm.

C) Preparation of NEG015B as an Example of the Negative Electrode Preparation i) CMC (15 g) was dissolved into deionized water (~951 g); ii) Carbon black (15 g) was added and mixed for 15 min at the rate of about 6500 rpm; iii) Negative active graphite (JFE Chemical Corporation; Graphitized Mesophase Carbon Micro Bead (MCMB) (945 g) was added to the slurry from Step ii and mixed for 30 min at the rate of about 6500 rpm to form a flowable slurry; iv) SBR (solid content 50% suspended in water) (50 g) was added to the slurry formed in Step iii and mixed at about 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11 mg/cm². The negative electrode layer was then compressed to a thickness of about 155 μm. The negative made is ready for the dry for the cell assembly.

D) Preparation of Cell for the Evaluation i) The electrodes were punched into the pieces with an electrode tab; ii) The positive electrode was dried at −125° C. for 10 hr and negative electrode at ~140° C. for 10 hr; iii) The positive and negative electrodes were laminated with the separator as the middle layer; iv) The jelly-roll made in the Step iii was laid flat in an aluminum composite bag; v) The bag from Step iv. was dried in a 70° C. vacuum oven; vi) The bag from Step v was filled with the carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. The cell made here was used for grading and other tests such as over charge test.

Figures 35, 36:
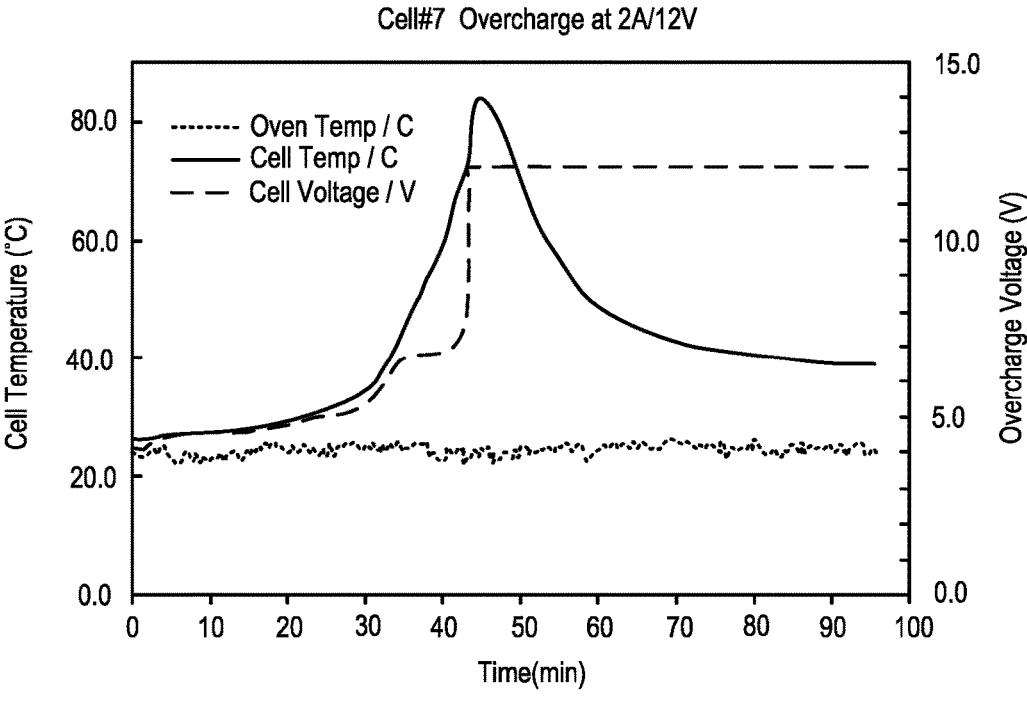
FIG. 35 shows cell temperature and overcharge voltage profiles during 2 A/12V overcharge test at room temperature.
FIG. 36 illustrates the cell impedance and capacities at different currents for Cells 1, 3, 4, 5, and 6 described in Examples 9-12 below.

FIG. 35 presents the overcharge voltage, cell temperature and oven chamber temperature during the overcharge test (2 A and 12V). The cell passed the over test nicely since the cell maximum temperature is about 83° C. during the overcharge test. Implementations of the current subject matter can include, but are not limited to, articles of manufacture (e.g. apparatuses, systems, etc.), methods of making or use, compositions of matter, or the like consistent with the descriptions provided herein.

Example 9

Preparation of $Al_2O_3$ based resistive layer, positive and negative electrodes, and the completed Cell 3 for the evaluation in the resistance measurement, discharge capability tests at 50° C., impact test, and cycle life test are described below.

A) Positive POS3B as an Example of a Resistance Layer ($1^{st}$ Layer) Preparation.

i) Dissolve Torlon®4000TF (1 g) into NMP (10 g); Dissolve PVDF (6 g) into NMP (70 g); iii) Mix solution prepared in Step i and ii, and then add carbon black (0.4 g) and mix for 10 min at 6500 rpm; iv) Add nano $Al_2O_3$ powder (42 g) to the solution from Step iii and mix for 20 min at the rate of 6500 rpm to form a flowable slurry; v) Coat this slurry onto m thick aluminum foil using an automatic coating machine with the first heat zone set to about 130° C. and the second heat zone to about 160° C. to evaporate off the NMP. The final dried solid loading is about 1 mg/cm².

B) Preparation of POS3 A as an Example of the Positive Electrode Preparation (2nd Layer).

i) PVDF (21.6 g) was dissolved into NMP (250 g); Carbon black (18 g) was added and mixed for 15 min at 6500 rpm;

LiNi$_{1/3}$Co$_{1/3}$Mn$_{1/3}$O$_2$(NMC) (560.4 g) was added to the slurry from Step ii and mixed for 30 min at 6500 rpm to form a flowable slurry; iv) Some NMP was added for the viscosity adjustment; v) This slurry was coated onto POS3B using an automatic coating machine with the first heat zone set to about 85° C. and the second heat zone to about 135° C. to evaporate off the NMP. The final dried solid loading was about 19.4 mg/cm$^2$. The positive layer was then compressed to a thickness of about 153 μm. The electrode made here is called as zero voltage against a standard graphite electrode and was used for the impedance measurement at 0 V in relation to the temperature.

C) Preparation of NEG3 A as an Example of the Negative Electrode Preparation i) CMC (13 g) was dissolved into deionized water (~1000 g); ii) Carbon black (20 g) was added and mixed for 15 min at 6500 rpm; iii) Negative active graphite (JFE Chemical Corporation; Graphitized Mesophase Carbon Micro Bead (MCMB) and Synthetic Graphite (TIMCAL) (945.92 g in total) was added to the slurry from Step ii and mixed for 30 min at 6500 rpm to form a flowable slurry; iv) SBR (solid content 50% suspended in water) (42 g) was added to the slurry formed in Step iii and mixed at 6500 rpm for 5 min; v) The viscosity was adjusted for a smooth coating; vi) This slurry was coated onto 9 gm thick copper foil using an automatic coating machine with the first heat zone set to about 100° C. and the second heat zone to about 130° C. to evaporate off the water. The final dried solid loading was about 11.8 mg/cm$^2$. The negative electrode layer was then compressed to a thickness of about 159 μm. The negative made was used for the dry for the cell assembly.

D) Preparation of Cell for the Evaluation i) The electrodes were punched into the pieces with the electrode tab; ii) The positive electrode was dried at 125° C. for 10 hours and negative electrode at 140° C. for 10 hours; iii) The positive and negative electrodes were laminated with the separator as the middle layer; iv) The flat jelly-roll made in the Step iii. was laid flat into an aluminum composite bag; v) The bag from Step iv. was dried in a 70° C. vacuum oven; vi) The bag from Step v was filled with the LiPF$_6$ containing organic carbonate based electrolyte; vii) The bag from Step vi was sealed; viii) Rested for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

Figure 37:
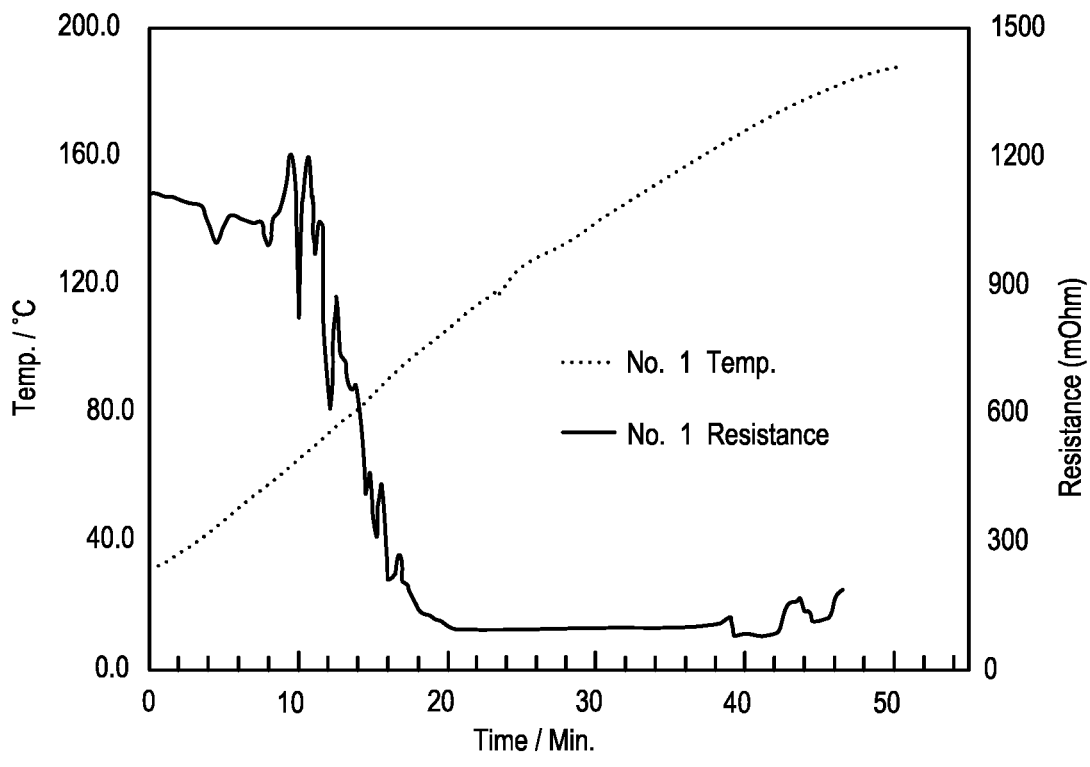
FIG. 37 illustrates the resistance of Cell 2 (baseline, no resistive layer) at 3.6V vs graphite in relation to the temperature increase. The resistance decreased about 10 times with the increase in the temperature.
Figure 38:
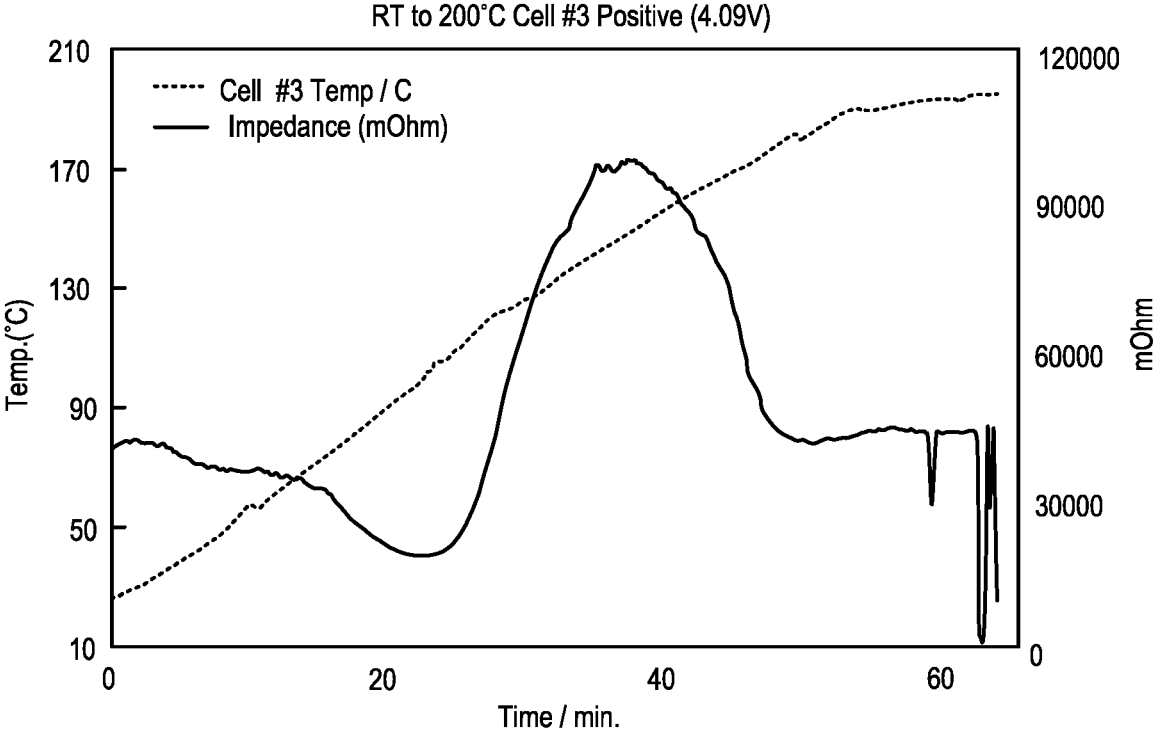
FIG. 38 illustrates the resistance of Cell 3 at 4.09V vs graphite in relation to the temperature increase. The resistance decreased slightly and increased by about 3 times and then decreased by about 3 times with the increase in the temperature.
Figures 40, 41:
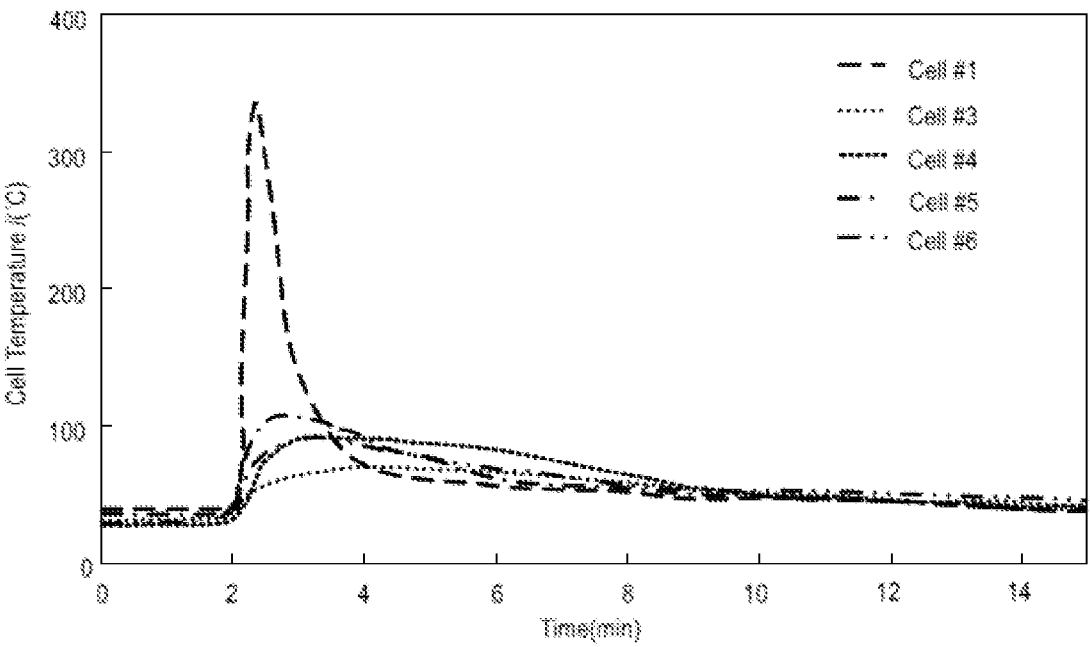
FIG. 40 illustrates the Cell temperature profiles during the impact test for Cells 1, 3, 4, 5, and 6, as described in Examples 9-12. All cells with the resistive layer passed the test while the cell without any resistive layer failed in the test (caught on fire). The maximum cell temperature during the impact test is summarized in FIG. 41.
FIG. 41 illustrates the maximum temperature obtained by Cells 1, 3, 4, 5, and 6 during the impact test, as described in Examples 9-12.
Figure 42:
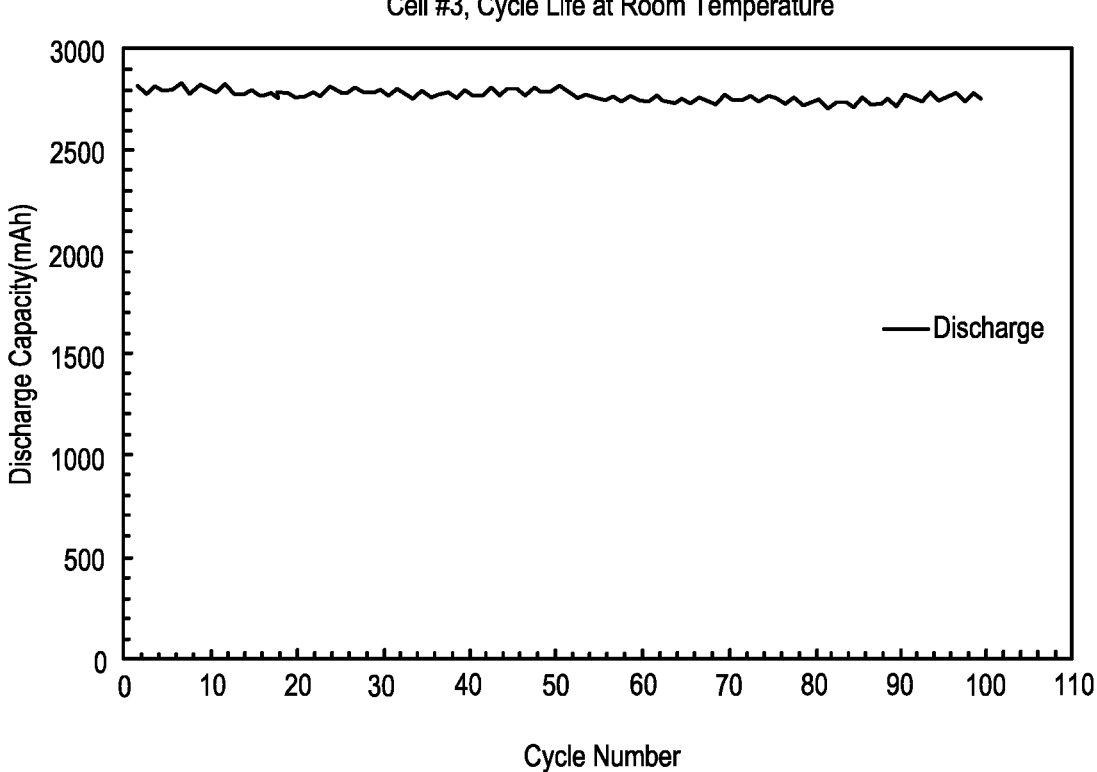
FIG. 42 illustrates the cycle life of Cell 3. The cell lost about 2% after 100 cycles which is similar to that of the cells without any resistive layer (~2.5% by average, not shown).

FIG. 38 presents the resistance in relation to the temperature increase for the positive electrode collected from autopsying a cell with 4.09V. The resistance changes very little compared with that (FIG. 37) of the baseline cell. FIG. 42 shows the discharge capacity vs. the cycle number. The cell lost about 2% capacity that is similar to that (2.5%) of the baseline cell. FIG. 36 lists the cell impedance at 1 kHz and the capacity at 1 A, 3 A, 6 A and 10 A currents and the ratio of the capacity at 3 A, 6 A, 10 A over that at 1 A. FIG. 40 shows the cell temperature profiles during the impact test. FIG. 41 summarizes the cell maximum temperature in the impact test.

Example 10

Preparation of 50% Polyacrylic latex and 50% Barium Tatanate (BaTiO2) based resistive layer, positive and negative electrodes, and the completed Cell 4 for the evaluation in the resistance measurement, discharge capability tests at 50° C., impact test, and cycle life test are described below.

A) Positive POS4B as an Example of a Resistance Layer (1$^{st}$ Layer) Preparation.

i) CMC (0.375 g) was dissolved into deionized water (~30 g); ii) The solution prepared in Step i was mixed, and then carbon black (1.75 g) was added and mixed for several minutes; iii) nano BaTiO$_2$ powder (25 g) was added to the solution from Step ii and mixed for 20 min at 6500 rpm to form a flowable slurry; v) This slurry was coated onto 15 μm thick aluminum foil using an automatic coating machine with the first heat zone set to about 90° C. and the second heat zone to about 140° C. to evaporate off the water. The final dried solid loading was about 0.7 mg/cm$^2$.

B) Preparation of POS4 A as an Example of the Positive Electrode Preparation (2$^{nd}$ Layer).

i) PVDF (14.4 g) was dissolved into NMP (~160 g); ii) Carbon black (12 g) was added and mixed for 15 min at 6500 rpm; iii) LiNi$_{0.5}$Mn$_{0.3}$Co$_{0.2}$O$_2$(NMC) (373.6 g) was added to the slurry from Step ii and mixed for 30 min at 6500 rpm to form a flowable slurry; iv) Some NMP was added for the viscosity adjustment; v) This slurry was coated onto POS4B (Example 2A) using an automatic coating machine with the first heat zone set to about 80° C. and the second heat zone to about 130° C. to evaporate off the NMP. The final dried solid loading was about 15.2 mg/cm$^2$. The positive layer was then compressed to a thickness of about 113 μm. The electrode made here was called as zero voltage against a standard graphite electrode and was used for the impedance measurement at 0 V in relation to the temperature.

C) Preparation of NEG3 A as an Example of the Negative Electrode Preparation i) CMC (7.8 g) was dissolved into deionized water (~800 g); ii) Carbon black (12 g) was added and mixed for 15 min at 6500 rpm; iii) Negative active graphite (JFE Chemical Corporation; Graphitized Mesophase Carbon Micro Bead (MCMB) and Synthetic Graphite (TIMCAL) (568.6 g in total) was added to the slurry from Step ii and mixed for 30 min at 6500 rpm to form a flowable slurry; iv) SBR (solid content 50% suspended in water) (25.2 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 70° C. and the second heat zone to about 100° C. to evaporate off the water. The final dried solid loading was about 8.99 mg/cm$^2$. The negative electrode layer was then compressed to a thickness of about 123 μm. The negative made was used for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The flat jelly-roll made in the Step iii. was laid flat into the aluminum composite bag; v) The bag from Step iv. was dried in a 70° C. vacuum oven; vi) The bag from Step v was filled with the LiPF$_6$ containing organic carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

Figure 39:
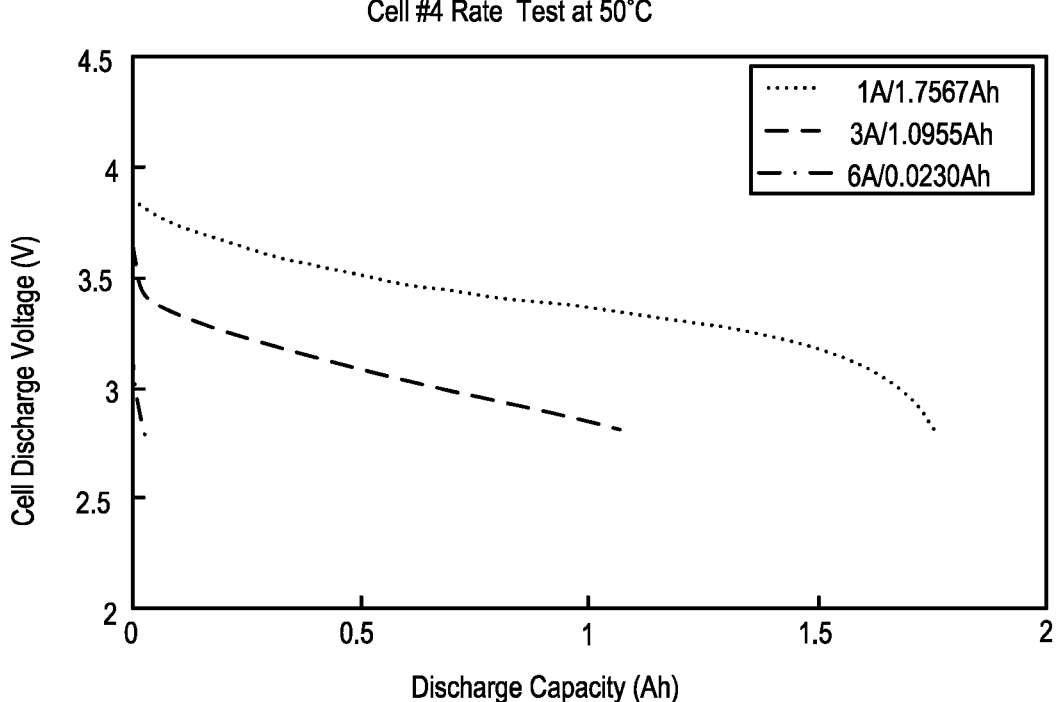
FIG. 39 illustrates the discharge capacity of Cell 4 vs the cell voltage at 1 A, 3 A, 6 A and 10 A. The cell discharge capability decreases dramatically with the increase in the cell discharge current with this particular resistive layer.

FIG. 39 shows the discharge capacity at 1 A, 3 A, 6 A current and at 50° C. The cell capacity decreases very rapidly with the increase of the current, indicating the strong effect from the resistive layer. FIG. 36 lists the cell impedance at 1 kHz and the capacity at 1 A, 3 A, 6 A and 10 A currents and the ratio of the capacity at 3 A, 6 A, 10 A over that at 1 A. FIG. 40 shows the cell temperature profiles during the impact test. FIG. 41 summarizes the cell maximum temperature in the impact test.

Example 11

Preparation of resistive layer in negative electrodes, positive and negative electrodes, and the completed Cell 5 for the evaluation in the resistance measurement, discharge capability tests at 50° C., impact test, and cycle life test are described below.

A) Preparation of POS5 A as an Example of the Positive Electrode Preparation.

i) PVDF (31.5 g) was dissolved into NMP (~340 g); ii) Carbon black (13.5 g) was added and mixed for 15 min at 6500 rpm; iii) $LiNi_{0.33}Mn_{0.33}Co_{0.33}O_2$(NMC) (855 g) was added to the slurry from Step ii and mix for 30 min at 6500 rpm to form a flowable slurry; iv) Some NMP was added for the viscosity adjustment; v) This slurry was added onto 15 m aluminum foil using an automatic coating machine with the first heat zone set to about 80° C. and the second heat zone to about 130° C. to evaporate off the NMP. The final dried solid loading was about 14.8 mg/cm². The positive layer was then compressed to a thickness of about 113 μm. The electrode made here was designated as zero voltage against a standard graphite electrode and was used for the impedance measurement at 0 V in relation to the temperature, and the dry for the cell assembly B) Preparation of NEG5B as an Example of the Negative Electrode Preparation (1$^{st}$ Layer)

CMC (0.375 g) was dissolved into deionized water (~90 g); ii) Carbon black (1.75 g) was added and mixed for 15 min; $BaTiO_2$ (25 g in total) was added to the slurry from Step ii and mixed for 30 min at 6500 rpm to form a flowable slurry; iv) SBR (solid content 50% suspended in water) (45.6 g) was added to the slurry formed in Step iii and mixed at about 6500 rpm for 5 min; v) The viscosity was adjusted for a smooth coating; vi) This slurry was coated onto 9 μm thick copper foil using an automatic coating machine with the first heat zone set to about 90° C. and the second heat zone to about 140° C. to evaporate off the water.

C) Preparation of NEG5 A as an Example of the Negative Electrode Preparation (2$^{nd}$ Layer)

i) CMC (3.9 g) was dissolved into deionized water (~350 g); ii) Carbon black (6 g) was added and mixed for 15 min at 6500 rpm; iii) Negative active graphite (JFE Chemical Corporation; Graphitized Mesophase Carbon Micro Bead (MCMB) and Synthetic Graphite (TIMCAL) (283.8 g in total) were added to the slurry from Step ii and mixed for 30 min at 6500 rpm to form a flowable slurry; iv) SBR (solid content 50% suspended in water) (25.2 g) was added to the slurry formed in Step iii and mixed at 6500 rpm for 5 min; v) The viscosity was adjusted for a smooth coating; vi) This slurry was coated onto NEG5B (Example 4B) using an automatic coating machine with the first heat zone set to about 70° C. and the second heat zone to about 100° C. to evaporate off the water. The final dried solid loading was about 9.8 mg/cm². The negative electrode layer was then compressed to a thickness of about 114 μm. The negative made was used for the dry for the cell assembly.

D) Preparation of Cell for the Evaluation i) The electrodes were punched into the pieces with the electrode tab; ii) The positive electrode was dried at 125° C. for 10 hours and negative electrode at 140° C. for 10 hours; iii) The positive and negative electrodes were laminated with the separator as the middle layer; iv) The flat jelly-roll made in the Step iii. was laid flat into the aluminum composite bag; v) The bag from Step iv. was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/20 rate for 5 hours and then to 4.2V at 0.5 C rate for 2 hours, then rest for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

FIG. 36 lists the cell impedance at 1 kHz and the capacity at 1 A, 3 A, 6 A and 10 A currents and the ratio of the capacity at 3 A, 6 A, 10 A over that at 1 A. FIG. 40 shows the cell temperature profile during the impact test. FIG. 41 summarizes the cell maximum temperature in the impact test.

Example 12

Preparation of $Al_2O_3$ and Sodium trisilicate ($NaSiO_3$) mixed based resistive layer, positive and negative electrodes, and the completed Cell 6 for the evaluation in the resistance measurement, discharge capability tests at 50° C., impact test, and cycle life test are described below.

A) Positive POS6B as an Example of a Resistance Layer (1$^{st}$ Layer) Preparation.

i) Torlon®4000TF (0.8 g) was dissolved into NMP (~10 g); ii) PVDF (4.8 g) was dissolved into NMP (60 g); iii) The solutions prepared in Step i and ii were mixed, and then carbon black (0.32 g) was added and mixed for 10 min at 6500 rpm; iv) nano $Al_2O_3$ powder (17.04 g) and $NaSiO_3$ (17.04 g) were added to the solution from Step iii and mixed for 20 min at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 0.7 mg/cm².

B) Preparation of POS6 A as an Example of the Positive Electrode Preparation (2$^{nd}$ Layer).

i) PVDF (21.6 g) was dissolved into NMP (270 g); ii) Carbon black (18 g) was added and mixed for 15 min at 6500 rpm; iii) $LiNi_{1/3}Co_{1/3}Mn_{1/3}O_2$(NMC) (560.4 g) was added to the slurry from Step ii and mixed for 30 min at 6500 rpm to form a flowable slurry; iv) Some NMP was added for the viscosity adjustment; v) This slurry was coated onto POS6B (Example 1A) using an automatic coating machine with the first heat zone set to about 85° C. and the second heat zone to about 135° C. to evaporate off the NMP. The final dried solid loading was about 19.4 mg/cm². The positive layer was then compressed to a thickness of about 153 μm. The electrode made here was called as zero voltage against a standard graphite electrode and was used for the impedance measurement at 0 V in relation to the temperature.

C) Preparation of NEG6 A as an Example of the Negative Electrode Preparation i) CMC (13 g) was dissolved into deionized water (~1000 g); ii) Carbon black (20 g) was added and mixed for 15 min at 6500 rpm; iii) Negative active graphite (JFE Chemical Corporation; Graphitized Mesophase Carbon Micro Bead (MCMB) and Synthetic Graphite (TIMCAL) (945.92 g in total) were added to the slurry from Step ii and mix for 30 min at 6500 rpm to form a flowable slurry; iv) SBR (solid content 50% suspended in water) (42 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11.8 mg/cm². The negative electrode layer was then compressed to a thickness of about 159 μm. The negative made is ready for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The flat jelly-roll made in the Step iii. was put into an aluminum composite bag; v) The bag from Step iv. was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

FIG. 36 lists the cell impedance at 1 kHz and the capacity at 1 A, 3 A, 6 A and 10 A currents and the ratio of the capacity at 3 A, 6 A, 10 A over that at 1 A. FIG. 40 shows the cell temperature profiles during the impact test. FIG. 41 summarizes the cell maximum temperature in the impact test.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An improved high energy density rechargeable battery, comprising:
   a first electrode;
   a first current collector for transferring electrons;
   a current interrupter interposed between the first electrode and the first current collector, wherein the current interrupter comprises a voltage sensitive material configured to generate a gas upon activation of at least a voltage trigger, wherein the voltage sensitive material comprises one or more polymers, wherein the generating of the gas forms a nonconductive gap between the first electrode and the first current collector, and wherein the forming of the nonconductive gap electrically decouples the first electrode from the first current collector;
   a second electrode having an opposite polarity of the first electrode; and
   a separator interposed between the first electrode and the second electrode.

2. The battery of claim 1, further comprising a current limiter.

3. The battery of claim 2, further comprising a second current collector.

4. The battery of claim 3, wherein the current limiter is interposed between the second electrode and the second current collector.

5. The battery of claim 2, wherein the current limiter is interposed between the first electrode and the first current collector.

6. The battery of claim 5, wherein the current limiter and the current interrupter are simultaneously incorporated into a single protective layer interposed by lamination between the first electrode and the first current collector.

7. The battery of claim 2, wherein a resistivity of the current limiter is greater than the internal resistivity of the first electrode at voltages above a voltage range for standard operation.

8. The battery of claim 2, wherein a resistivity of the current limiter does not transition at voltages within a voltage range for standard operation.

9. The battery of claim 2, wherein a resistivity of the current limiter is less than the internal resistivity of the first electrode at voltages within a voltage range for standard operation.

10. The battery of claim 1, wherein the voltage trigger is activated when voltage exceeds a voltage range for standard operation.

11. The battery of claim 1, wherein the voltage sensitive material is further configured to generate the gas upon activation of a temperature trigger, and wherein the temperature trigger is activated when temperature exceeds a temperature range for standard operation.

12. The battery of claim 1, wherein the first electrode and the first current collector are electrically coupled when the current interrupter is in an unengaged configuration, and wherein the nonconductive gap is formed between the first electrode and the first current collector when the current interrupter is in an engaged configuration.

13. The battery of claim 12, wherein the voltage sensitive material is configured to transition the current interrupter from the unengaged configuration to the engaged configuration upon activation of at least the voltage trigger.

14. The battery of claim 12, wherein the first electrode and the first current collector are electrically coupled via a laminated connection provided by the current interrupter when the current interrupter is in the unengaged configuration, and wherein the forming of the nonconductive gap delaminates the laminated connection between the first electrode and the first current collector.

15. A method, comprising:

forming a nonconductive gap between an electrode within a battery and a current collector, wherein the nonconductive gap is formed by a voltage sensitive material that is adapted to generate a gas upon activation of least a voltage trigger, wherein the voltage sensitive material comprises an interrupt layer interposed between the electrode and current collector, wherein the voltage sensitive material comprises one or more polymers, and wherein the forming of the nonconductive gap electrically decouples the electrode from the current collector.

16. The battery cell of claim 1, wherein the one or more polymers include carboxymethyl cellulose (CMC).

\* \* \* \* \*